(12) United States Patent
Motoishi et al.

(10) Patent No.: US 10,491,056 B2
(45) Date of Patent: Nov. 26, 2019

(54) STATOR FORMED BY WINDING STATOR COILS, ROTARY ELECTRIC MACHINE USING SAID STATOR, METHOD FOR MANUFACTURING STATOR FORMED BY WINDING STATOR COILS, AND METHOD FOR MANUFACTURING ROTARY ELECTRIC MACHINE

(71) Applicant: MITSUBISHI ELECTRIC CORPORATION, Chiyoda-ku, Tokyo (JP)

(72) Inventors: Naohiro Motoishi, Tokyo (JP); Hiroyuki Akita, Tokyo (JP); Koji Kawamura, Tokyo (JP); Akira Hashimoto, Tokyo (JP); Hironori Tsuiki, Tokyo (JP); Wakaki Miyaji, Tokyo (JP); Koji Tamura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 351 days.

(21) Appl. No.: 15/321,047

(22) PCT Filed: Aug. 19, 2015

(86) PCT No.: PCT/JP2015/073262
§ 371 (c)(1),
(2) Date: Dec. 21, 2016

(87) PCT Pub. No.: WO2016/042968
PCT Pub. Date: Mar. 24, 2016

(65) Prior Publication Data
US 2017/0201134 A1    Jul. 13, 2017

(30) Foreign Application Priority Data

Sep. 19, 2014  (JP) ................................ 2014-190821

(51) Int. Cl.
*H02K 1/14* (2006.01)
*H02K 3/28* (2006.01)
(Continued)

(52) U.S. Cl.
CPC ............... *H02K 1/146* (2013.01); *H02K 3/12* (2013.01); *H02K 3/28* (2013.01); *H02K 15/026* (2013.01);
(Continued)

(58) Field of Classification Search
CPC ............. H02K 15/026; H02K 15/0421; H02K 15/0464; H02K 15/066; H02K 15/085;
(Continued)

(56) References Cited

U.S. PATENT DOCUMENTS

2011/0025164 A1* 2/2011 Tanaka ..................... H02K 3/12
310/206
2012/0169163 A1* 7/2012 Imai ..................... H02K 1/2746
310/71
(Continued)

FOREIGN PATENT DOCUMENTS

| JP | 2012-125043 A | 6/2012 |
| WO | WO 2014/006927 A1 | 1/2014 |
| WO | WO 2014/050409 A1 | 4/2014 |

OTHER PUBLICATIONS

Extended European Search Report dated Mar. 12, 2018, issued by the European Patent Office in corresponding European Application No. 17204075.0. (8 pages).
(Continued)

*Primary Examiner* — Jue Zhang
*Assistant Examiner* — Demetries A Gibson
(74) *Attorney, Agent, or Firm* — Buchanan Ingersoll & Rooney PC

(57) ABSTRACT

A stator in which stator coils are formed by a plurality of unit coils arranged so as to be shifted from each other in the
(Continued)

circumferential direction and each having: a first slot-accommodated portion; a second slot-accommodated portion; a first terminal wire extending from the first slot-accommodated portion; a second terminal wire extending from the second slot-accommodated portion and shifted from the first terminal wire by one line of a conductive wire; a terminal-side coil end portion; and first and second anti-terminal-side coil end portions, wherein the first terminal wire and the second terminal wire of the respective different unit coils are joined with each other.

17 Claims, 49 Drawing Sheets

(51) Int. Cl.
  *H02K 15/085*   (2006.01)
  *H02K 3/12*   (2006.01)
  *H02K 15/02*   (2006.01)
  *H02K 15/04*   (2006.01)
  *H02K 15/06*   (2006.01)

(52) U.S. Cl.
  CPC ..... *H02K 15/0421* (2013.01); *H02K 15/0464* (2013.01); *H02K 15/066* (2013.01); *H02K 15/085* (2013.01)

(58) Field of Classification Search
  CPC .................................................................
    H02K 1/146; H02K 3/12; H02K 3/28; H02K 3/50; H02K 3/505
  USPC .................................................. 310/201–207
  See application file for complete search history.

(56) References Cited

U.S. PATENT DOCUMENTS

| | | | |
|---|---|---|---|
| 2014/0232233 A1* | 8/2014 | Fukushima | H02K 3/28 310/201 |
| 2015/0162787 A1 | 6/2015 | Sakaue et al. | |
| 2015/0229189 A1 | 8/2015 | Tsuiki et al. | |
| 2015/0381001 A1* | 12/2015 | Tsuiki | H02K 3/28 310/208 |
| 2016/0190884 A1* | 6/2016 | Nakamura | H02K 3/12 310/208 |
| 2017/0141632 A1* | 5/2017 | Hashimoto | H02K 3/04 |

OTHER PUBLICATIONS

Extended European Search Report dated Mar. 26, 2018, issued by the European Patent Office in corresponding European Application No. 15841467.2. (10 pages).

International Search Report (PCT/ISA/210) dated Nov. 24, 2015, by the Japanese Patent Office as the International Searching Authority for International Application No. PCT/JP2015/073262.

Written Opinion (PCT/ISA/237) dated Nov. 24, 2015, by the Japanese Patent Office as the International Searching Authority for International Application No. PCT/JP2015/073262.

\* cited by examiner

US 10,491,056 B2

STATOR FORMED BY WINDING STATOR COILS, ROTARY ELECTRIC MACHINE USING SAID STATOR, METHOD FOR MANUFACTURING STATOR FORMED BY WINDING STATOR COILS, AND METHOD FOR MANUFACTURING ROTARY ELECTRIC MACHINE

TECHNICAL FIELD

The present invention relates to a stator, a rotary electric machine, a method for manufacturing a stator, and a method for manufacturing a rotary electric machine, and in particular, to a technique for improving the productivity and the quality using a distributed-winding coil.

BACKGROUND ART

In recent years, rotary electric machines such as an electric motor and an electric generator are required to adapt to various uses, and improvement in the productivity and improvement in the quality are desired. In particular, in the case of using a distributed-winding coil, the process for mounting the coil to a stator core is complicated, and improvement in the assembling performance is desired.

An example of stators that allow improvement in the assembly process for mounting a coil to a stator core is shown below. The coil is formed in a concentric-winding manner, gaps in which conductive wires can be inserted are provided between the adjacent conductive wires, and lane change portions formed in coil end portions cross the width of one conductive wire. A plurality of the coils are arranged in the circumferential direction to form a coil basket, and the formed coil basket is arranged in a stator core, and the stator is manufactured (for example, see Patent Document 1).

CITATION LIST

Patent Document

Patent Document 1: Japanese Laid-Open Patent Publication No. 2012-125043 (pages 8-10, FIGS. 3, 4, and 7)

SUMMARY OF THE INVENTION

Problems to be Solved by the Invention

In a stator disclosed in Patent Document 1, connection between terminal wires of concentric-winding coils is performed by welding a terminal wire (referred to as an innermost terminal wire) positioned on the radially innermost side of one coil and a terminal wire (referred to as an outermost terminal wire) positioned on the radially outermost side of another coil with each other. Therefore, it is necessary to bring one or both of the innermost terminal wire and the outermost terminal wire to be gathered with each other before welding, thus a problem exists in that the productivity of the stator manufacturing is reduced.

The present invention has been made to solve the above problem, and an object of the present invention is to obtain a stator, a rotary electric machine using the stator, and methods for manufacturing these, which can facilitate connection of terminal wires of the stator coil and improve the productivity in the stator in which concentric-winding stator coils are arranged in slots of a stator core.

Means of Solution to the Problems

A stator according to the present invention includes a stator core having a plurality of teeth and a plurality of slots, which are arranged in a circumferential direction, and stator coils arranged in the stator core and wound by distributed-winding. The stator coil is formed by a plurality of unit coils arranged so as to be shifted from each other in the circumferential direction, the unit coils each being formed by winding one conductive wire. The unit coils include a first slot-accommodated portion; a second slot-accommodated portion; a first terminal wire extending from the first slot-accommodated portion; a second terminal wire extending from the second slot-accommodated portion; a terminal-side coil end portion connecting the first slot-accommodated portion and the second slot-accommodated portion, on a terminal side in which the first terminal wire and the second terminal wire are present; and anti-terminal-side coil end portions connecting the first slot-accommodated portion and the second slot-accommodated portion, on an anti-terminal side opposite to the terminal side in an axial direction. The first slot-accommodated portion is accommodated in the slot at one of positions separated from each other with a predetermined number of the teeth therebetween in the circumferential direction, and the second slot-accommodated portion is accommodated in the slot at the other of the positions separated from each other with the predetermined number of the teeth therebetween in the circumferential direction. The first slot-accommodated portion and the second slot-accommodated portion are respectively formed by n (n is an integer not less than 2) lines of the conductive wire. The terminal-side coil end portion is formed by (n−1) lines of the conductive wire. The anti-terminal-side coil end portions are formed by a first anti-terminal-side coil end portion and a second anti-terminal-side coil end portion, the first anti-terminal-side coil end portion being formed by (n−1) lines of the conductive wire, the second anti-terminal-side coil end portion being formed by one line of the conductive wire. Gaps corresponding to one line of the conductive wire in the radial direction are provided between respective lines of the conductive wire of the first slot-accommodated portion and between respective lines of the conductive wire of the second slot-accommodated portion. The (n−1) lines of the conductive wire of the terminal-side coil end portion and the (n−1) lines of the conductive wire of the first anti-terminal-side coil end portion respectively connect the corresponding conductive wire of the first slot-accommodated portion and the corresponding conductive wire of the second slot-accommodated portion that are shifted from each other by one line of the conductive wire in the radial direction. The one line of the conductive wire of the second anti-terminal-side coil end portion connects the corresponding conductive wire of the first slot-accommodated portion and the corresponding conductive wire of the second slot-accommodated portion that are shifted from each other by (2n−1) lines of the conductive wire in the radial direction. The first terminal wire and the second terminal wire are shifted from each other by one line of the conductive wire in the radial direction. The first terminal wire and the second terminal wire of respective different ones of the unit coils are joined with each other.

A first method for manufacturing a stator according to the present invention includes a step of producing unit coils having first slot-accommodated portions and second slot-accommodated portions which are respectively formed by n lines of the conductive wire; a step of forming a coil basket by causing the conductive wire of the second slot-accommodated portion of each unit coil to pass between the corresponding lines of the conductive wire of the first slot-accommodated portion of other unit coil so that each unit coil and the other unit coil overlap each other so as to be shifted from each other in a circumferential direction, and arranging a plurality of the unit coils in the circumferential direction; a step of attaching, to the formed coil basket, a plurality of stator core components having back yoke forming portions and teeth protruding from inner circumferential surfaces of the back yoke forming portions, by inserting the teeth of the stator core components into the formed coil basket; and a step of joining the back yoke forming portions of the plurality of stator core components that are attached.

A second method for manufacturing a stator according to the present invention includes a step of producing unit coils having first slot-accommodated portions and second slot-accommodated portions which are respectively formed by n lines of the conductive wire; a step of forming a coil basket by causing the conductive wire of the second slot-accommodated portion of each unit coil to pass between the corresponding lines of the conductive wire of the first slot-accommodated portion of other unit coil so that each unit coil and the other unit coil overlap each other so as to be shifted from each other in a circumferential direction, and arranging a plurality of the unit coils in the circumferential direction; a step of arranging, inside the coil basket, an inner core formed by a plurality of teeth radially arranged at regular intervals along the circumferential direction and connection portions connecting radially-inner-side ends of the adjacent teeth; a coil basket contraction step of tightening the coil basket inside which the inner core is arranged, from an outer circumferential side, thereby reducing an inner diameter of the coil basket and accommodating all the slot-accommodated portions into the slots between the teeth; and a step of pressing, into an outer core, the inner core to which the contracted coil basket with the reduced inner diameter is mounted.

A third method for manufacturing a stator according to the present invention includes a step of producing unit coils in which first slot-accommodated portions and second slot-accommodated portions are respectively formed by n lines of the conductive wire and a width in a circumferential direction of a terminal-side coil end portion is greater than a width in the circumferential direction of an anti-terminal-side coil end portion; a step of forming a coil basket having an inner diameter of a terminal side greater than an inner diameter of an anti-terminal side by causing the conductive wire of the second slot-accommodated portion of each unit coil to pass between the corresponding lines of the conductive wire of the first slot-accommodated portion of other unit coil so that each unit coil and the other unit coil overlap each other so as to be shifted from each other in the circumferential direction, and arranging a plurality of the unit coils in the circumferential direction; a step of inserting, from the terminal side of the coil basket, an inner core formed by a plurality of teeth radially arranged at regular intervals along the circumferential direction and connection portions connecting radially-inner-side ends of the adjacent teeth; a coil basket contraction step of applying a force from an outer circumferential side to the coil basket in which the inner core is inserted, thereby making the inner diameter of the terminal side and the inner diameter of the anti-terminal side of the coil basket equal to each other, and accommodating all the slot-accommodated portions into the slots between the teeth; and a step of pressing, into an outer core, the inner core to which the contracted coil basket having the reduced inner diameter of the terminal side of the coil basket is mounted.

A fourth method for manufacturing a stator according to the present invention includes a step of producing unit coils in which first slot-accommodated portions and second slot-accommodated portions are respectively formed by n lines of the conductive wire and a width in a circumferential direction of an anti-terminal-side coil end portion is greater than a width in the circumferential direction of a terminal-side coil end portion; a step of forming a coil basket having an inner diameter of an anti-terminal side greater than an inner diameter of a terminal side by causing the conductive wire of the second slot-accommodated portion of each unit coil to pass between the corresponding lines of the conductive wire of the first slot-accommodated portion of other unit coil so that each unit coil and the other unit coil overlap each other so as to be shifted from each other in the circumferential direction, and arranging a plurality of the unit coils in the circumferential direction; a step of inserting, from the anti-terminal side of the coil basket, an inner core formed by a plurality of teeth radially arranged at regular intervals along the circumferential direction and connection portions connecting radially-inner-side ends of the adjacent teeth; a coil basket contraction step of applying a force from an outer circumferential side to the coil basket in which the inner core is inserted, thereby making the inner diameter of the anti-terminal side and the inner diameter of the terminal side of the coil basket equal to each other, and accommodating all the slot-accommodated portions into the slots between the teeth; and a step of pressing, into an outer core, the inner core to which the contracted coil basket having the reduced inner diameter of the anti-terminal side of the coil basket is mounted.

Effect of the Invention

In a stator according to the present invention, the first terminal wire and the second terminal wire are shifted from each other by one line of conductive wires in the radial direction. Thus, connection of the terminal wires of stator coils can be facilitated, whereby the productivity can be improved and the insulation reliability can be improved.

In methods for manufacturing the stator according to the present invention, the load applied to the stator coils is small. Thus, deterioration in the insulation property of the stator coils can be prevented.

EMBODIMENTS FOR CARRYING OUT THE INVENTION

Hereinafter, a stator, a rotary electric machine, and methods for manufacturing the stator and the rotary electric machine according to the present invention will be described with reference to the drawings.

A circumferential direction, a radial direction, and an axial direction in the present invention refer to the circumferential direction, the radial direction, and the axial direction of the stator, respectively, unless otherwise specified.

Embodiment 1

Figure 1:
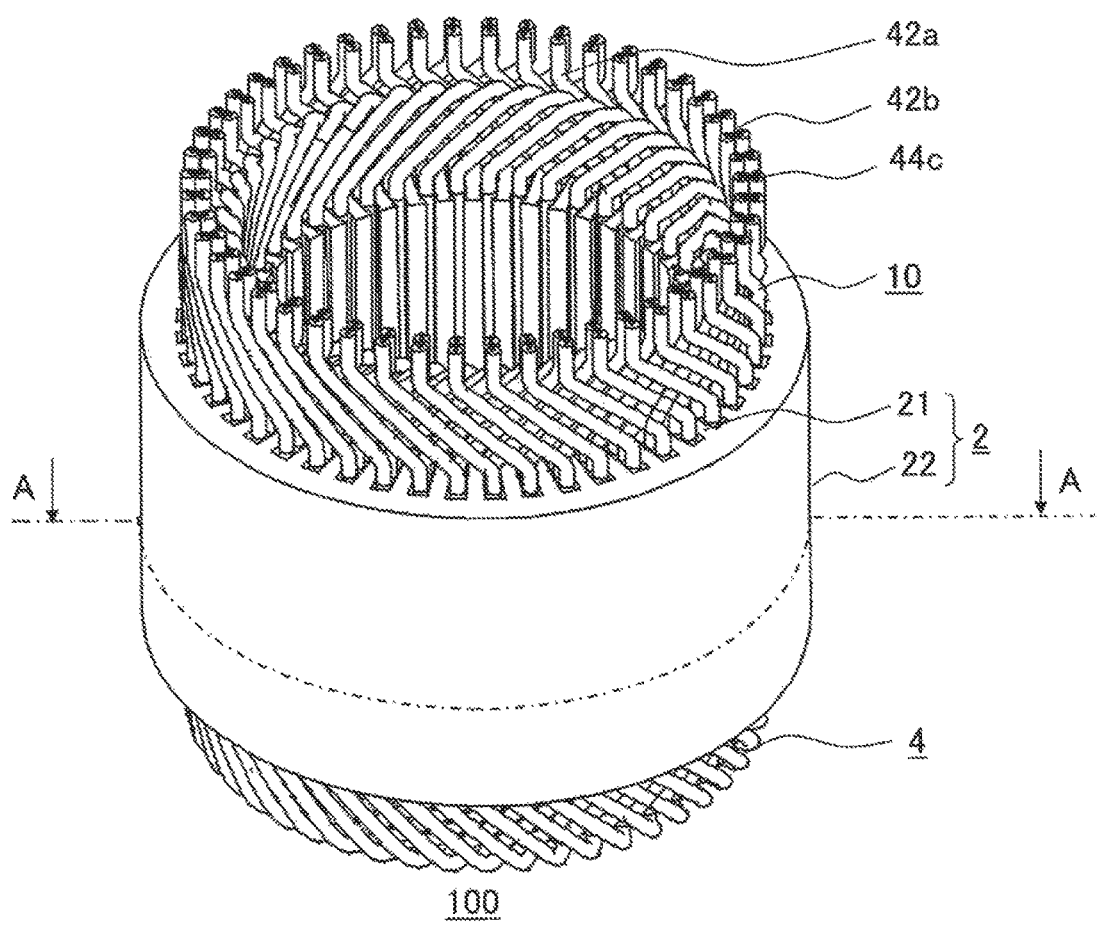
FIG. 1 is a schematic perspective view of a stator according to embodiment 1 of the present invention.

FIG. 1 is a schematic perspective view of a stator according to embodiment 1 of the present invention.

Figure 2:
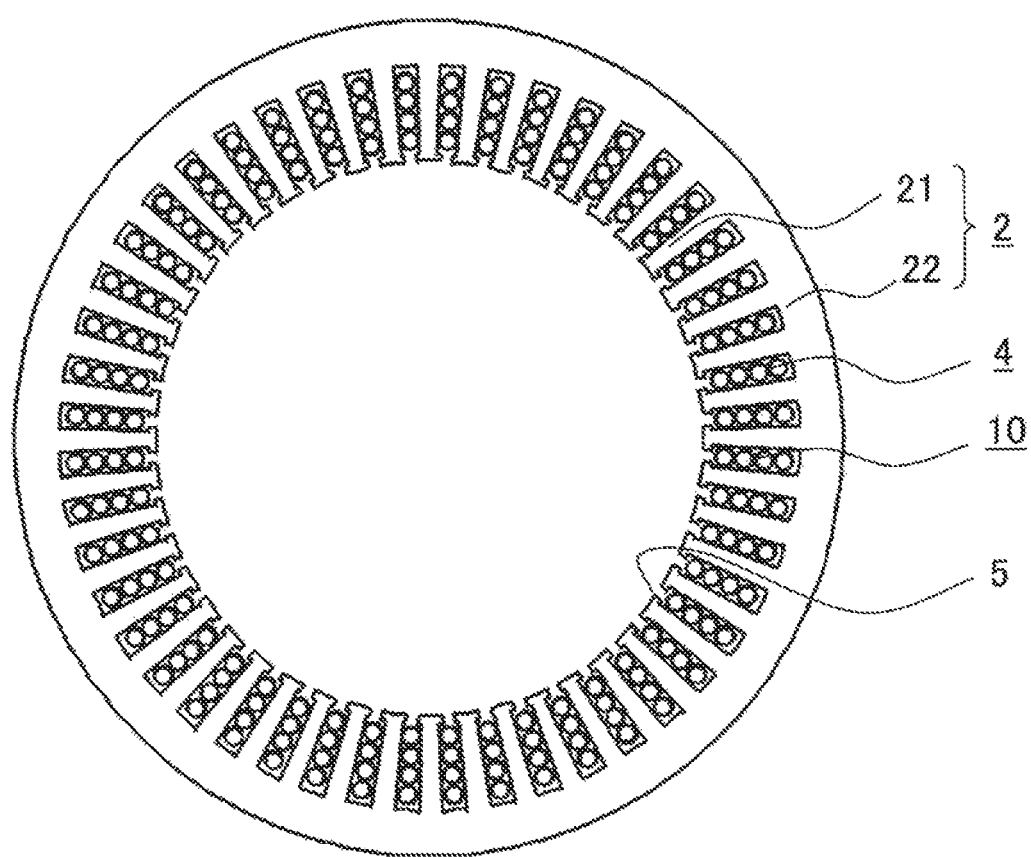
FIG. 2 is a schematic sectional view taken along A-A line of the stator in FIG. 1.

FIG. 2 is a schematic sectional view taken along A-A line of the stator in FIG. 1.

As shown in FIG. 1 and FIG. 2, the stator 100 of the present embodiment includes an annular stator core 2 and a stator coil 10.

The stator core 2 is formed of a back yoke 22 which is an outer circumferential part, and teeth 21 which protrude in the radial direction from the inner circumferential surface of the back yoke 22. Slots 5 are formed between the respective teeth 21.

The stator coil 10 is formed of a plurality of unit coils 4 described later, and three phases of U phase, V phase and W phase are Y-connected.

The unit coils 4 are inserted in the slots 5 and wound around the teeth 21.

Each unit coil 4 is partially exposed from the stator core 2 in the axial direction. In the stator 100, the exposed part side where a first terminal wire 42a and a second terminal wire 42b of each unit coil 4 are present is referred to as a terminal side, and the opposite side is referred to as a anti-terminal side.

In the present embodiment, the stator core 2 having forty-eight slots 5 and forty-eight teeth 21 is shown as an example, but the numbers of the slots 5 and the teeth 21 are not limited thereto.

Figure 3:
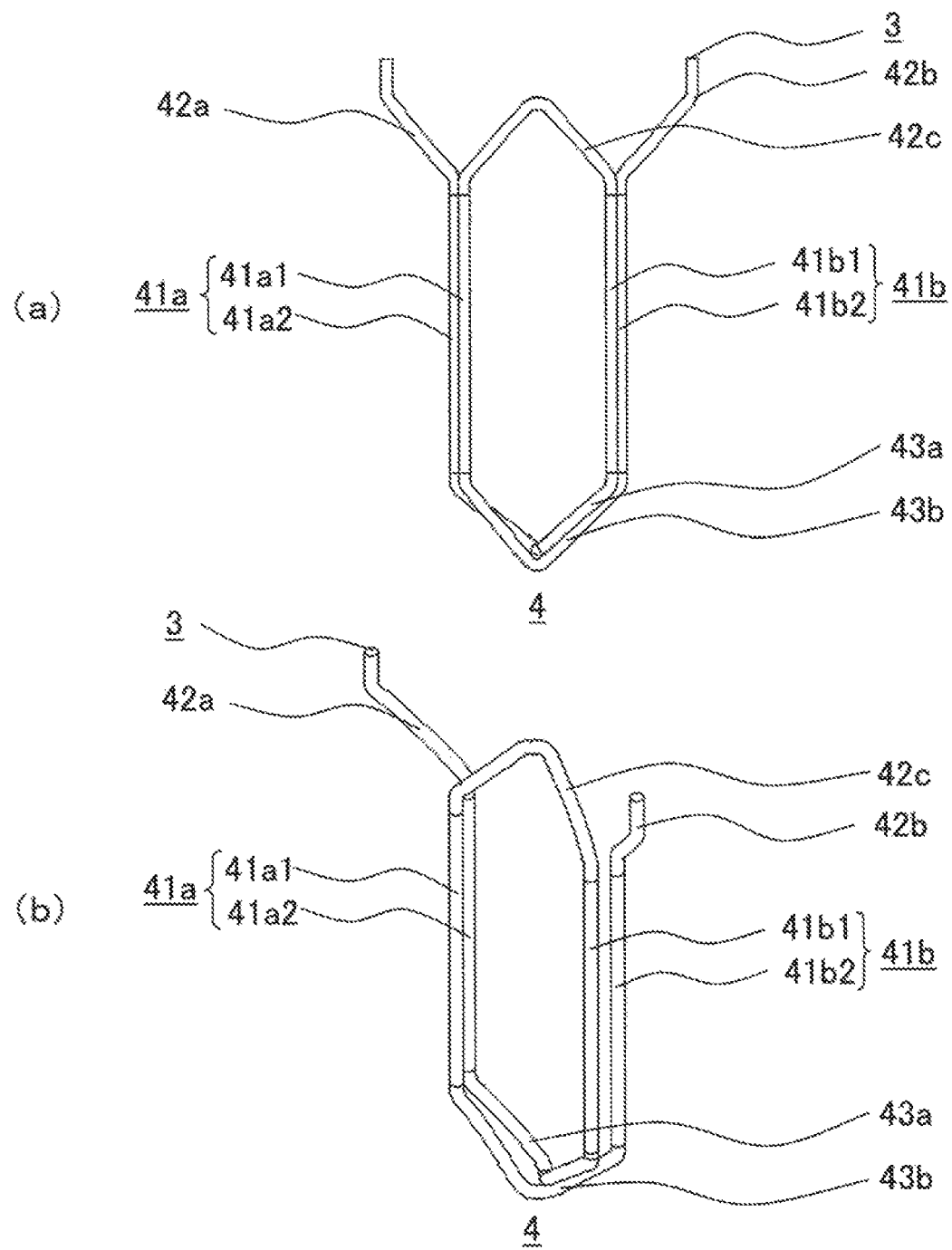
FIG. 3 is a schematic front view (a) and a schematic perspective view (b) of a unit coil according to embodiment 1 of the present invention.

FIG. 3 is a schematic front view (a) and a schematic perspective view (b) of the unit coil according to embodiment 1 of the present invention.

Figure 4:
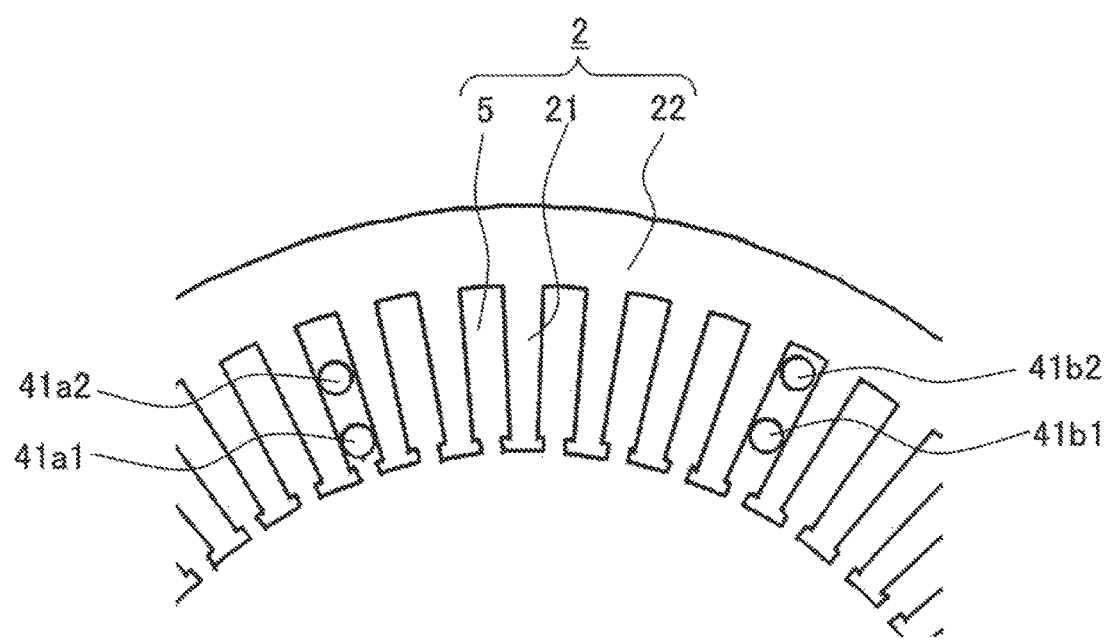
FIG. 4 is a partial schematic view of a cross section along a direction perpendicular to the axial direction, of a stator core in which one unit coil is arranged, according to embodiment 1 of the present invention.

FIG. 4 is a partial schematic view of a cross section along a direction perpendicular to the axial direction, of the stator core in which one unit coil is arranged, according to embodiment 1 of the present invention.

The unit coil 4 is formed by winding, substantially in a hexagonal shape, one conductive wire 3 composed of a conductor portion and an insulation film coating the surface of the conductor portion. That is, the coil unit 4 is formed in a concentric-winding manner.

As shown in FIG. 4, the unit coil 4 is arranged in two slots 5 across a plurality of teeth 21. That is, the stator coil 10 of the present embodiment is a distributed-winding coil.

The unit coil 4 includes: slot-accommodated portions to be respectively accommodated in the two slots 5; coil end portions connecting the slot-accommodated portions; and terminal wires extending from the respective slot-accommodated portions.

In the present embodiment, in FIG. 3, the slot-accommodated portion positioned at the left on the drawing plane is referred to as a first slot-accommodated portion 41a, and the other slot-accommodated portion positioned at the right on the drawing plane is referred to as a second slot-accommodated portion 41b.

As shown in FIG. 3, the first slot-accommodated portion 41a and the second slot-accommodated portion 41b are each composed of two lines of the conductive wire 3.

That is, in FIG. 3(a), the first slot-accommodated portion 41a is composed of a first slot-accommodated portion inner-side conductive wire 41a1 positioned on the inner side, and a first slot-accommodated portion outer-side conductive wire 41a2 positioned on the outer side. In FIG. 3(a), the second slot-accommodated portion 41b is composed of a second slot-accommodated portion inner-side conductive wire 41b1 positioned on the inner side, and a second slot-accommodated portion outer-side conductive wire 41b2 positioned on the outer side.

As shown in FIG. 3(b), the first slot-accommodated portion inner-side conductive wire 41a1 is positioned at a radially inner side of the first slot-accommodated portion outer-side conductive wire 41a2, and the second slot-accommodated portion inner-side conductive wire 41b1 is positioned at a radially inner side of the second slot-accommodated portion outer-side conductive wire 41b2.

In the stator core 2, the slot 5 in which the first slot-accommodated portion 41a is provided and the slot 5 in which the second slot-accommodated portion 41b is provided are located at positions separated from each other with a predetermined number of teeth therebetween in the radial direction.

In the present embodiment, the slot 5 in which the second slot-accommodated portion 41b of one unit coil 4 is provided is located at a position separated from the slot 5 in which the first slot-accommodated portion 41a of the one unit coil 4 is provided, with a predetermined number of teeth therebetween in the clockwise circumferential direction.

As shown in FIG. 4, in the present embodiment, in the stator core 2 as seen from the terminal side, the first slot-accommodated portion 41a is provided in the slot 5 at the left in the circumferential direction, and the second slot-accommodated portion 41b is provided in the slot 5 at the right in the circumferential direction.

As shown in FIG. 4, in the slot 5 in which the first slot-accommodated portion 41a is provided, the first slot-accommodated portion inner-side conductive wire 41a1 is located on the radially inner side and the first slot-accommodated portion outer-side conductive wire 41a2 is located on the radially outer side.

In the slot 5 in which the second slot-accommodated portion 41b is provided, the second slot-accommodated portion inner-side conductive wire 41b1 is located on the radially inner side and the second slot-accommodated portion outer-side conductive wire 41b2 is located on the radially outer side.

As shown in FIG. 4, the positional relationship in the radial direction between the conductive wires in each slot-accommodated portion of the unit coil 4 is as follows.

In the radial direction, the position of the second slot-accommodated portion inner-side conductive wire 41b1 is shifted outward from the position of the first slot-accommodated portion inner-side conductive wire 41a1 by one line of the conductive wire 3.

In radial direction, the position of the first slot-accommodated portion outer-side conductive wire 41a2 is shifted outward from the position of the second slot-accommodated portion inner-side conductive wire 41$b$1 by one line of the conductive wire 3.

In the radial direction, the position of the second slot-accommodated portion outer-side conductive wire 41$b$2 is shifted outward from the position of the first slot-accommodated portion outer-side conductive wire 41$a$2 by one line of the conductive wire 3.

In the radial direction, the position of the second slot-accommodated portion outer-side conductive wire 41$b$2 is shifted outward from the position of the first slot-accommodated portion inner-side conductive wire 41$a$1 by three lines of the conductive wire 3.

A gap in which one line of the conductive wire 3 can be inserted is present between the first slot-accommodated portion inner-side conductive wire 41$a$1 and the first slot-accommodated portion outer-side conductive wire 41$a$2, and between the first slot-accommodated portion outer-side conductive wire 41$a$2 and the back yoke 22.

Also, a gap in which one line of the conductive wire 3 can be inserted is present between the second slot-accommodated portion inner-side conductive wire 41$b$1 and the second slot-accommodated portion outer-side conductive wire 41$b$2.

As shown in FIG. 3, the unit coil 4 has a first terminal wire 42$a$ extending from the first slot-accommodated portion outer-side conductive wire 41$a$2, and a second terminal wire 42$b$ extending from the second slot-accommodated portion outer-side conductive wire 41$b$2.

On the terminal side where the terminal wires 42$a$ and 42$b$ are present, a coil end portion (referred to as a terminal-side coil end portion) 42$c$ connecting the first slot-accommodated portion inner-side conductive wire 41$a$1 and the second slot-accommodated portion inner-side conductive wire 41$b$1, is provided.

On the anti-terminal side, a coil end portion (referred to as a first anti-terminal-side coil end portion) 43$a$ connecting the first slot-accommodated portion outer-side conductive wire 41$a$2 and the second slot-accommodated portion inner-side conductive wire 41$b$1, and a coil end portion (referred to as a second anti-terminal-side coil end portion) 43$b$ connecting the first slot-accommodated portion inner-side conductive wire 41$a$1 and the second slot-accommodated portion outer-side conductive wire 41$b$2, are provided.

Figure 5:
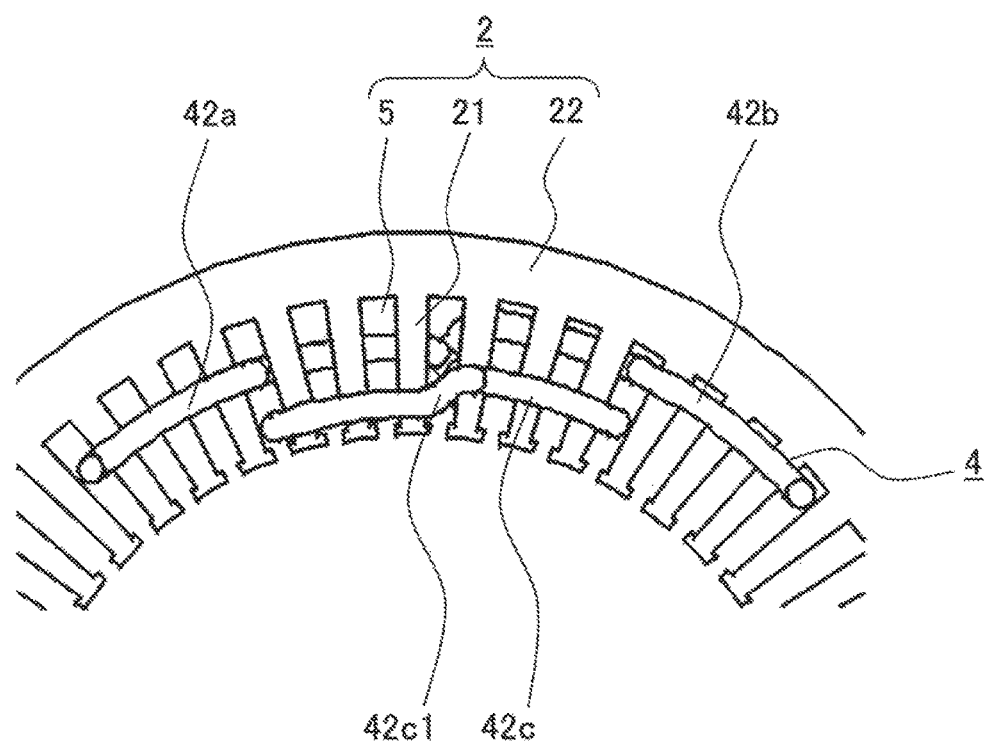
FIG. 5 is a partial schematic view of a terminal side end surface of the stator core in which one unit coil is arranged, according to embodiment 1 of the present invention.

FIG. 5 is a partial schematic view of the terminal-side end surface of the stator core in which one unit coil is arranged, according to embodiment 1 of the present invention.

Figure 6:
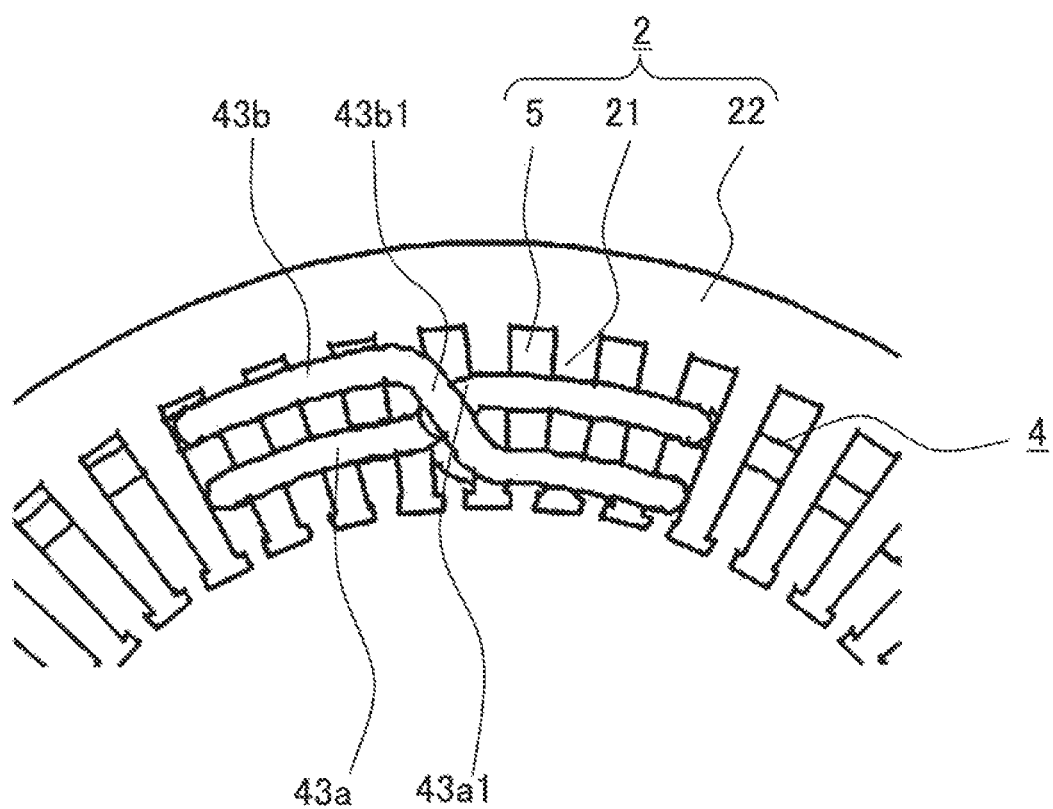
FIG. 6 is a partial schematic view of an anti-terminal side end surface of the stator core in which one unit coil is arranged, according to embodiment 1 of the present invention.

FIG. 6 is a partial schematic view of the anti-terminal-side end surface of the stator core in which one unit coil is arranged, according to embodiment 1 of the present invention.

As shown in FIG. 5, the terminal-side coil end portion 42$c$ has a lane change portion 42$c$1 for adjusting the shifting of the second slot-accommodated portion inner-side conductive wire 41$b$1 radially outward from the first slot-accommodated portion inner-side conductive wire 41$a$1 by one line of the conductive wire 3. That is, the lane change portion 42$c$1 crosses the width of one line of the conductive wire 3 in the radial direction.

As shown in FIG. 6, the first anti-terminal-side coil end portion 43$a$ has a lane change portion 43$a$1 for adjusting the shifting of the first slot-accommodated portion outer-side conductive wire 41$a$2 radially outward from the second slot-accommodated portion inner-side conductive wire 41$b$1 by one line of the conductive wire 3. That is, the lane change portion 43$a$1 crosses the width of one line of the conductive wire 3 in the radial direction.

In addition, the second anti-terminal-side coil end portion 43$b$ has a lane change portion 43$b$1 for adjusting the shifting of the second slot-accommodated portion outer-side conductive wire 41$b$2 radially outward from the first slot-accommodated portion inner-side conductive wire 41$a$1 by three lines of the conductive wire 3. That is, the lane change portion 43$b$1 crosses the width of three lines of the conductive wire 3 in the radial direction.

The second anti-terminal-side coil end portion 43$b$ is located axially outward with respect to the first anti-terminal-side coil end portion 43$a$, and crosses the first anti-terminal-side coil end portion 43$a$.

The second terminal wire 42$b$ extends from the second slot-accommodated portion outer-side conductive wire 41$b$2 positioned on the radially outermost side, and the first terminal wire 42$a$ extends from the first slot-accommodated portion outer-side conductive wire 41$a$2 at a position shifted inward from the radially outermost side by one line of the conductive wire 3.

In the present embodiment, the first terminal wire 42$a$ extends from the first slot-accommodated portion outer-side conductive wire 41$a$2, the second terminal wire 42$b$ extends from the second slot-accommodated portion outer-side conductive wire 41$b$2, and the terminal-side coil end portion 42$c$ connects the first slot-accommodated portion inner-side conductive wire 41$a$1 and the second slot-accommodated portion inner-side conductive wire 41$b$1.

However, the first terminal wire 42$a$ may extend from the first slot-accommodated portion inner-side conductive wire 41$a$1, the second terminal wire 42$b$ may extend from the second slot-accommodated portion inner-side conductive wire 41$b$1, and the terminal-side coil end portion 42$c$ may connect the first slot-accommodated portion outer-side conductive wire 41$a$2 and the second slot-accommodated portion outer-side conductive wire 41$b$2.

In the present embodiment, in the unit coil 4, the first slot-accommodated portion 41$a$ and the second slot-accommodated portion 41$b$ are each formed of two lines of the conductive wire 3. However, the number of lines of the conductive wire forming each slot-accommodated portion may be n within a range that allows formation of the stator coil. Here, n is an integer not less than 2.

In this case, the unit coil has (n−1) number of terminal-side coil end portions, (n−1) number of first anti-terminal-side coil end portions, and one second anti-terminal-side coil end portion.

The terminal-side coil end portions and the first anti-terminal-side coil end portions each have a lane change portion crossing the width of one line of the conductive wire. That is, the terminal-side coil end portions and the first anti-terminal-side coil end portions each connect the first slot-accommodated portion conductive wire and the second slot-accommodated portion conductive wire that are shifted from each other by one line of the conductive wire in the radial direction.

The second anti-terminal-side coil end portion has a lane change portion crossing the width of (2n−1) lines of the conductive wire. That is, the second anti-terminal-side coil end portion connects the first slot-accommodated portion conductive wire and the second slot-accommodated portion conductive wire that are shifted from each other by (2n−1) lines of the conductive wire in the radial direction.

The second anti-terminal-side coil end portion is located axially outward with respect to the first anti-terminal-side coil end portions, and crosses (n−1) number of the first anti-terminal-side coil end portions 43$a$.

The second terminal wire extends from the second slot-accommodated portion conductive wire positioned on the radially outermost side, and the first terminal wire extends from the first slot-accommodated portion conductive wire at a position shifted inward by one line of the conductive wire 3 in the radial direction from the second slot-accommodated portion conductive wire positioned on the radially outermost side.

However, the first terminal wire may extend from the first slot-accommodated portion conductive wire positioned on the radially innermost side, and the second, terminal wire may extend from the second slot-accommodated portion conductive wire at a position shifted outward by one line of the conductive wire 3 in the radial direction from the first slot-accommodated portion conductive wire positioned on the radially innermost side.

The conductive wires extending from the terminal wires are not connected in the terminal-side coil end portion.

The first terminal wire and the second terminal wire are shifted from each other by one line of the conductive wire in the radial direction.

Next, as a comparative example, a conventional unit coil disclosed in Patent Document 1 will be described.

Figure 7:
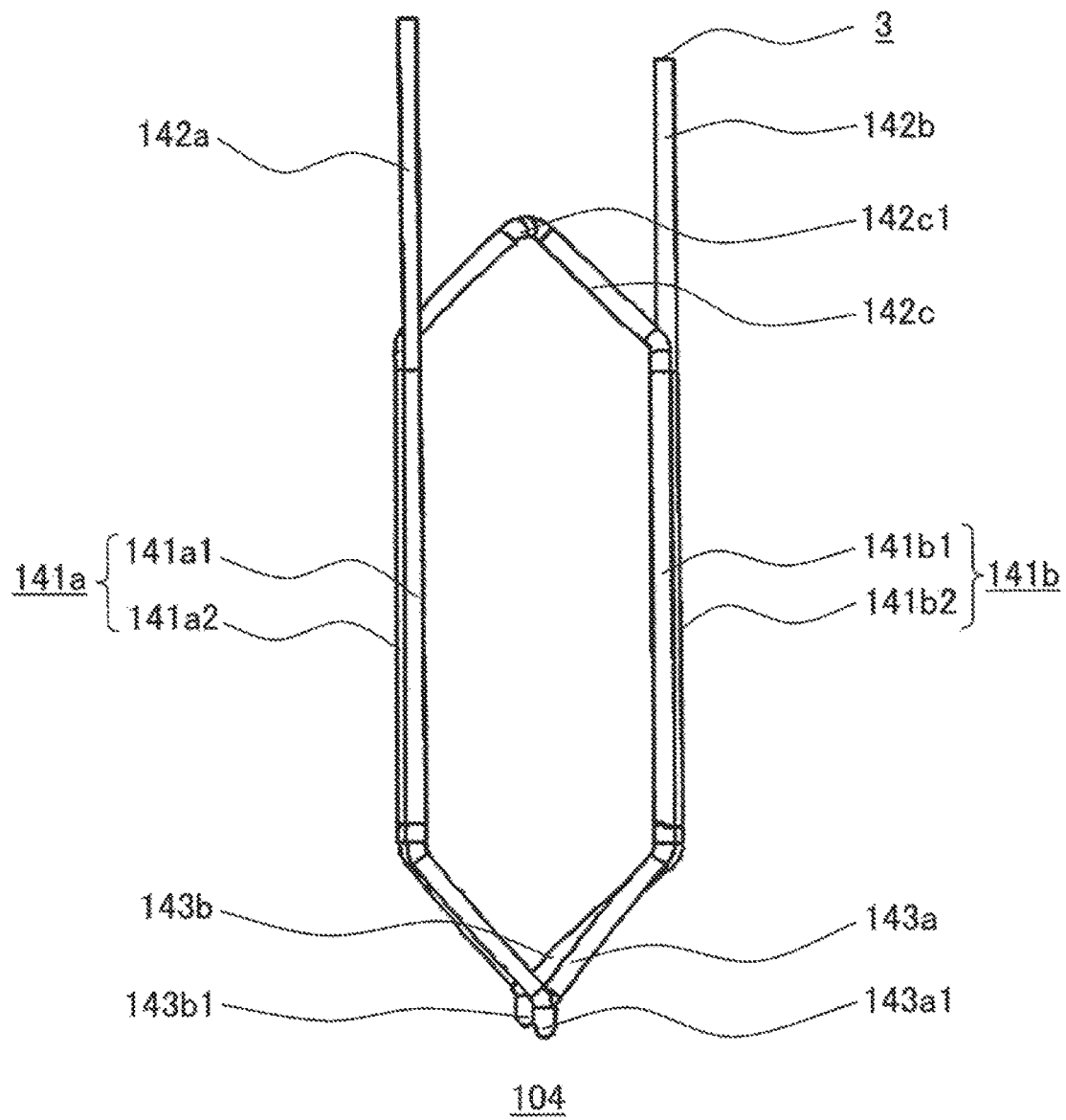
FIG. 7 is a schematic front view of a conventional unit coil.

FIG. 7 is a schematic front view of the conventional unit coil.

As shown in FIG. 7, the conventional unit coil 104 is also formed by winding one conductive wire in a lap winding manner, and includes a first slot-accommodated portion 141a, a second slot-accommodated portion 141b, a coil end portion connecting the slot-accommodated portions, and terminal wires extending from the respective slot-accommodated portions.

The first slot-accommodated portion 141a is formed by two conductive wires comprising a first slot-accommodated portion inner-side conductive wire 141a1 on the near side on the drawing plane in FIG. 7, and a first slot-accommodated portion outer-side conductive wire 141a2 on the far side on the drawing plane in FIG. 7.

The second slot-accommodated portion 141b is formed by two conductive wires comprising a second slot-accommodated portion inner-side conductive wire 141b1 on the near side on the drawing plane in FIG. 7, and a second slot-accommodated portion outer-side conductive wire 141b2 on the far side on the drawing plane in FIG. 7.

As coil end portions, there are a first anti-terminal-side coil end portion 143a connecting the first slot-accommodated portion inner-side conductive wire 141a1 and the second slot-accommodated portion inner-side conductive wire 141b1, a terminal-side coil end portion 142c connecting the second slot-accommodated portion inner-side conductive wire 141b1 and the first slot-accommodated portion outer-side conductive wire 141a2, and a second anti-terminal-side coil end portion 143b connecting the first slot-accommodated portion outer-side conductive wire 141a2 and the second slot-accommodated portion outer-side conductive wire 141b2.

The terminal-side coil end portion 142c has a lane change portion 142c1 crossing the width of one line of the conductive wire 3 in the radial direction. The first anti-terminal-side coil end portion 143a has a lane change portion 143a1 crossing the width of one line of the conductive wire 3 in the radial direction. The second anti-terminal-side coil end portion 143b has a lane change portion 143b1 crossing the width of one line of the conductive wire 3 in the radial direction.

In the radial direction, the position of the second slot-accommodated portion outer-side conductive wire 141b2 is shifted outward from the position of the first slot-accommodated portion inner-side conductive wire 141a1 by three lines of the conductive wire 3.

As terminal wires, there are a first terminal wire 142a extending from the first slot-accommodated portion inner-side conductive wire 141a1, and a second terminal wire 142b extending from the second slot-accommodated portion outer-side conductive wire 141b2. That is, in the radial direction, the position of the first terminal wire 142a and the position of the second terminal wire 142b are shifted from each other by three lines of the conductive wire 3.

Figure 8:
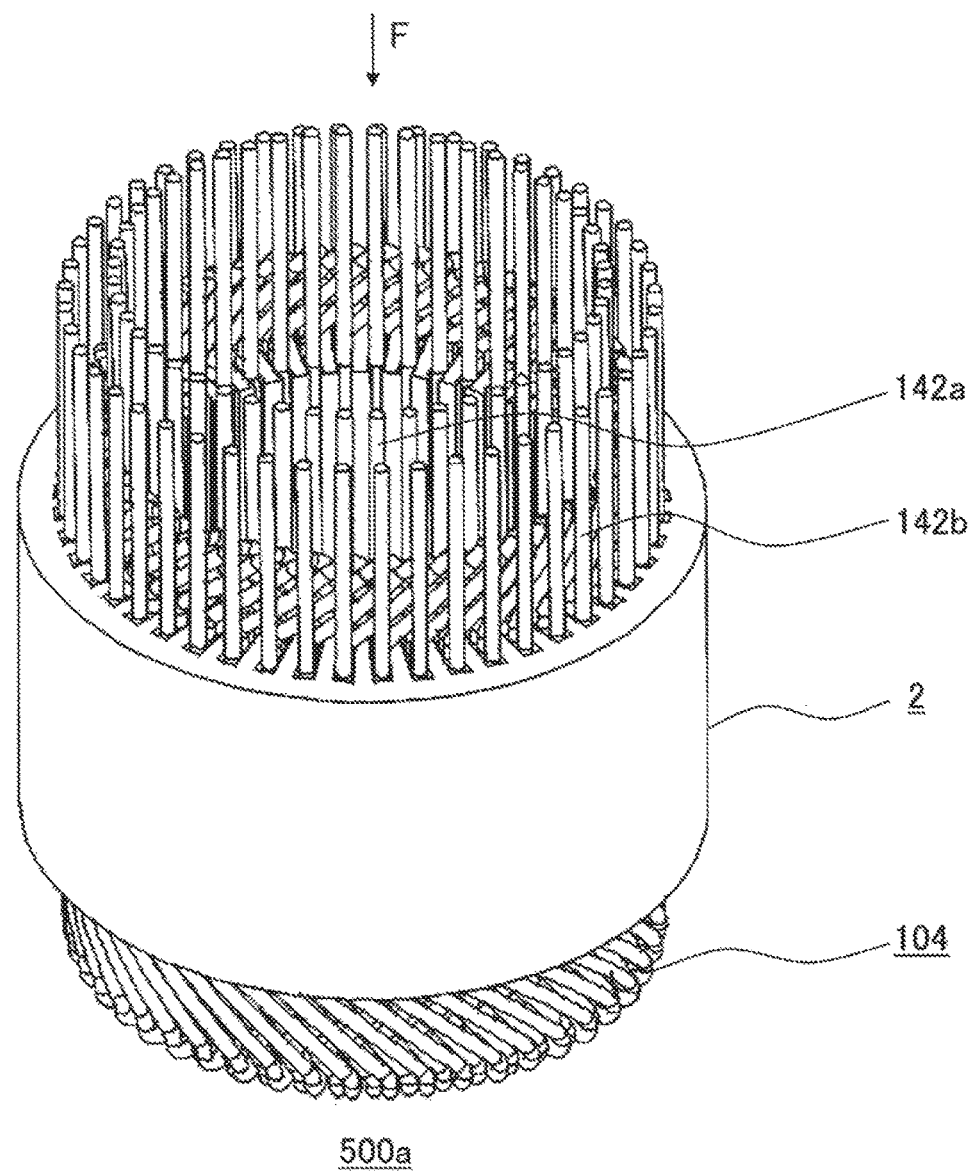
FIG. 8 is a schematic perspective view of a stator intermediate in which unit coils of a comparative example are mounted to a stator core.

FIG. 8 is a schematic perspective view of a stator intermediate in which the unit coil of the comparative example is mounted to the stator core.

Figure 9:
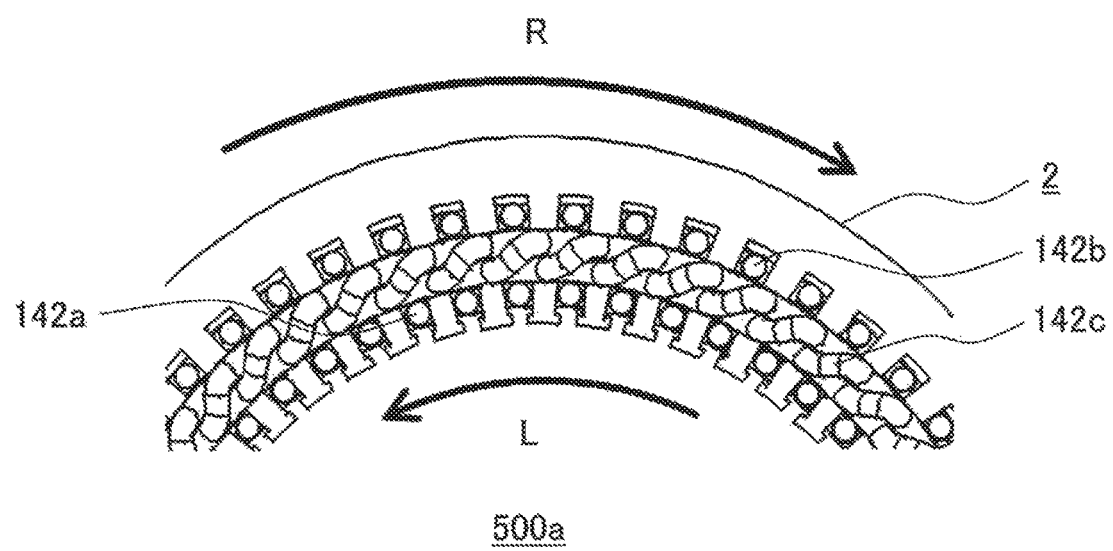
FIG. 9 is a partial schematic end surface view of the stator intermediate in FIG. 8 as seen from a direction indicated by arrow F.

FIG. 9 is a partial schematic end surface view of the stator intermediate in FIG. 8 as seen from a direction indicated by arrow F.

In the stator intermediate shown in FIG. 8 and FIG. 9, each terminal wire is not joined with a terminal wire of another unit coil.

In a stator 500 of the comparative example described later, the first terminal wire 142a of one unit coil 104 is joined with the second terminal wire 142b of the unit coil 104 separated from the first terminal wire 142a with, for example, five slots therebetween in the counterclockwise circumferential direction, and the second terminal wire 142b is joined with the first terminal wire 142a of the unit coil 104 separated from the second terminal wire 142b with, for example, five slots therebetween in the clockwise circumferential direction.

In the stator intermediate 500a shown in FIG. 8 and FIG. 9, the first terminal wire 142a of each unit coil 104 and the second terminal wire 142b of another unit coil 104 to be joined with the first terminal wire 142a are not located at the positions opposing to each other in the radial direction.

Accordingly, in order to join the first terminal wire 142a of each unit coil 104 and the second terminal wire 142b of another unit coil 104, first, the first terminal wire 142a of the unit coil 104 is bent in the counterclockwise direction indicated by arrow L in FIG. 9. At this time, the bent first terminal wire 142a is formed into an arc shape substantially parallel with the inner circumferential surface of the stator core 2.

The inner circumferential surface of the stator core 2 is a surface opposing to the outer circumferential surface of a rotor to be provided when the rotary electric machine is formed.

In addition, the second terminal wire 142b of the unit coil 104 is bent in the clockwise direction indicated by arrow R in FIG. 9. At this time, the bent second terminal wire 142b is formed into an arc shape substantially parallel with the inner circumferential surface of the stator core 2.

The bending of the first terminal wires 142a and the bending of the second terminal wires 142b are performed at the same time for all the unit coils 104.

Figure 10:
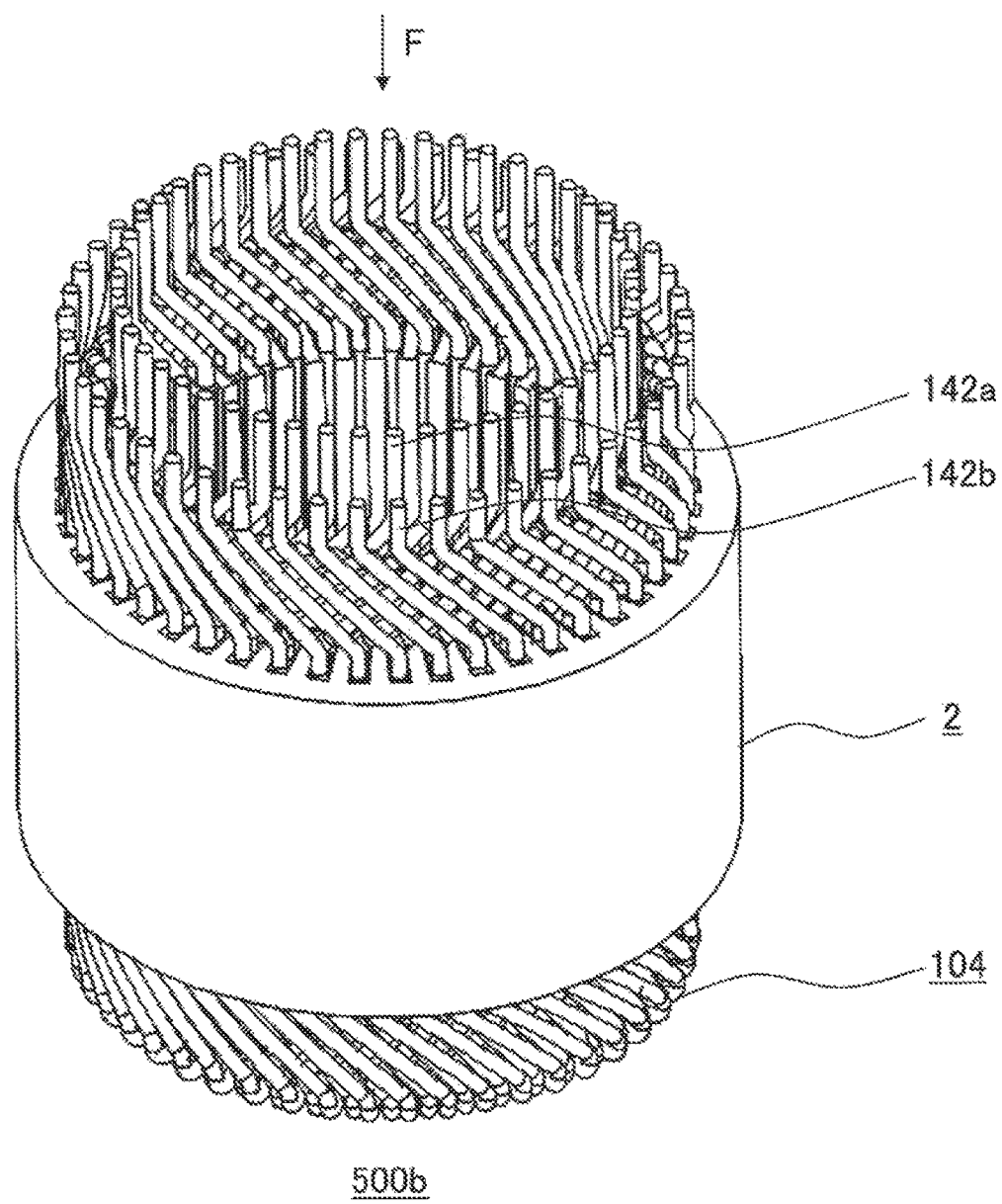
FIG. 10 is a schematic perspective view showing the stator intermediate in which a first terminal wire and a second terminal wire to be joined with each other, of each unit coil of the comparative example, are opposed to each other in the radial direction.

FIG. 10 is a schematic perspective view showing the stator intermediate in which each first terminal wire and each second terminal wire to be joined with each other, of the unit coils of the comparative example, are opposed to each other in the radial direction.

Figure 11:
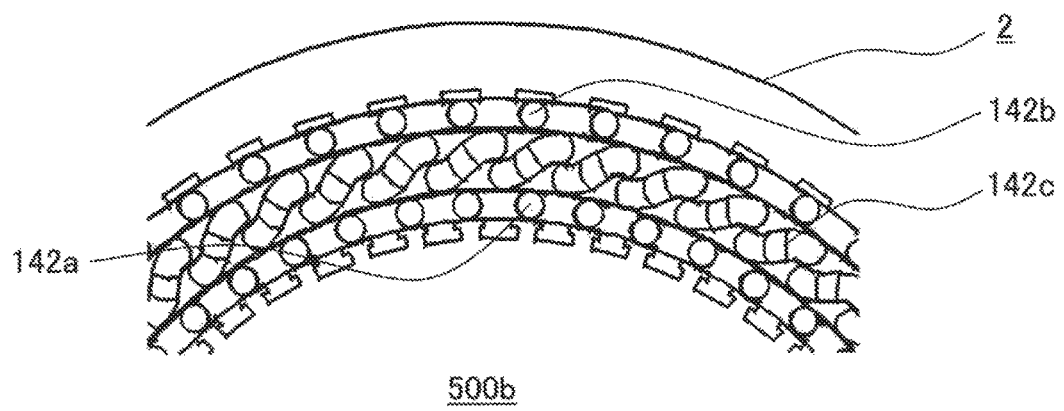
FIG. 11 is a partial schematic end surface view of the stator intermediate in FIG. 10 as seen from a direction indicated by arrow F.

FIG. 11 is a partial schematic end surface view of the stator intermediate in FIG. 10 as seen from a direction indicated by arrow F.

In the stator intermediate 500b shown in FIG. 10 and FIG. 11, the first terminal wire 142a of each unit coil 104 and the second terminal wire 142b of another unit coil 104 are located at the positions opposing to each other in the radial direction.

However, each first terminal wire 142a is located away in the radial direction from the second terminal wire 142b of another unit coil 104. Therefore, in order to join the first terminal wire 142a and the second terminal wire 142b, at least one terminal wire of the first terminal wire 142a and the second terminal wire 142b needs to be bent in the radial direction so that the terminal wires are gathered.

Figure 12:
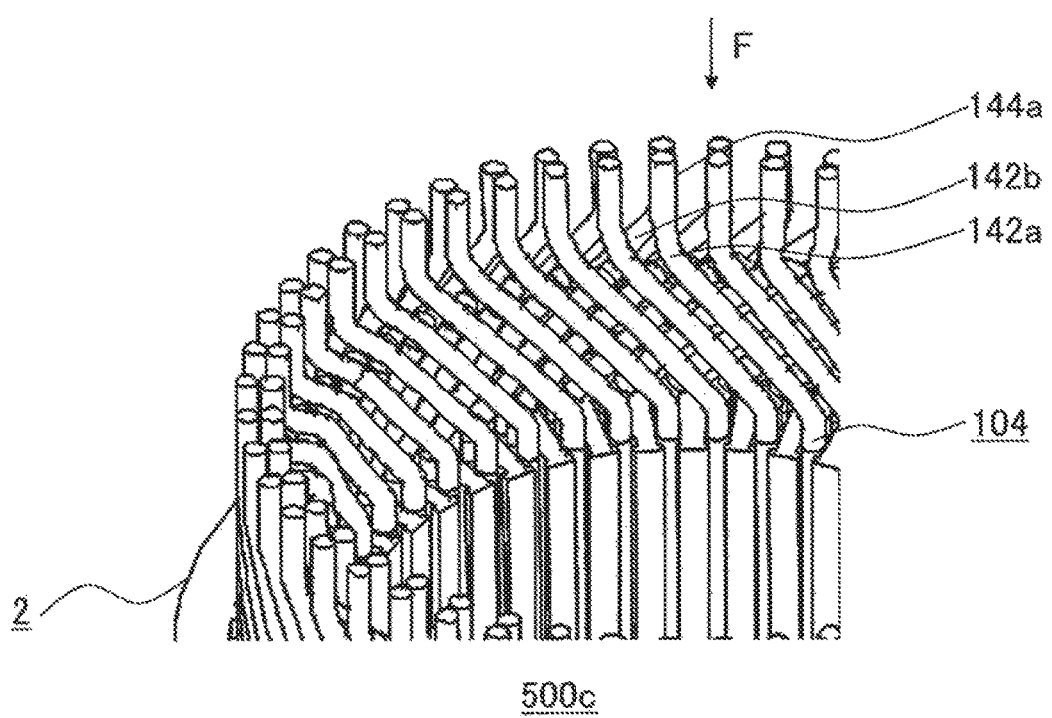
FIG. 12 is a partial schematic perspective view showing the stator intermediate in which the first terminal wire of each unit coil of the comparative example is brought to be gathered with the second terminal wire.

FIG. 12 is a partial schematic perspective view showing the stator intermediate in which the first terminal wire of each unit coil of the comparative example is brought to be gathered with the second terminal wire.

Figure 13:
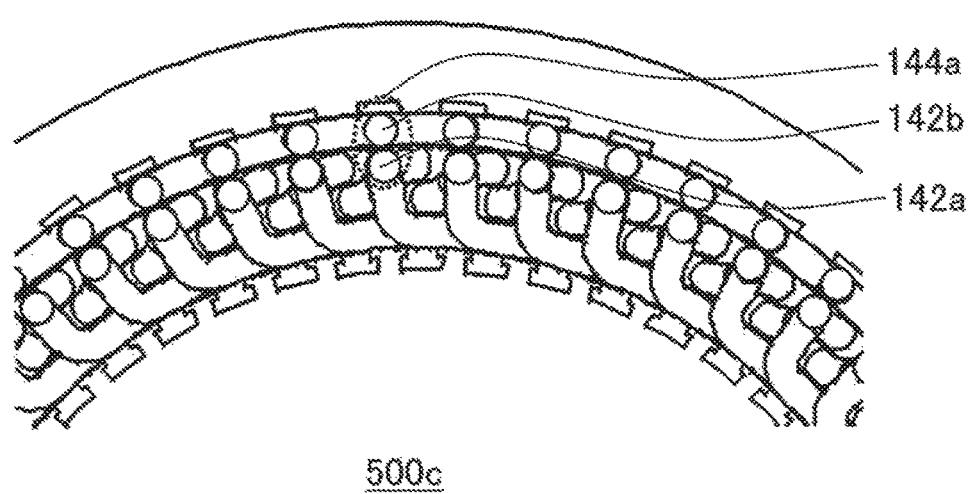
FIG. 13 is a partial schematic end surface view of the stator intermediate in FIG. 12 as seen from a direction indicated by arrow F.

FIG. 13 is a partial schematic end surface view of the stator intermediate in FIG. 12 as seen from a direction indicated by arrow F.

Figure 14:
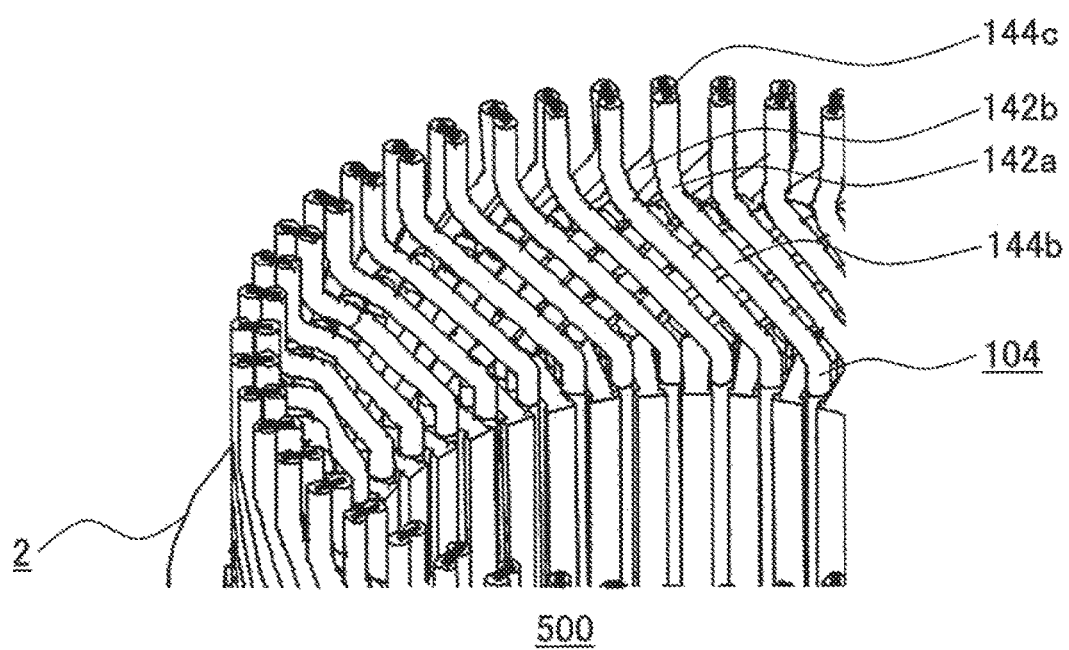
FIG. 14 is a partial schematic perspective view showing the stator of the comparative example.

FIG. 14 is a partial schematic perspective view showing the stator of the comparative example.

In the stator intermediate 500c in which the first terminal wire 142a of each unit coil of the comparative example is brought to be gathered with the second terminal wire 142b as shown in FIG. 12 and FIG. 13, gathered portions 144a are joined by welding, and the stator 500 of the comparative example as shown in FIG. 14 is obtained.

In FIG. 14, welded portions 144c are top portions of the first terminal wire 142a and the second terminal wire 142b. However, without limitation thereto, the welded portions 144c may be any parts of the gathered portions 144a.

In the stator coil of the stator 500 of the comparative example, at least one terminal wire of the first terminal wire 142a and the second terminal wire 142b crosses over the terminal-side coil end portion. That is, the stator coil has a crossing portion 144b.

Next, mounting of the unit coil and connection of the terminal wires in the stator 100 of the present embodiment will be described.

Figure 15:
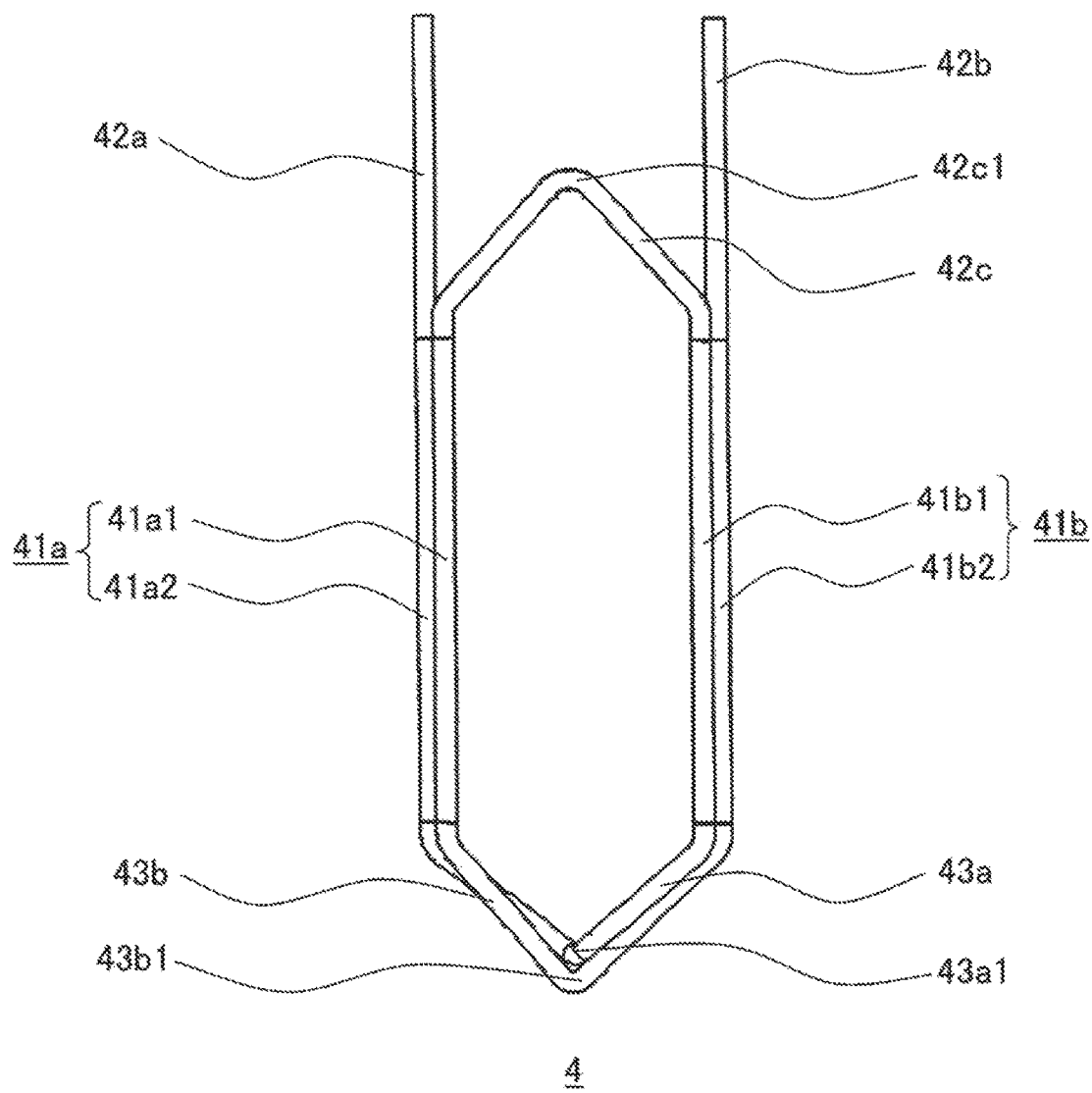
FIG. 15 is a schematic view showing the unit coil according to embodiment 1 of the present invention in the state in which the unit coil is not yet mounted to the stator core.

FIG. 15 is a schematic view showing the unit coil according to embodiment 1 of the present invention in the state in which the unit coil is not yet mounted to the stator core.

First, the unit coil 4 having the first terminal wire 42a extending from the first slot-accommodated portion outer-side conductive wire 41a2 without being bent, and the second terminal wire 42b extending from the second slot-accommodated portion outer-side conductive wire 41b2 without being bent as shown in FIG. 15 is mounted to the stator core 2.

Figure 16:
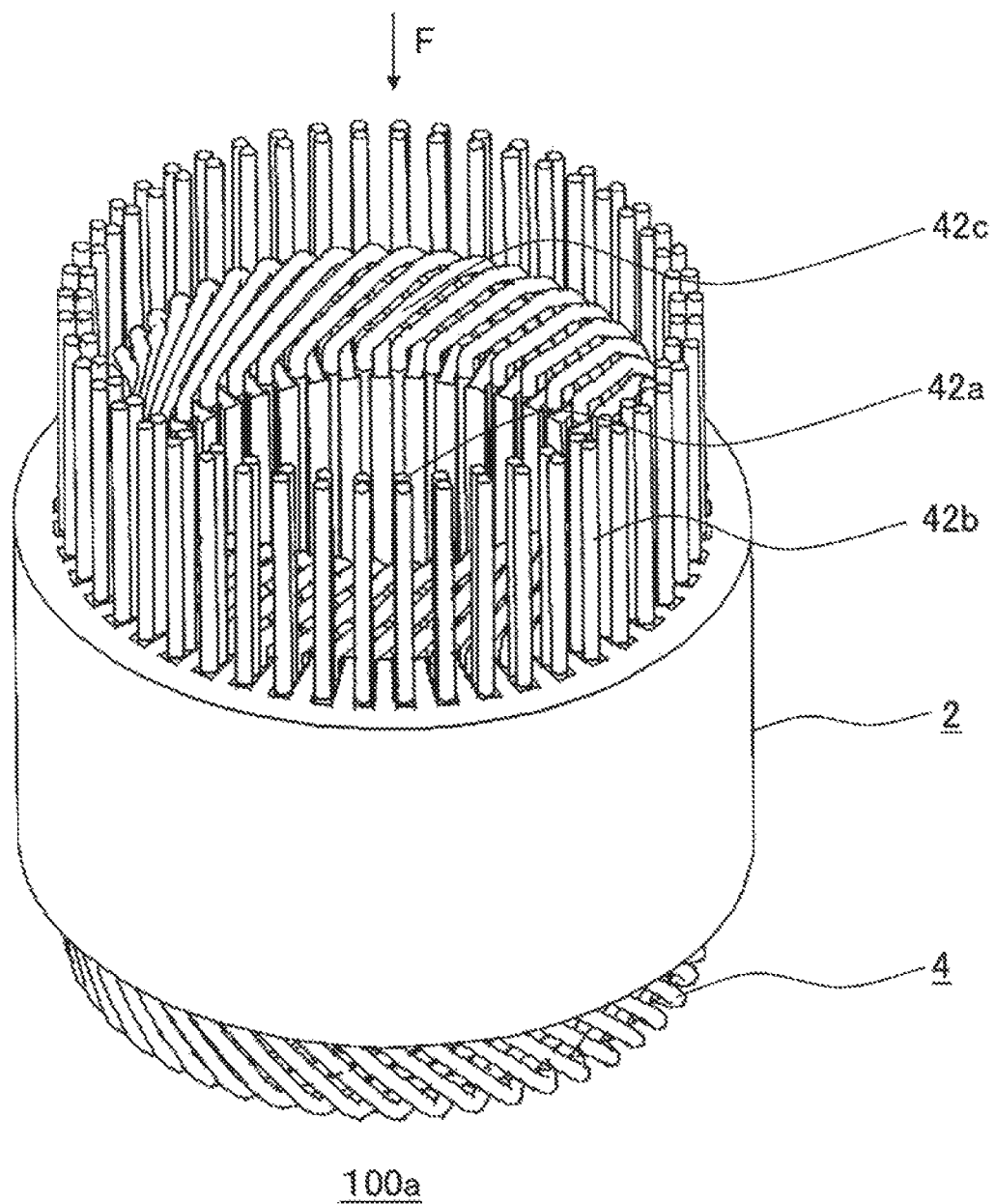
FIG. 16 is a schematic perspective view of a stator intermediate to which the unit coils having the terminal wires that are not bent are mounted, according to embodiment 1 of the present invention.

FIG. 16 is a schematic perspective view of a stator intermediate to which the unit coils having the terminal wires that are not bent are mounted, according to embodiment 1 of the present invention.

Figure 17:
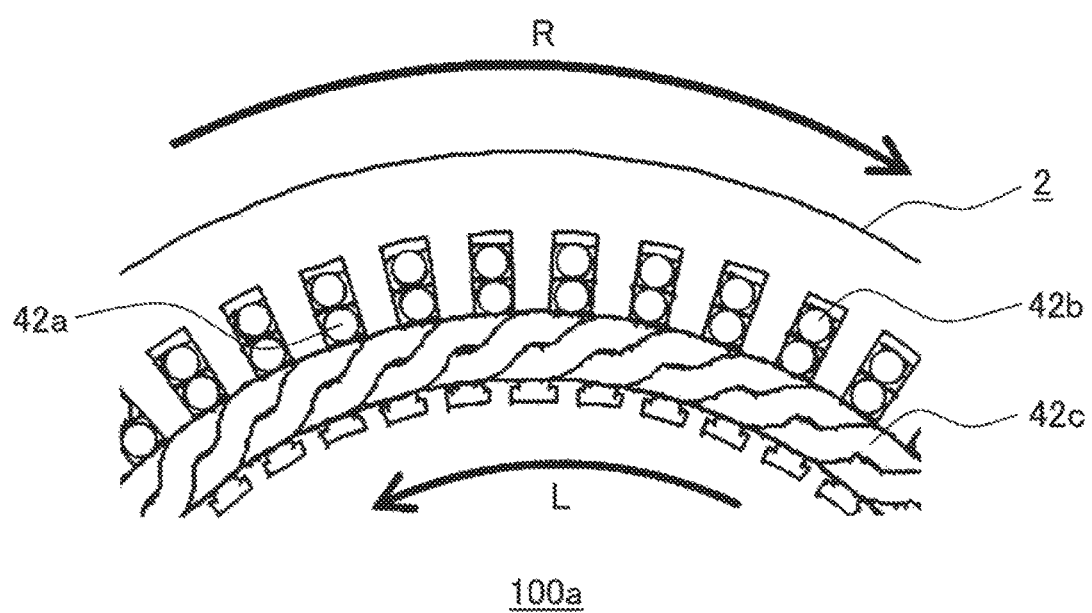
FIG. 17 is a partial schematic end surface view of the stator intermediate in FIG. 16 as seen from a direction indicated by arrow F.

FIG. 17 is a partial schematic end surface view of the stator intermediate in FIG. 16 as seen from a direction indicated by arrow F.

As shown in FIG. 16, a plurality of the unit coils 4 are mounted to the stator core 2. At this time, between the conductive wires of the slot-accommodated portion of each unit coil 4, conductive wires of the slot-accommodated portion of another unit coil 4 are inserted.

FIG. 16 and FIG. 17 show the state in which each terminal wire is not joined with the terminal wire of another unit coil.

Also in the stator 100 of the present embodiment, the first terminal wire 42a of one unit coil 4 is joined with the second terminal wire 42b of another unit coil 4 separated from the first terminal wire 42a with, for example, five slots therebetween in the counterclockwise circumferential direction, and the second terminal wire 42b of one unit coil 4 is joined with the first terminal wire 42a of another unit coil 4 separated from the second terminal wire 42b with, for example, five slots therebetween in the clockwise circumferential direction.

In the stator intermediate 100a to which the unit coils 4 are mounted as shown in FIG. 16, the first terminal wire 42a of each unit coil 4 and the second terminal wire 42b of another unit coil 4 to be joined with the first terminal wire 42a are not located at positions opposing to each other in the radial direction.

Accordingly, in order to join the first terminal wire 42a of each unit coil 4 and the second terminal wire 42b of another unit coil 4, first, the first terminal wire 42a of the unit coil 4 is bent in the counterclockwise direction indicated by arrow L as shown in FIG. 17. At this time, the bent first terminal wire 42a is formed into an arc shape substantially parallel with the inner circumferential surface of the stator core 2.

In addition, the second terminal wire 42b of the unit coil 4 is bent in the clockwise direction indicated by arrow R as shown in FIG. 17. At this time, the bent second terminal wire 42b is formed into an arc shape substantially parallel with the inner circumferential surface of the stator core 2.

The bending of the first terminal wires 42a and the bending of the second terminal wires 42b are performed at the same time for all the unit coils 4.

Figure 18:
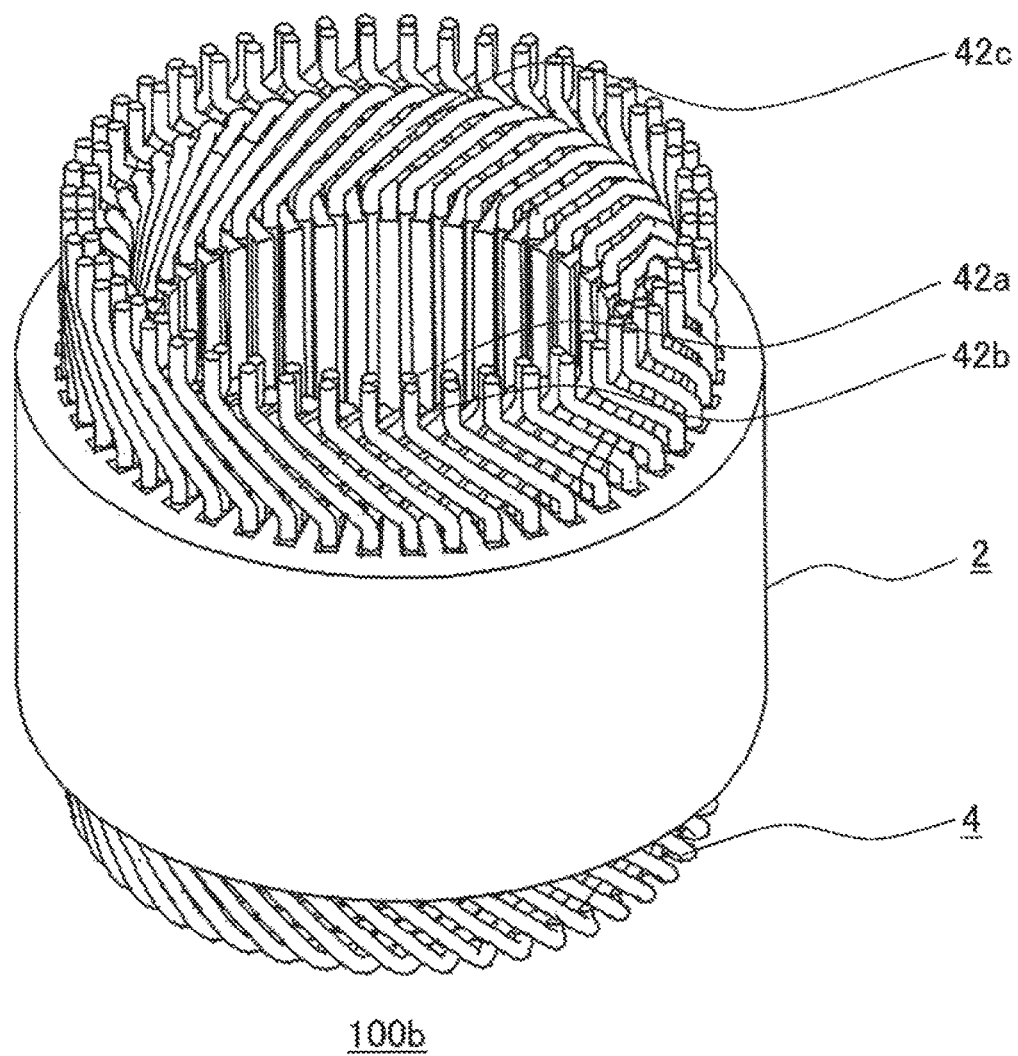
FIG. 18 is a schematic perspective view showing the stator intermediate in which each first terminal wire and each second terminal wire to be joined with each other, of the unit coils, are opposed to each other in the radial direction, according to embodiment 1 of the present invention.

FIG. 18 is a schematic perspective view showing the stator intermediate in which each first terminal wire and each second terminal wire to be joined with each other, of the unit coils, are opposed to each other in the radial direction, according to embodiment 1 of the present invention.

Figure 19:
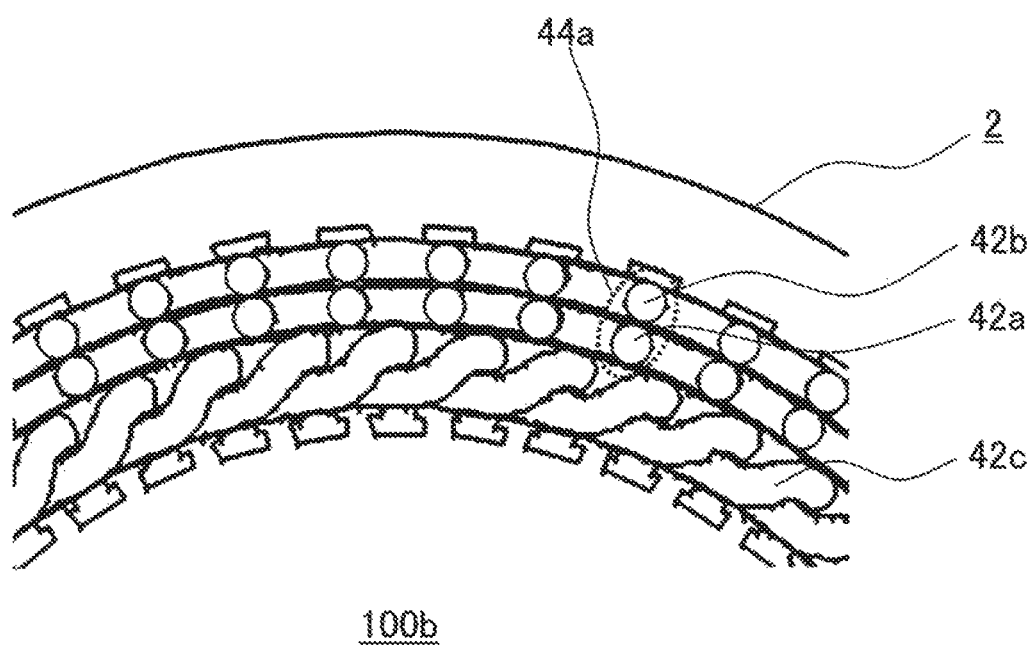
FIG. 19 is a partial schematic end surface view of the stator intermediate in FIG. 18 as seen from a direction indicated by arrow F.

FIG. 19 is a partial schematic end surface view of the stator intermediate in FIG. 18 as seen from a direction indicated by arrow F.

In the stator intermediate 100b shown in FIG. 18 and FIG. 19, the first terminal wire 42a of each unit coil 4 and the second terminal wire 42b of another unit coil 4 to be joined with the first terminal wire 42a are located at the positions opposing to each other in the radial direction.

In addition, the first terminal wire 42a of each unit coil 4 and the second terminal wire 42b of another unit coil 4 to be joined with the first terminal wire 42a are in contact with each other in the radial direction.

In the first terminal wire 42a of each unit coil 4 and the second terminal wire 42b of another unit coil 4, portions (referred to as contact portions) 44a that are opposed to each other and in contact with each other are joined by welding, and the stator 100 of the present embodiment is obtained.

As shown in FIG. 1, in the stator 100 of the present embodiment, welded portions 44c are top portions of the first terminal wire 42a and the second terminal wire 42b. However, without limitation thereto, the welded portions 44c may be any parts of the contact portions 44a of the first terminal wire 42a and the second terminal wire 42b.

In the stator 100 of the present embodiment, it is not necessary to bend, in the radial direction, at least one terminal wire of the first terminal wire 42a and the second terminal wire 42b to gather the terminal wires. Therefore, the number of times for bending the conductive wire 3 forming the coil is decreased and the number of processes in manufacturing of the stator is decreased, whereby the productivity is improved.

In addition, since the number of times for bending the conductive wire 3 is decreased, the frequency at which the insulation film of the conductive wire 3 is impaired can be reduced and the coil is less damaged. Thus, the insulation reliability of the stator is enhanced.

Figure 20:
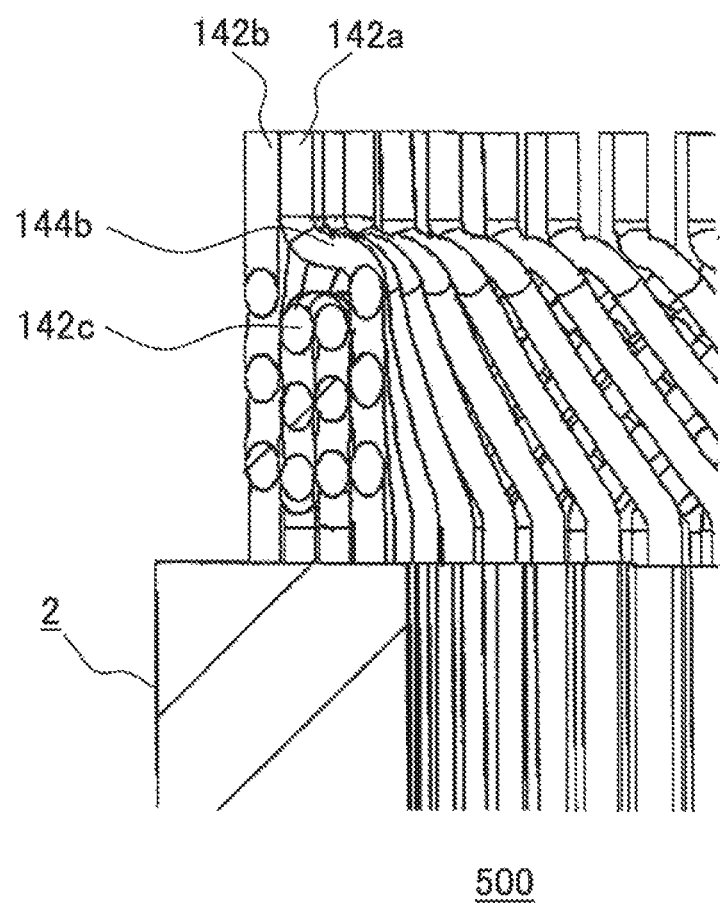
FIG. 20 is a partial schematic view showing a cross section along a direction perpendicular to the circumferential direction of the stator of the comparative example.

FIG. 20 is a partial schematic view showing a cross section along a direction perpendicular to the circumferential direction of the stator of the comparative example.

Figure 21:
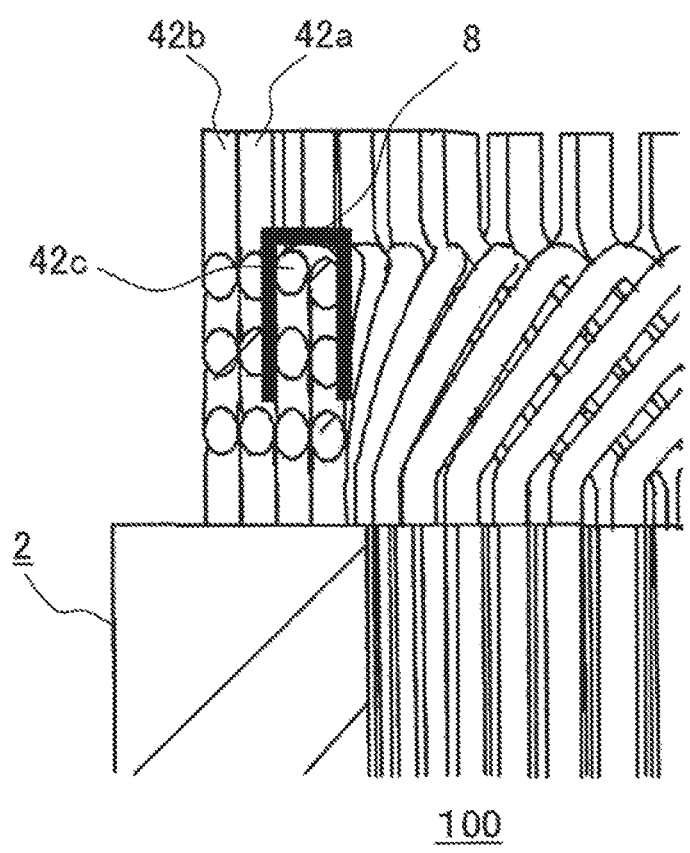
FIG. 21 is a partial schematic view showing a cross section along a direction perpendicular to the circumferential direction of the stator according to embodiment 1 of the present invention.

FIG. 21 is a partial schematic view showing a cross section along a direction perpendicular to the circumferential direction of the stator according to embodiment 1 of the present invention.

FIG. 20 and FIG. 21 both show the terminal side of the stator.

As shown in FIG. 20, in the stator 500 of the comparative example, the first terminal wire 142a is bent to be gathered with the second terminal wire 142b, whereby the crossing portion 144b is formed.

That is, because of presence of the crossing portion 144b, it is impossible to provide a cover for protecting the terminal-side coil end portion 142c during welding.

Therefore, there is a possibility that, when the first terminal wire 142a and the second terminal wire 142b are joined by welding, sputter adheres to the terminal-side coil end portion 142c, as a result, the insulation quality of the coil deteriorates.

However, as shown in FIG. 21, in the stator 100 of the present embodiment, since there is no crossing portion, welding can be performed with the terminal-side coil end portion 42c covered with a cover 8. Therefore it is possible to prevent sputter from adhering to the terminal-side coil end portion 42c.

That is, it is possible to prevent the insulation quality of the coil from being deteriorated by sputter in welding, and thus the reliability is enhanced.

In addition, since there is no crossing portion in the stator of the present embodiment, the height of the coil end can be reduced by an amount corresponding to the crossing portion.

In the present embodiment, a round wire is used as the conductive wire. However, instead of the round wire, a rectangular wire may be used.

In the present embodiment, the slot 5 in which the second slot-accommodated portion 41b is provided is located at a position separated from the slot 5 in which the first slot-accommodated portion 41a is provided, with a predetermined number of teeth therebetween in the clockwise circumferential direction. However, the slot 5 in which the second slot-accommodated portion 41b is provided may be located at a position separated from the slot 5 in which the first slot-accommodated portion 41a is provided, with a predetermined number of teeth therebetween in the counterclockwise circumferential direction.

That is, in the stator core, the first slot-accommodated portion 41a is accommodated in the slot 5 at one of positions separated from each other with a predetermined number of teeth therebetween in the circumferential direction, and the second slot-accommodated portion 41b is accommodated in the slot 5 at the other position.

Embodiment 2

A stator according to embodiment 2 of the present invention includes stator coils formed as a coil basket, and a stator core mounted to the stator coils. A unit coil used in the present embodiment has the same shape as the unit coil 4 of embodiment 1, and is formed by winding one conductive wire.

Figure 22:
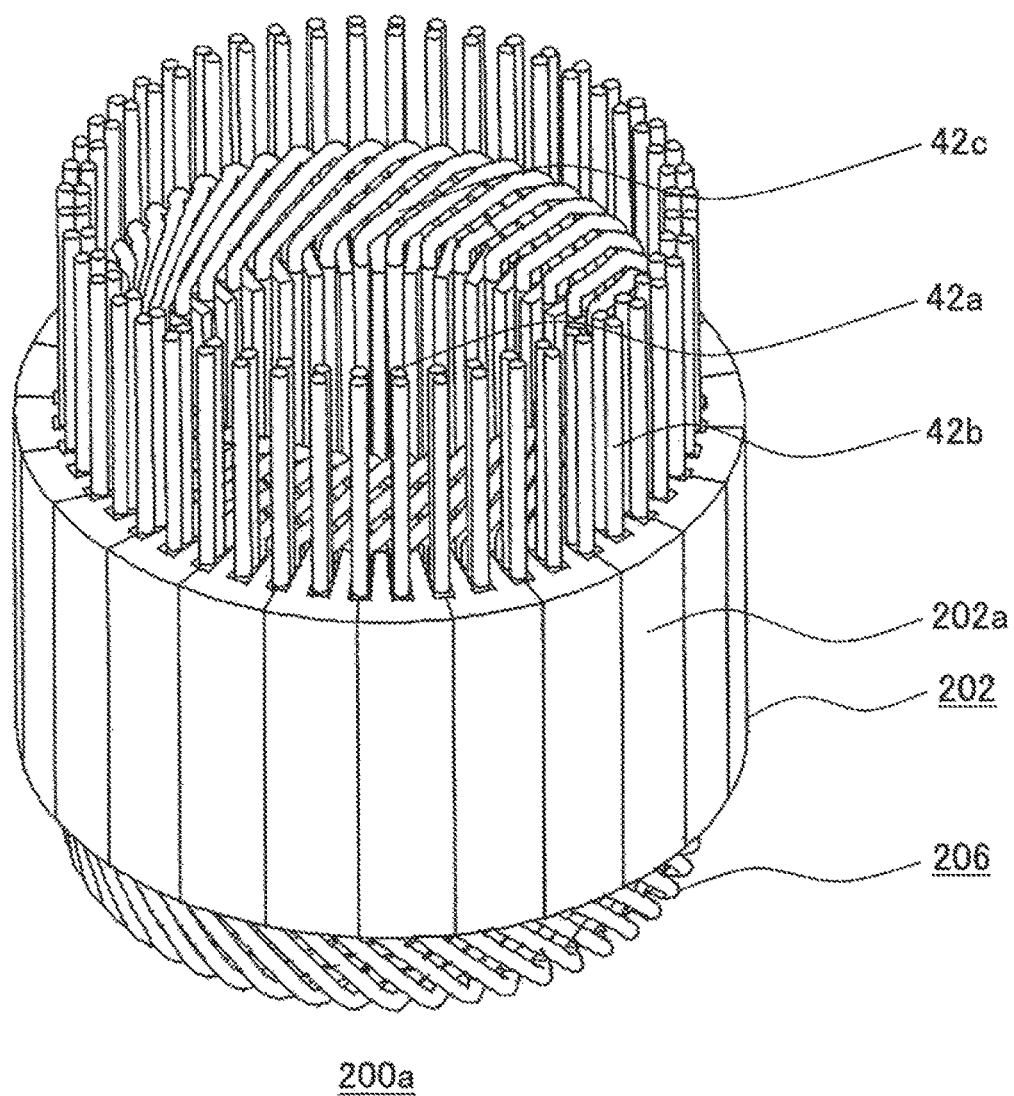
FIG. 22 is a schematic perspective view showing a stator intermediate in which a stator core is mounted to a coil basket, in a stator according to embodiment 2 of the present invention.

FIG. 22 is a schematic perspective view showing a stator intermediate in which the stator core is mounted to the coil basket, in the stator according to embodiment 2 of the present invention.

In the stator intermediate 200a shown in FIG. 22 in which the stator core 202 is mounted to the coil basket 206, each first terminal wire 42a and each second terminal wire 42b have not been bent in the circumferential direction yet and have not been joined by welding or the like yet.

As shown in FIG. 22, the stator core 202 is formed by connecting stator core components 202a in the circumferential direction and arranging them in an annular shape.

Figure 23:
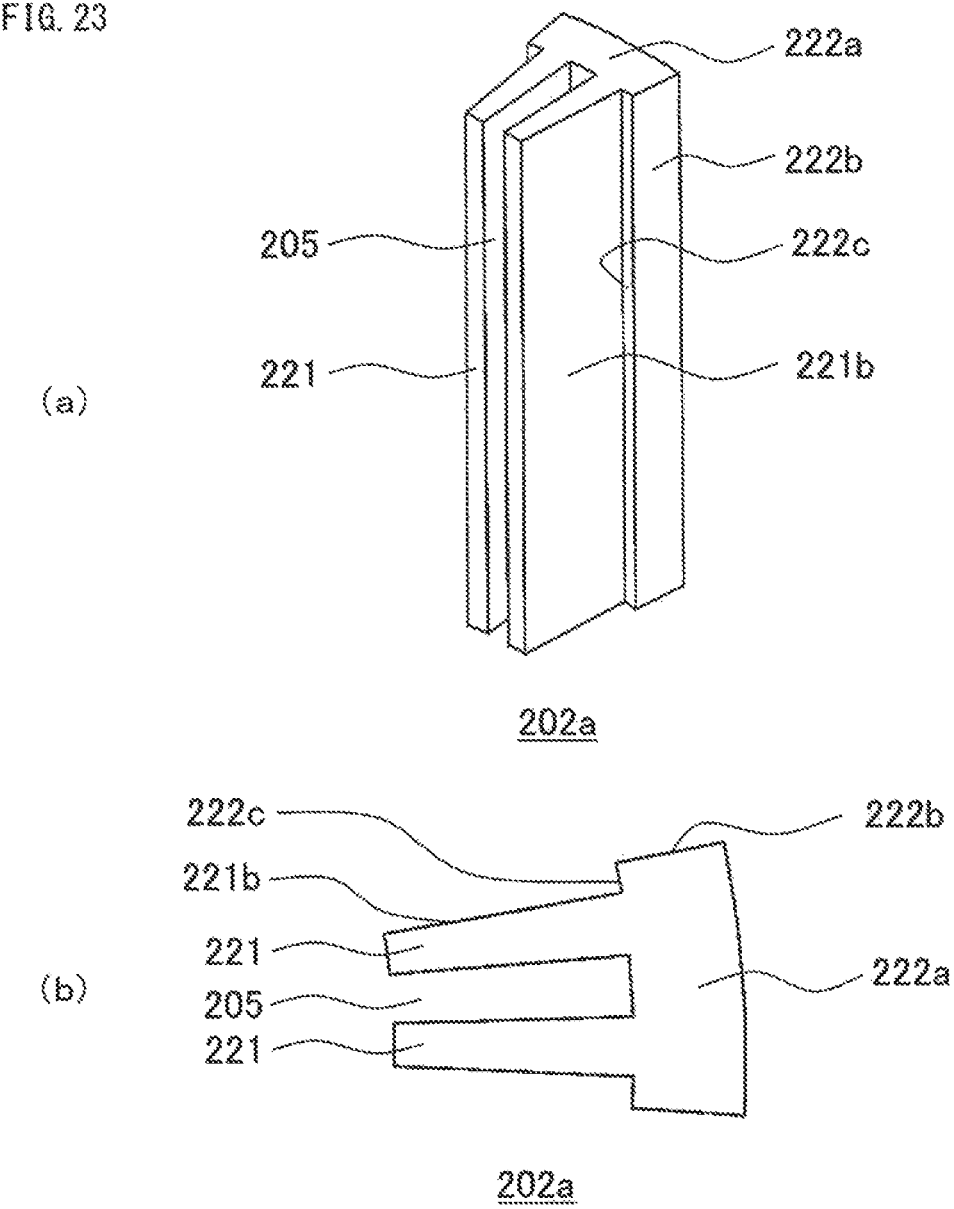
FIG. 23 is a schematic perspective view (a) of a stator core component used for the stator according to embodiment 2 of the present invention, and a schematic view (b) of the end surface of the stator core component in the axial direction.

FIG. 23 is a schematic perspective view (a) of the stator core component used for the stator according to embodiment 2 of the present invention, and a schematic view (b) of the end surface of the stator core component in the axial direction.

As shown in FIG. 23, the stator core component 202a of the present embodiment includes a back yoke forming portion 222a, and two teeth 221 protruding from an inner circumferential surface 222c of the back yoke forming portion 222a. The side surface at the tip end of each tooth 221 is provided with no protruding portion such as a tip end shoe, and the side surfaces in the circumferential direction of each tooth 221 are flat.

The gap between the two teeth 221 is a slot 205.

An end surface (referred to as a tooth circumferential-direction outer-side end surface) 221b on the outer side in the circumferential direction of each tooth 221 is positioned on the inner side in the circumferential direction relative to an end surface (referred to as a back yoke forming portion circumferential-direction end surface) 222b in the circumferential direction of the back yoke forming portion 222a.

The stator core components 202a are joined with each other by causing their back yoke forming portion circumferential-direction end surfaces 222b to come in contact with each other. In the stator core 202 arranging the stator core components 202a in an annular shape, slots 205 are formed also between the tooth circumferential-direction outer-side end surfaces 221b opposing to each other of the teeth 221 of the adjacent stator core components 202a.

Figure 24:
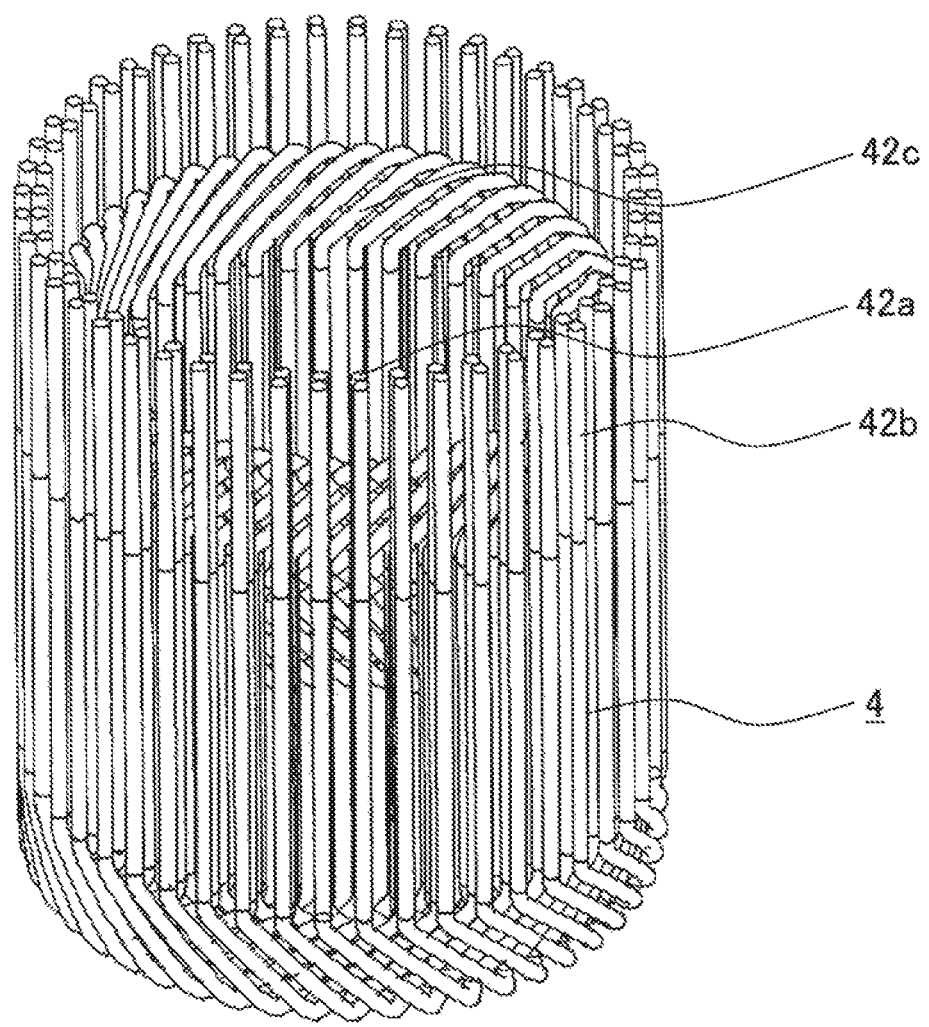
FIG. 24 is a schematic perspective view of the coil basket used for the stator according to embodiment 2 of the present invention.

FIG. 24 is a schematic perspective view of the coil basket used for the stator according to embodiment 2 of the present invention.

As shown in FIG. 24, the coil basket 206 of the present embodiment is formed by arranging a plurality of the unit coils 4 in the circumferential direction.

As described in detail later, the coil basket 206 is formed by inserting, between the conductive wires of the slot-accommodated portion of one unit coil 4, a conductive wire of the slot-accommodated portion of another unit coil 4 adjacent thereto, and by arranging the plurality of unit coils 4 in an annular shape.

Next, a method for manufacturing the coil basket 206 will be described.

Figure 25:
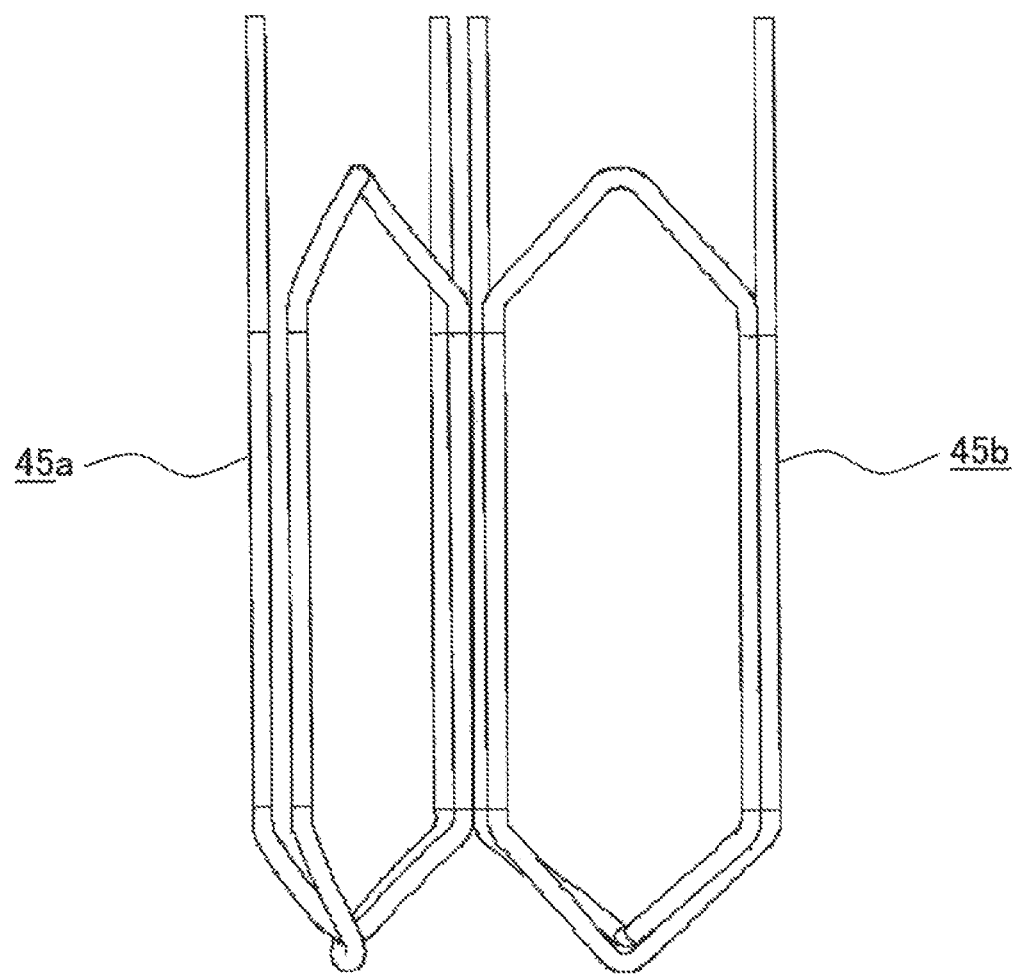
FIG. 25 is a schematic front view showing two unit coils used for producing the coil basket according to embodiment 2 of the present invention.

FIG. 25 is a schematic front view showing two unit coils used for producing the coil basket according to embodiment 2 of the present invention.

In FIG. 25, in production of the coil basket 206, a unit coil (referred to as an inserting-side unit coil) 45a of which a conductive wire of the slot-accommodated portion is to be inserted is shown at the left on the drawing plane, and a unit coil (referred to as a receiving-side unit coil) 45b in which the conductive wire is to be inserted between the conductive wires of the slot-accommodated portion is shown at the right on the drawing plane.

Figure 26:
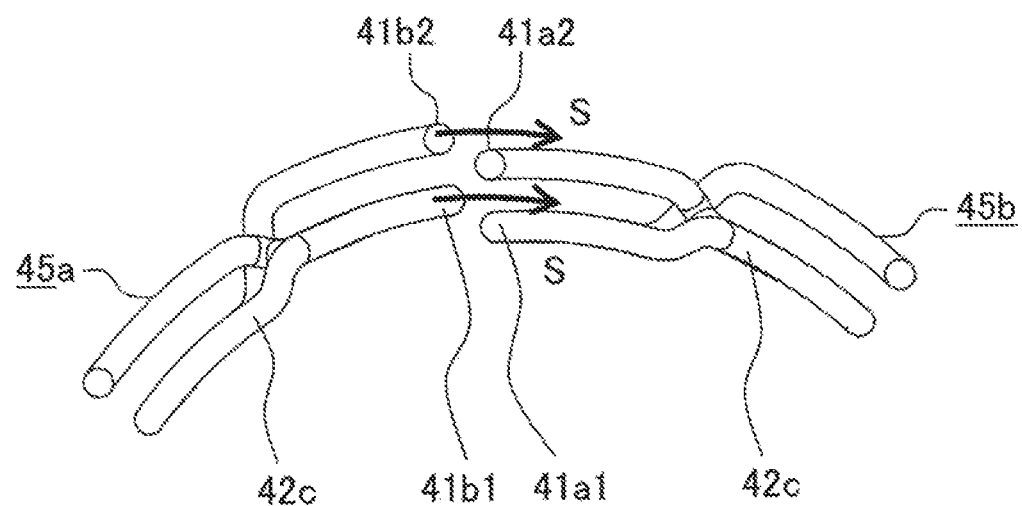
FIG. 26 is a schematic terminal-side top view illustrating the state in which an inserting-side unit coil is arranged with respect to a receiving-side unit coil in an overlapping manner in production of the coil basket according to embodiment 2 of the present invention.

FIG. 26 is a schematic terminal-side top view illustrating the state in which the inserting-side unit coil is arranged with respect to the receiving-side unit coil in an overlapping manner in production of the coil basket according to embodiment 2 of the present invention.

As shown in FIG. 26, the second slot-accommodated portion inner-side conductive wire 41*b*1 of the inserting-side unit coil 45*a* is moved while being turned in a direction indicated by arrow S, to pass between the first slot-accommodated portion inner-side conductive wire 41*a*1 and the first slot-accommodated portion outer-side conductive wire 41*a*2 of the receiving-side unit coil 45*b*, and the inserting-side unit coil 45*a* is arranged.

At the same time, the second slot-accommodated portion outer-side conductive wire 41*b*2 of the inserting-side unit coil 45*a* is moved while being turned in a direction indicated by arrow S, to pass by the radially outer side of the first slot-accommodated portion outer-side conductive wire 41*a*2 of the receiving-side unit coil 45*b*, and the inserting-side unit coil 45*a* is arranged.

That is, the inserting-side unit coil 45*a* and the receiving-side unit coil 45*b* are arranged to overlap each other so as to be shifted from each other in the circumferential direction.

Figure 27:
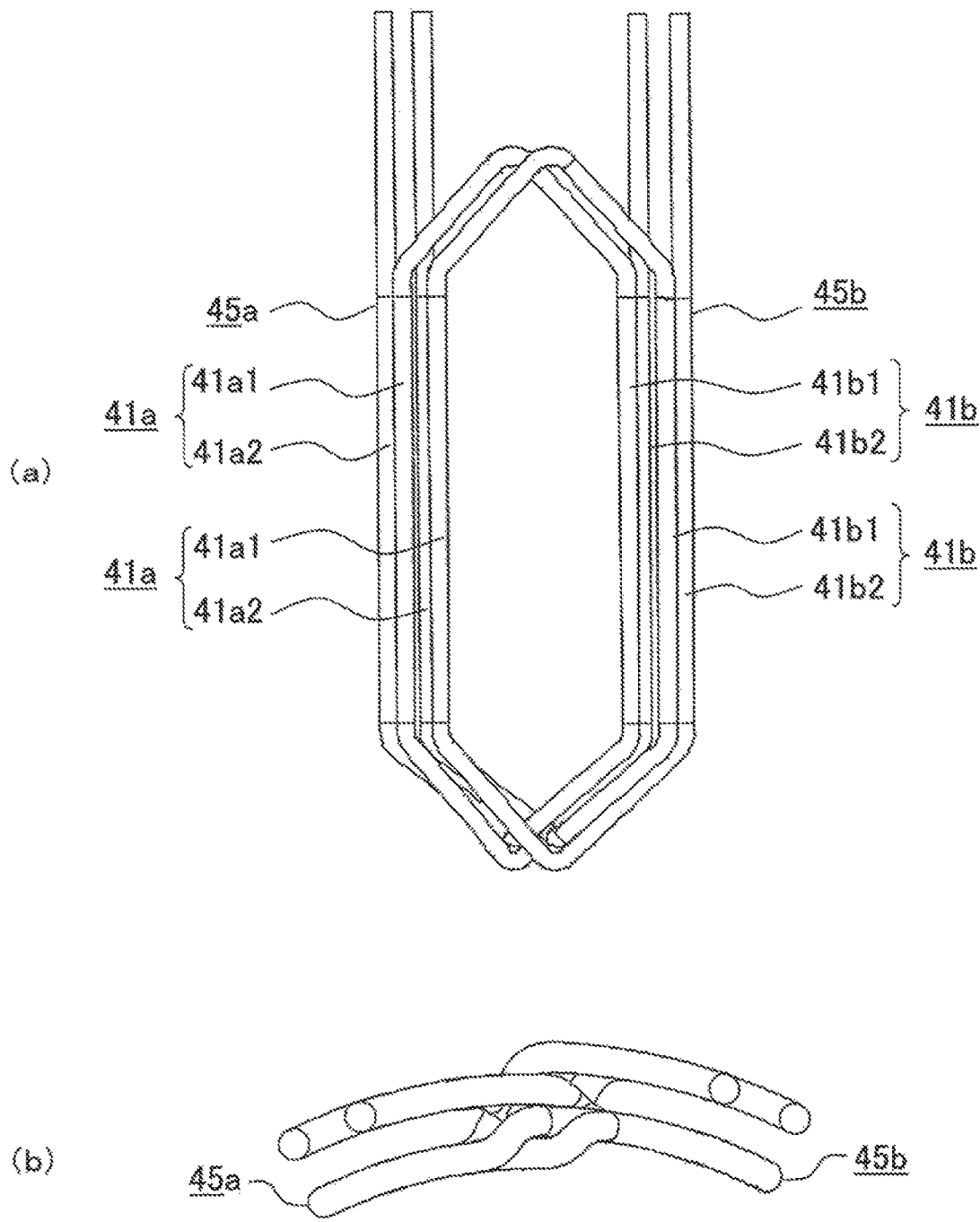
FIG. 27 is a schematic front view (a) and a schematic terminal-side top view (b) illustrating the state in which the inserting-side unit coil is arranged with respect to the receiving-side unit coil, in production of the coil basket according to embodiment 2 of the present invention.

FIG. 27 is a schematic front view (a) and a schematic terminal-side top view (b) illustrating the state in which the inserting-side unit coil is arranged with respect to the receiving-side unit coil, in production of the coil basket according to embodiment 2 of the present invention.

As shown in FIG. 27, in the inserting-side unit coil 45*a* and the receiving-side unit coil 45*b* that overlap each other, the first slot-accommodated portion 41*a* of the inserting-side unit coil 45*a* is shifted from the first slot-accommodated portion 41*a* of the receiving-side unit coil 45*b* by one slot 205 in the counterclockwise circumferential direction, and the second slot-accommodated portion 41*b* of the inserting-side unit coil 45*a* is shifted from the second slot-accommodated portion 41*b* of the receiving-side unit coil 45*b* by one slot 205 in the counterclockwise circumferential direction.

Thus, the coil basket 206 is formed by arranging the unit coils in an annular shape while overlapping each other in a shifted manner.

In the present embodiment, since the number of the slots is 48, the shift amount corresponding to one slot is such that the angle between two sides connecting the center in the same positions of the unit coil and the overlapping unit coil is 7.5 degrees.

Naturally, if the number of the slots differs, the shift amount corresponding to one slot also differs, thus the number of the slots is not limited to 7.5 degrees.

Next, the method for attaching the stator core components 202*a* to the coil basket 206 to manufacture the stator will be described.

Figure 28:
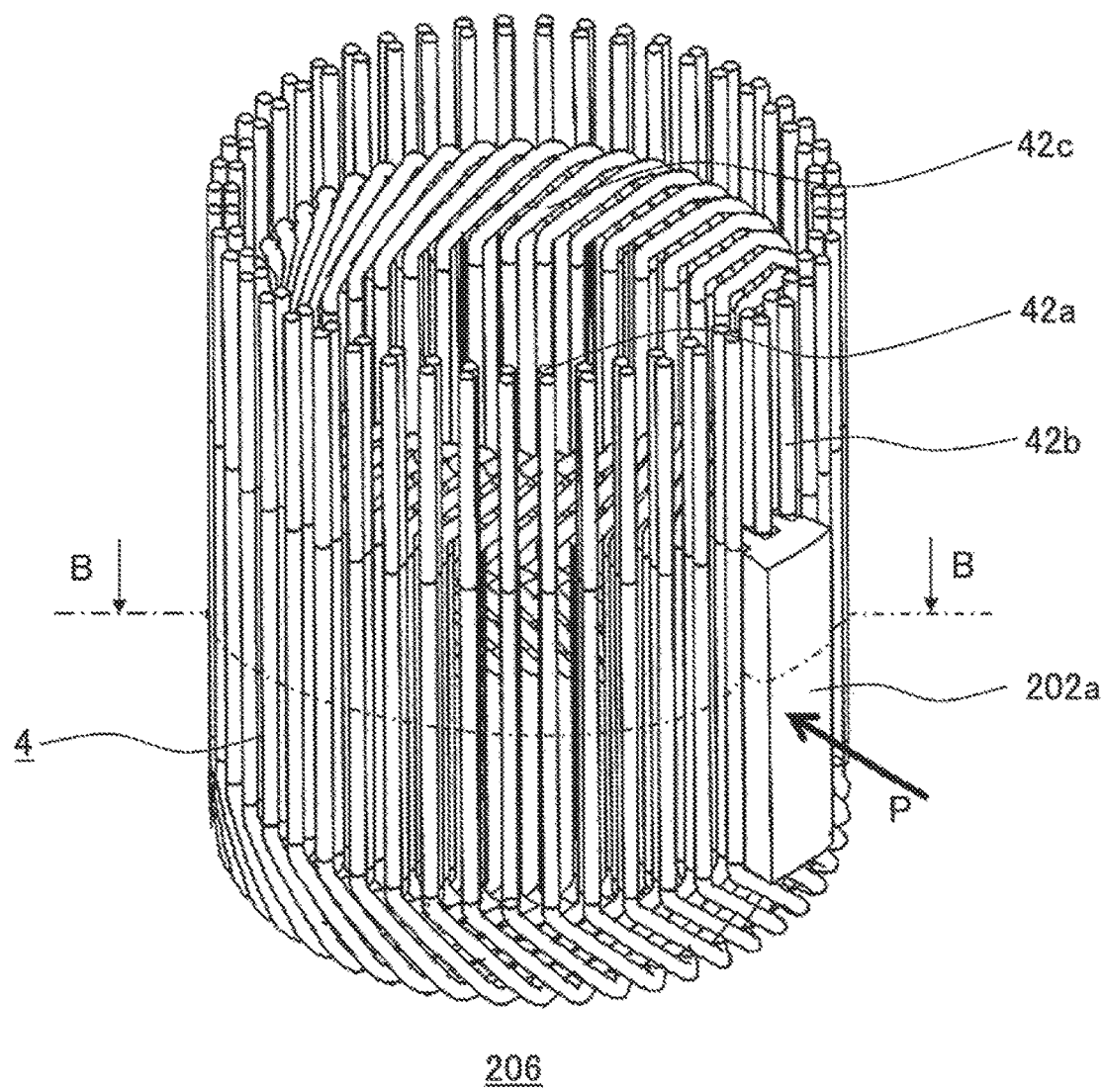
FIG. 28 is a schematic perspective view illustrating the state in which the stator core components are being attached to the coil basket according to embodiment 2 of the present invention.

FIG. 28 is a schematic perspective view illustrating the state in which the stator core components are attached to the coil basket according to embodiment 2 of the present invention.

Figure 29:
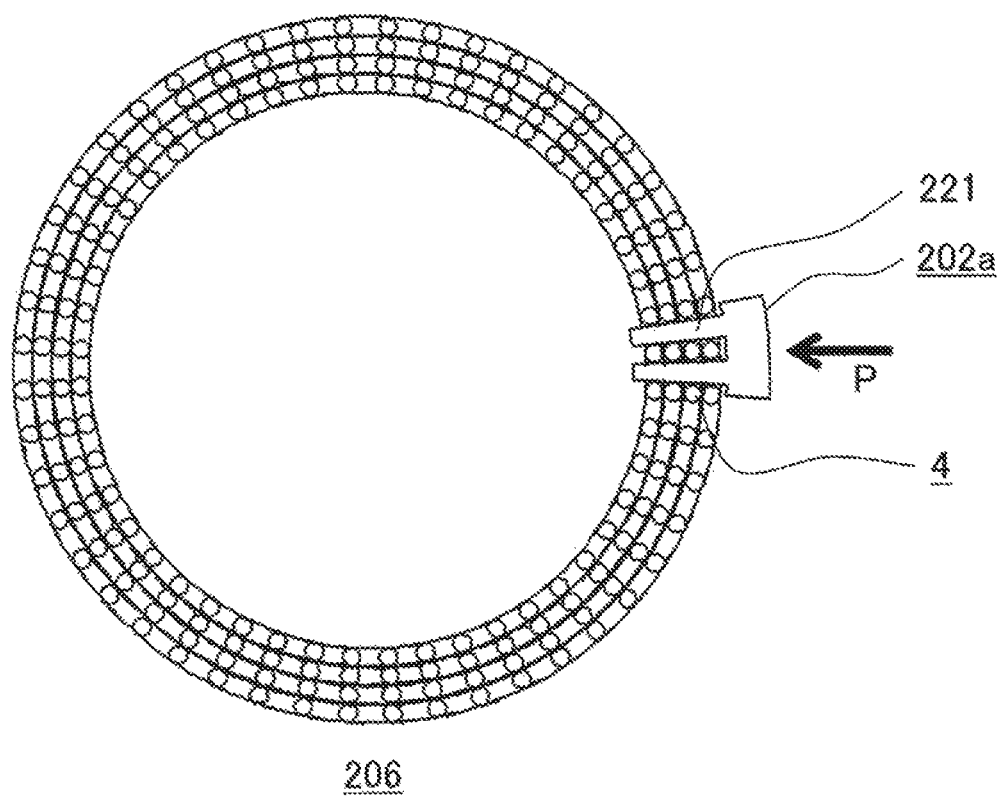
FIG. 29 is a schematic sectional view taken along B-B line of the coil basket in FIG. 28.

FIG. 29 is a schematic sectional view taken along B-B line of the coil basket in FIG. 28.

As shown in FIG. 28 and FIG. 29, in attachment of the stator core components 202*a* to the coil basket 206, first, the teeth 221 of the stator core components 202*a* are inserted between the slot-accommodated portions of a plurality of unit coils 4 forming the coil basket 206. The insertion of the teeth 221 into the coil basket 206 is performed by pressing the stator core components 202*a* in a direction indicated by arrow P from the outer circumferential side of the coil basket 206 to move the stator core components 202*a* inwardly in the radial direction.

Next, in the same way, all the stator core components 202*a* are attached to the coil basket 206, and the stator intermediate 200*a* shown in FIG. 22 is produced.

In the stator intermediate 200*a*, all the slot-accommodated portions are accommodated in the slots 205.

The stator core components 202*a* attached to the coil basket 206 and arranged in an annular shape with their back yoke forming portion circumferential-direction end surfaces 222*b* being in contact with each other are integrated by joining the back yoke forming portions 222*a* by welding or the like. The integrated part of the back yoke forming portions 222*a* becomes a back yoke of the stator core 202, whereby the stator core 202 is formed.

Next, as in embodiment 1, the first terminal wire 42*a* and the second terminal wire 42*b* of each unit coil 4 are bent. Then, the first terminal wire 42*a* of each unit coil 4 and the second terminal wire 42*b* of another unit coil 4 are opposed to each other in the radial direction and come in contact with each other.

Next, the first terminal wire 42*a* of each unit coil 4 and the second terminal wire 42*b* of another unit coil 4 which are opposed to each other and in contact with each other are joined by welding or the like to complete the stator coil, whereby the stator is manufactured.

Also in the stator of the present embodiment, since the first terminal wire 42*a* and the second terminal wire 42*b* of each unit coil 4 are arranged so as to be shifted from each other by one line of the conductive wire in the radial direction, it is possible to cause the first terminal wire 42*a* of each unit coil 4 and the second terminal wire 42*b* of another unit coil 4 to be opposing to each other in the radial direction and to be in contact with each other, without providing a crossing portion. Thus, the same effect as in the stator of embodiment 1 is provided.

In addition, since the stator is manufactured by inserting the stator core components 202*a* into the coil basket 206 from the outer circumferential side in the radial direction, the stator core can be easily attached to the stator coil and thus the productivity is improved.

In addition, a load applied to the stator coil is small when the stator core components 202*a* are inserted into the coil basket 206, thus deterioration in the insulation property of the unit coils 4 can be prevented.

In the present embodiment, each stator core component has two teeth, but the number of the teeth is not limited to two.

Embodiment 3

A stator according to embodiment 3 of the present invention includes stator coils and a stator core to which the stator coils are mounted.

A unit coil used in the present embodiment has the same shape as the unit coil 4 of embodiment 1, and is formed by winding one conductive wire.

A coil basket forming the stator coils is the same as the coil basket 206 of embodiment 2.

Figure 30:
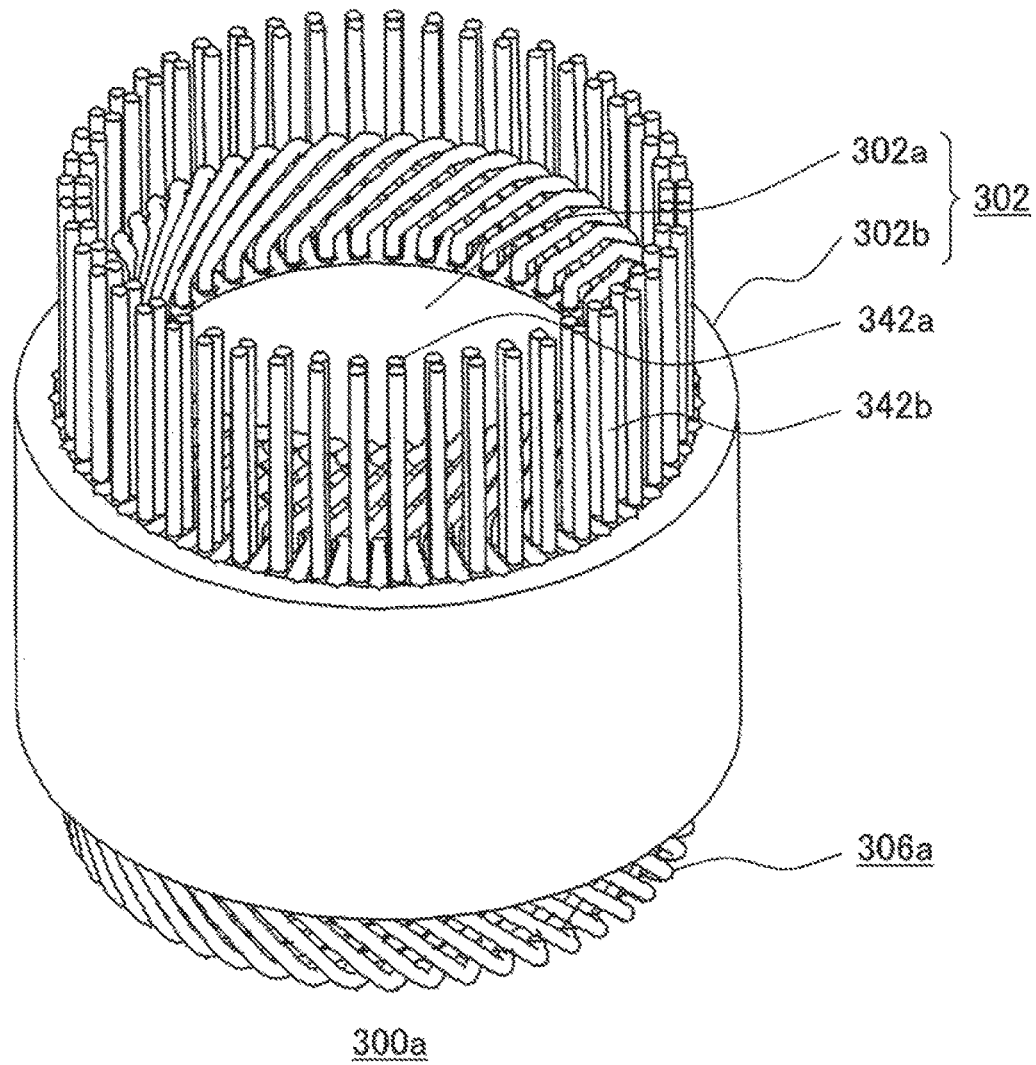
FIG. 30 is a schematic perspective view showing a stator intermediate in which a contracted coil basket is mounted to a stator core, in a stator according to embodiment 3 of the present invention.

FIG. 30 is a schematic perspective view showing a stator intermediate in which a contracted coil basket is mounted to the stator core, in the stator according to embodiment 3 of the present invention.

In the stator intermediate 300*a* shown in FIG. 30 in which the contracted coil basket 306*a* is mounted to the stator core 302, each first terminal wire 342*a* and each second terminal wire 342*b* have not been bent in the circumferential direction yet and have not been joined by welding or the like yet.

The stator core 302 shown in FIG. 30 is formed into an inner core 302*a* located on the radially inner side, and an outer core 302*b* separate from the inner core 302*a* and located on the radially outer side. The outer core 302*b* is a back yoke of the stator core 302.

Figure 31:
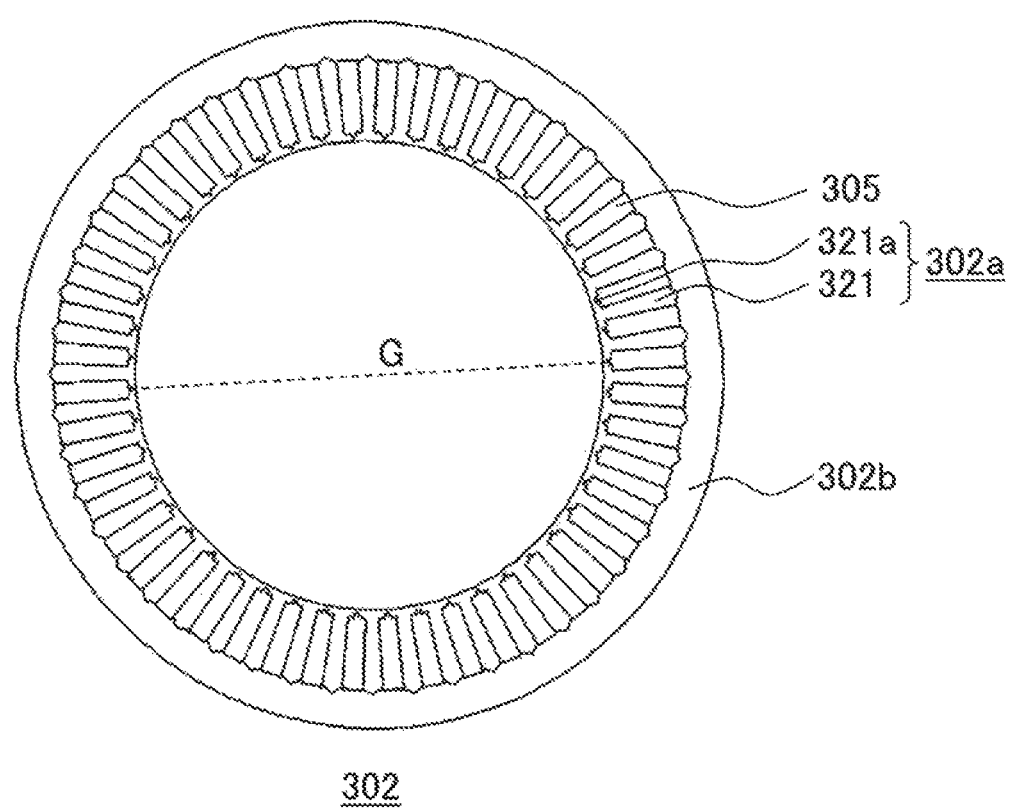
FIG. 31 is a schematic view of the end surface in the axial direction of the stator core used in the stator according to embodiment 3 of the present invention.

FIG. 31 is a schematic view of the end surface in the axial direction of the stator core used in the stator according to embodiment 3 of the present invention.

As shown in FIG. 31, the inner core 302a is formed by a plurality of teeth 321 and a plurality of connection portions 321a.

The plurality of teeth 321 are radially arranged at regular intervals along the circumferential direction. Each connection portion 321a connects the radially-inner-side ends of the adjacent teeth 321. The radially-inner-side ends of the plurality of teeth 321 and the plurality of connection portions 321a form an annular body.

Slots 305 are formed between the adjacent teeth 321.

The outer core 302b serving as a back yoke of the stator core 302 has a cylindrical shape. The inner circumferential surface of the outer core 302b fixes the radially-outer-side ends of the teeth 321 of the inner core 302a.

The method for manufacturing the stator of the present embodiment will be described.

Figure 32:
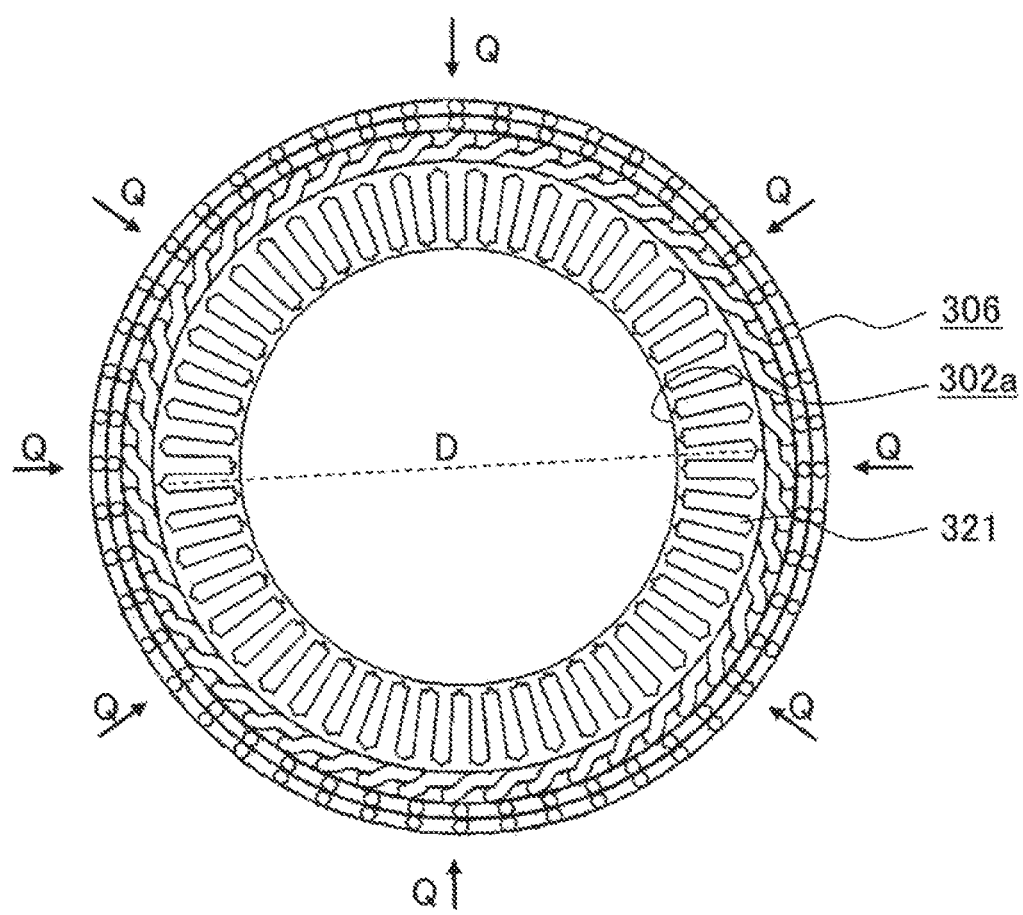
FIG. 32 is a schematic view of the end surface in the axial direction, showing the state in which an inner core is arranged in a coil basket, according to embodiment 3 of the present invention.

FIG. 32 is a schematic view of the end surface in the axial direction, showing the state in which the inner core is arranged in the coil basket, according to embodiment 3 of the present invention.

First, the coil basket 306 is produced by the same operation as in embodiment 2.

However, in each unit coil to be used, the width in the circumferential direction of the terminal-side coil end portion and the width in the circumferential direction of the anti-terminal-side coil end portion are increased, and the inner diameter of the coil basket 306 is greater than the outer diameter D of the inner core 302a.

Next, as shown in FIG. 32, the inner core 302a is arranged on the inner circumferential side of the coil basket 306.

Next, as shown in FIG. 32, the coil basket 306 is tightened from the outer circumferential part indicated by arrows Q, whereby the bending angles of the coil end portions on the terminal side and the anti-terminal side in each unit coil are decreased and the unit coil becomes a contracted unit coil in which the widths in the circumferential direction of the coil end portions are reduced.

That is, while the coil basket 306 is contracted to reduce its inner diameter, the teeth 321 are inserted between the slot-accommodated portions of the unit coils, whereby the coil basket (referred to as a contracted coil basket) 306a that has been contracted is mounted to the inner core 302a.

Figure 33:
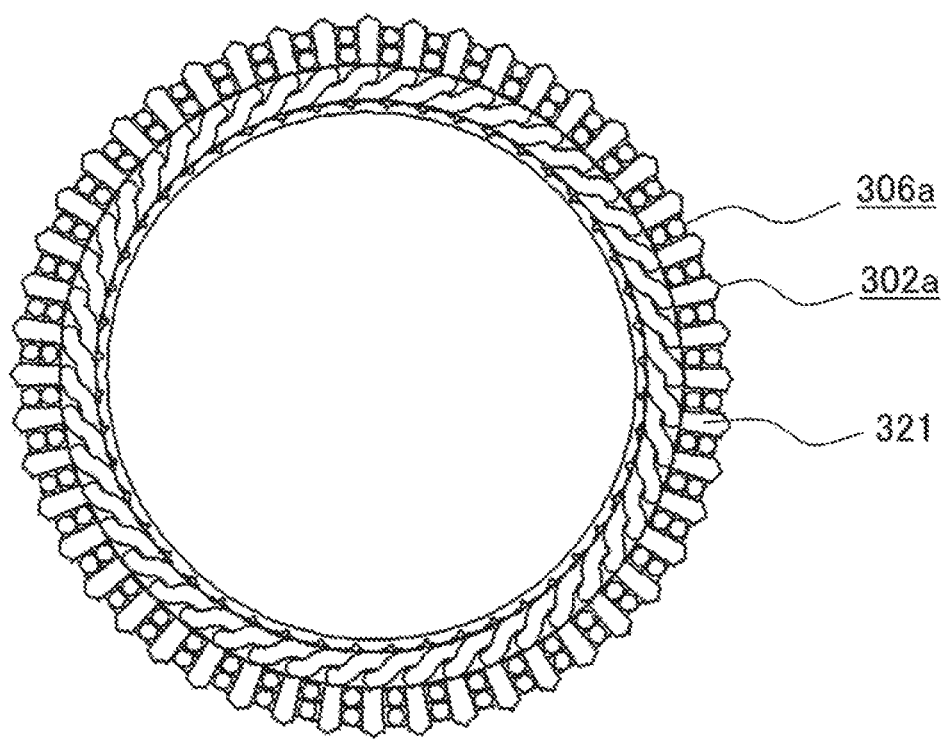
FIG. 33 is a schematic view of the end surface in the axial direction, showing the state in which the contracted coil basket is mounted to the inner core, according to embodiment 3 of the present invention.

FIG. 33 is a schematic view of the end surface in the axial direction, showing the state in which the contracted coil basket is mounted to the inner core, according to embodiment 3 of the present invention.

When the contracted coil basket 306a is mounted to the inner core 302a, all the slot-accommodated portions are accommodated in the slots 305.

Next, the inner core 302a to which the contracted coil basket 306a is mounted is pressed into the outer core 302b, and the stator intermediate 300a shown in FIG. 30 is produced.

Next, as in embodiment 1, the first terminal wire 342a and the second terminal wire 342b of each contracted unit coil are bent. Then, the first terminal wire 342a of each contracted unit coil and the second terminal wire 342b of another contracted unit coil to be joined with the first terminal wire 342a are opposed to each other in the radial direction and are in contact with each other.

Next, the first terminal wire 342a of each contracted unit coil and the second terminal wire 342b of another contracted unit coil which are opposed to each other and are in contact with each other are joined by welding or the like to complete the stator coil, whereby the stator is manufactured.

In the stator of the present embodiment, since the first terminal wire 342a and the second terminal wire 342b of each arranged unit coil are arranged so as to be shifted from each other by one line of the conductive wire in the radial direction, it is possible to cause the first terminal wire 342a of each arranged unit coil and the second terminal wire 342b of another arranged unit coil to be opposed to each other in the radial direction and to be in contact with each other, without providing a crossing portion. Thus, the same effect as in the stator of embodiment 1 is provided.

In addition, in the stator core 302 used as the stator of the present embodiment, since the radially-inner-side ends of the teeth 321 are connected by the connection portions 321a, the accuracy of the shape of the inner circumference of the stator core is enhanced. Therefore, in the rotary electric machine using the stator of the present embodiment, cogging torque and torque ripple are reduced.

Embodiment 4

A stator according to embodiment 4 of the present invention also includes stator coils and a stator core to which the stator coils are mounted. The stator core used in the present embodiment is the same as the stator core 302 of embodiment 3.

However, the shape of the unit coil and the shape of the coil basket are different from those in embodiment 3. However, in the unit coil, the number of lines of the conductive wire in each slot-accommodated portion, the number of the coil end portions, and the width which the lane change portion crosses are the same as those in embodiment 3.

Each unit coil is formed by winding one conductive wire.

Figure 34:
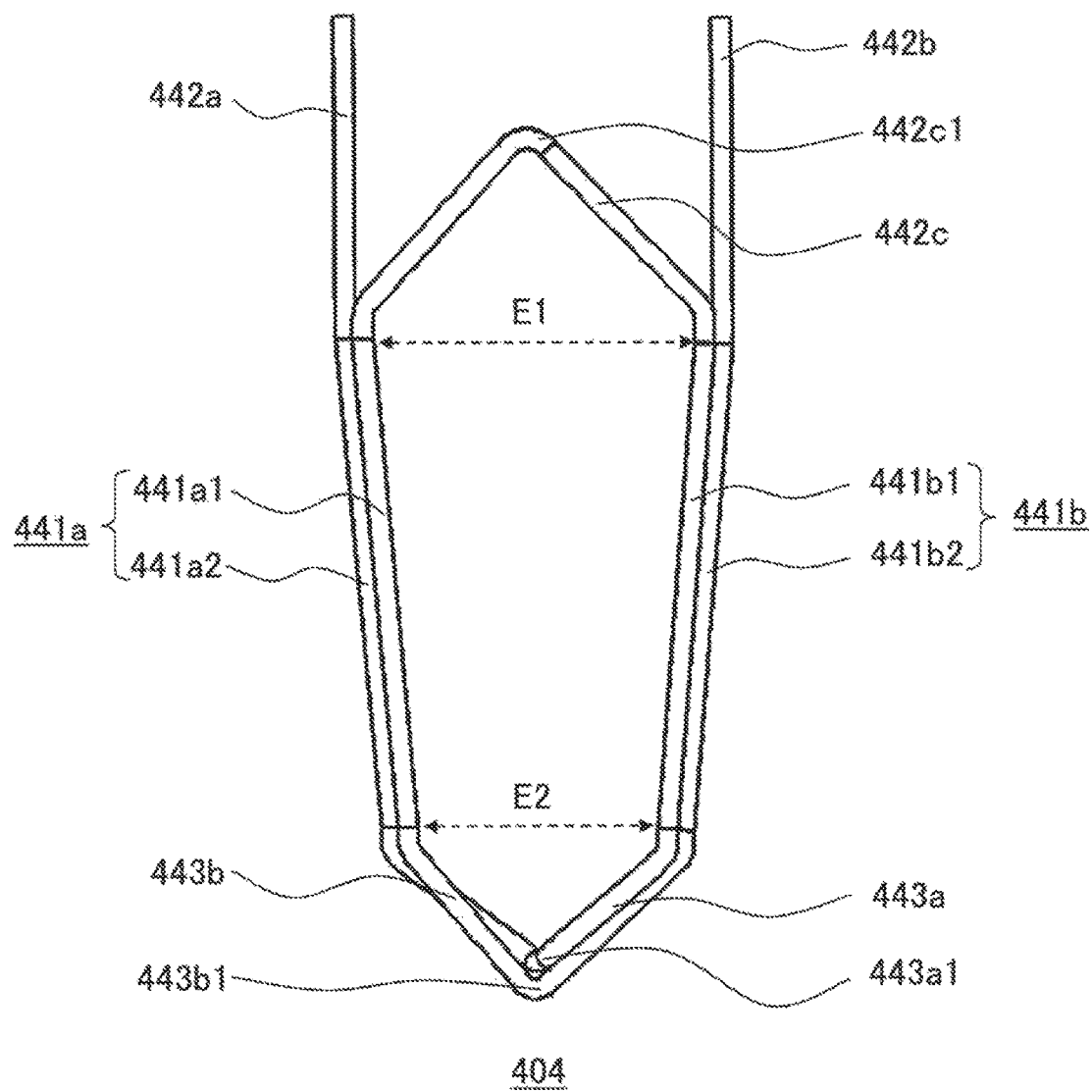
FIG. 34 is a schematic front view of a unit coil according to embodiment 4 of the present invention.

FIG. 34 is a schematic front view of the unit coil according to embodiment 4 of the present invention.

As shown in FIG. 34, in the unit coil 404 of the present embodiment, a width (referred to as the width of the terminal-side coil end portion) E1 in the circumferential direction of a terminal-side coil end portion 442c is greater than a width (referred to as the width of the anti-terminal-side coil end portion) E2 in the circumferential direction of a first anti-terminal-side coil end portion 443a and a second anti-terminal-side coil end portion 443b.

In the unit coil 404 of the present embodiment, the terminal-side coil end portion 442c has a lane change portion 442c1, the first anti-terminal-side coil end portion 443a has a lane change portion 443a1, and the second anti-terminal-side coil end portion 443b has a lane change portion 443b1.

A first slot-accommodated portion 441a is composed of a first slot-accommodated portion inner-side conductive wire 441a1 and a first slot-accommodated portion outer-side conductive wire 441a2.

A second slot-accommodated portion 441b is composed of a second slot-accommodated portion inner-side conductive wire 441b1 and a second slot-accommodated portion outer-side conductive wire 441b2.

Figure 35:
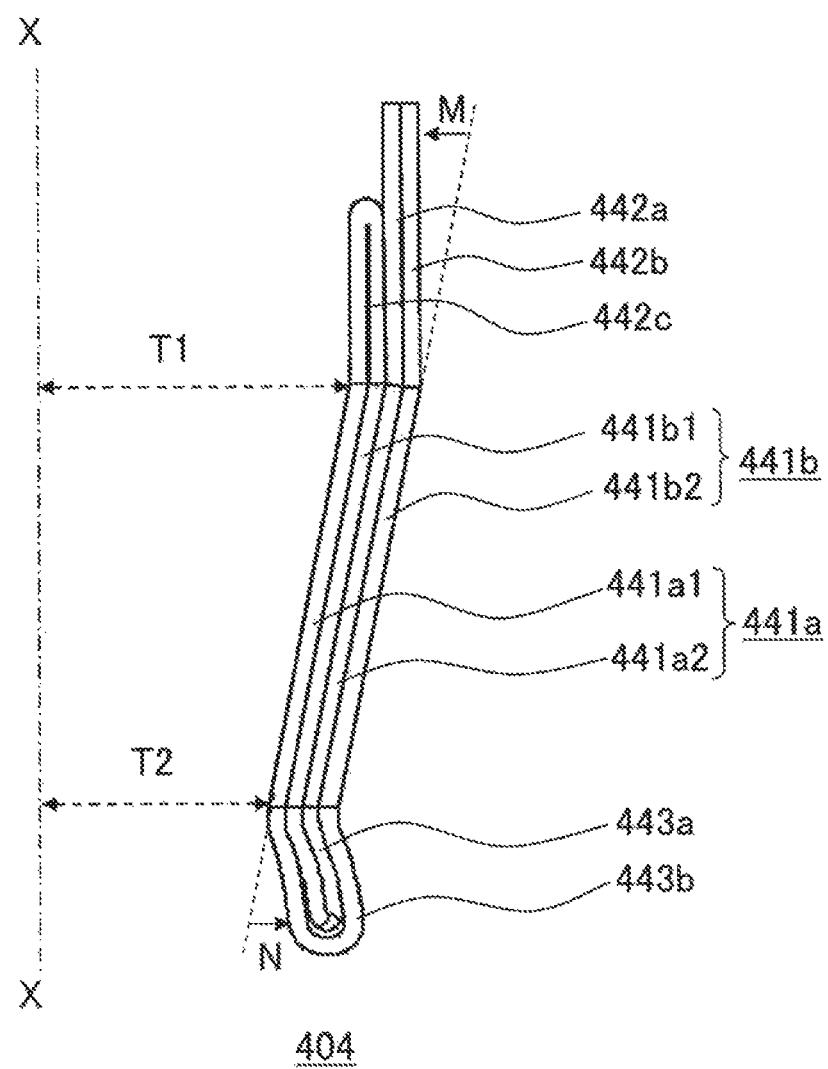
FIG. 35 is a schematic side view of one unit coil forming a coil basket according to embodiment 4 of the present invention.

FIG. 35 is a schematic side view of one unit coil forming the coil basket according to embodiment 4 of the present invention.

As shown in FIG. 35, in the unit coil 404, first and second terminal wires 442a and 442b and a terminal-side coil end portion 442c are bent, inward in the radial direction of the coil basket as indicated by arrow M, with respect to the extended line from the first and second slot-accommodated portions 441a and 441b.

In addition, first and second anti-terminal-side coil end portions 443a and 443b are bent, outward in the radial direction of the coil basket as indicated by arrow N, with respect to the extended line from the first and second slot-accommodated portions 441a and 441b.

In each unit coil 404 forming the coil basket 406 described later, a distance T1 between the central axis X of the coil basket 406 and the terminal-side end of the slot-accommodated portion is greater than a distance T2 between the central axis X of the coil basket 406 and the anti-terminal-side end of the slot-accommodated portion.

That is, in each unit coil 404 forming the coil basket 406 of the present embodiment, the slot-accommodated portions 441a and 441b are inclined.

A method for manufacturing the stator of the present embodiment will be described.

The coil basket 406 of the present embodiment is produced by the same method as in the coil basket 206 of embodiment 2.

That is, the conductive wire of the second slot-accommodated portion 441b of the inserting-side unit coil 404 passes between the conductive wires of the first slot-accommodated portion 441a of the receiving-side unit coil 404, thereby the unit coils 404 are overlapped each other so as to be shifted from each other in the circumferential direction. Then, all the unit coils 404 are overlapped each other so as to be shifted from each other in the circumferential direction and are arranged in an annular shape, whereby the coil basket 406 is produced.

Figure 36:
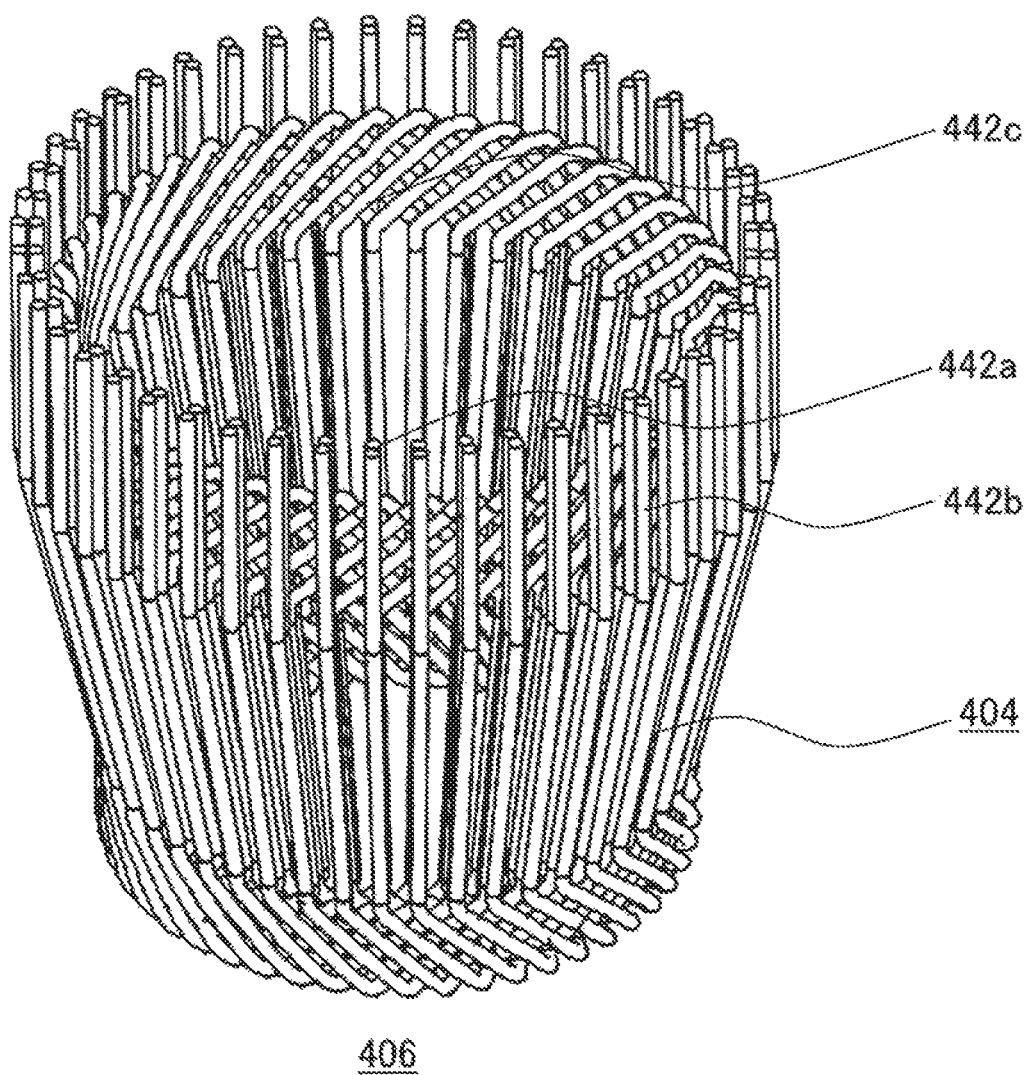
FIG. 36 is a schematic perspective view of the coil basket used as a stator according to embodiment 4 of the present invention.

FIG. 36 is a schematic perspective view of the coil basket used as the stator according to embodiment 4 of the present invention.

As shown in FIG. 36, the inner diameter on the terminal side of the coil basket 406 of the present embodiment is greater than the inner diameter on the anti-terminal side.

In addition, the inner diameter on the terminal side of the coil basket 406 is greater than the outer diameter D of the inner core 302a shown in FIG. 32. The inner diameter on the anti-terminal side of the coil basket 406 is greater than a diameter (referred to as an inter-slot diameter) G between the bottoms of the slots 305 opposed to each other in the inner core 302a shown in FIG. 31. Preferably, the difference between the inner diameter on the terminal side of the coil basket 406 and the outer diameter D of the inner core 302a, and the difference between the inner diameter on the anti-terminal side of the coil basket 406 and the inter-slot diameter G, are small.

Next, the coil basket 406 is mounted to the inner core 302a.

Figure 37:
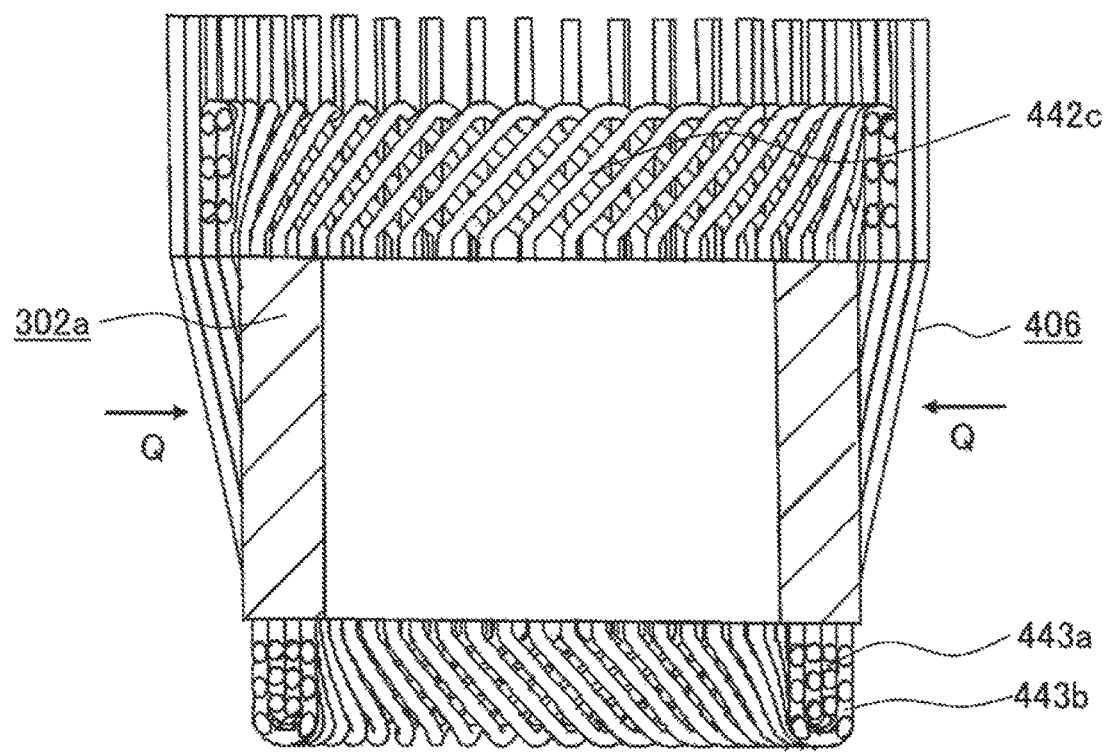
FIG. 37 is a schematic sectional view showing the state in which an inner core is arranged in the coil basket according to embodiment 4 of the present invention.

FIG. 37 is a schematic sectional view showing the state in which the inner core is arranged in the coil basket according to embodiment 4 of the present invention.

Figure 38:
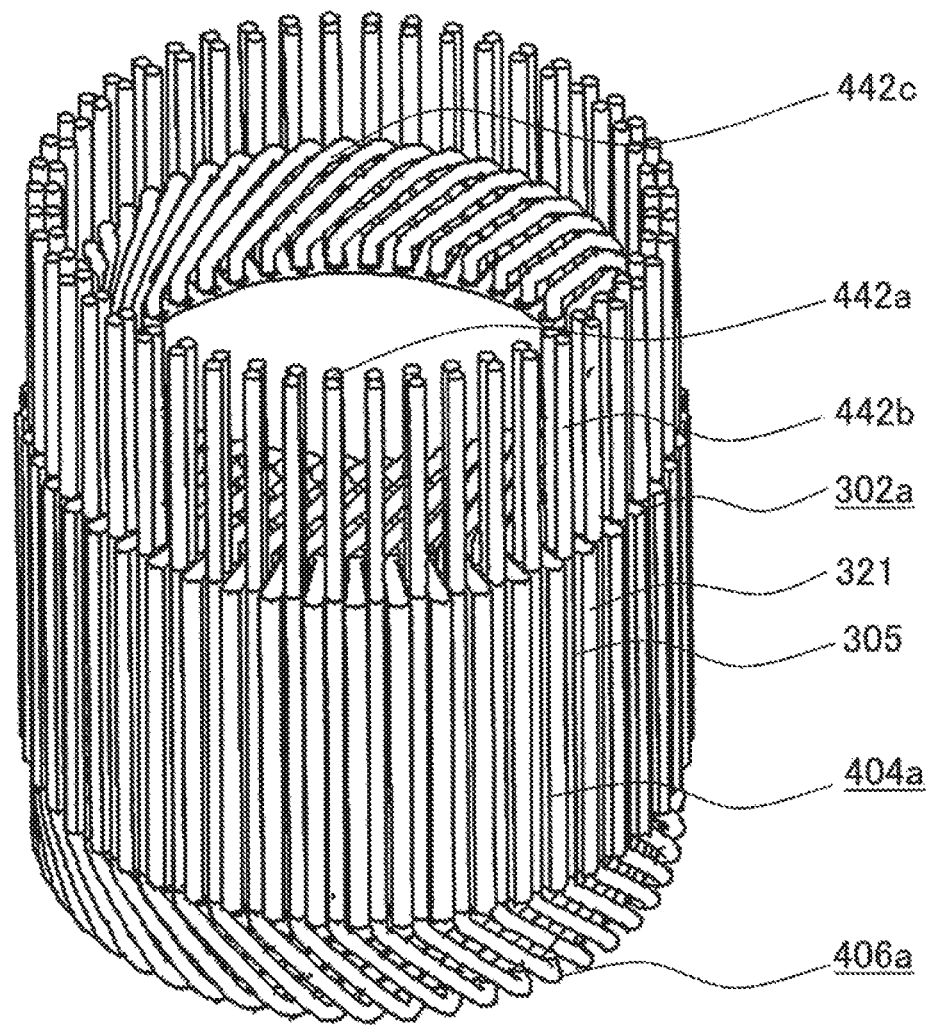
FIG. 38 is a schematic perspective view showing the inner core to which a contracted coil basket is mounted, according to embodiment 4 of the present invention.

FIG. 38 is a schematic perspective view showing the inner core to which the contracted coil basket is mounted, according to embodiment 4 of the present invention.

Figure 39:
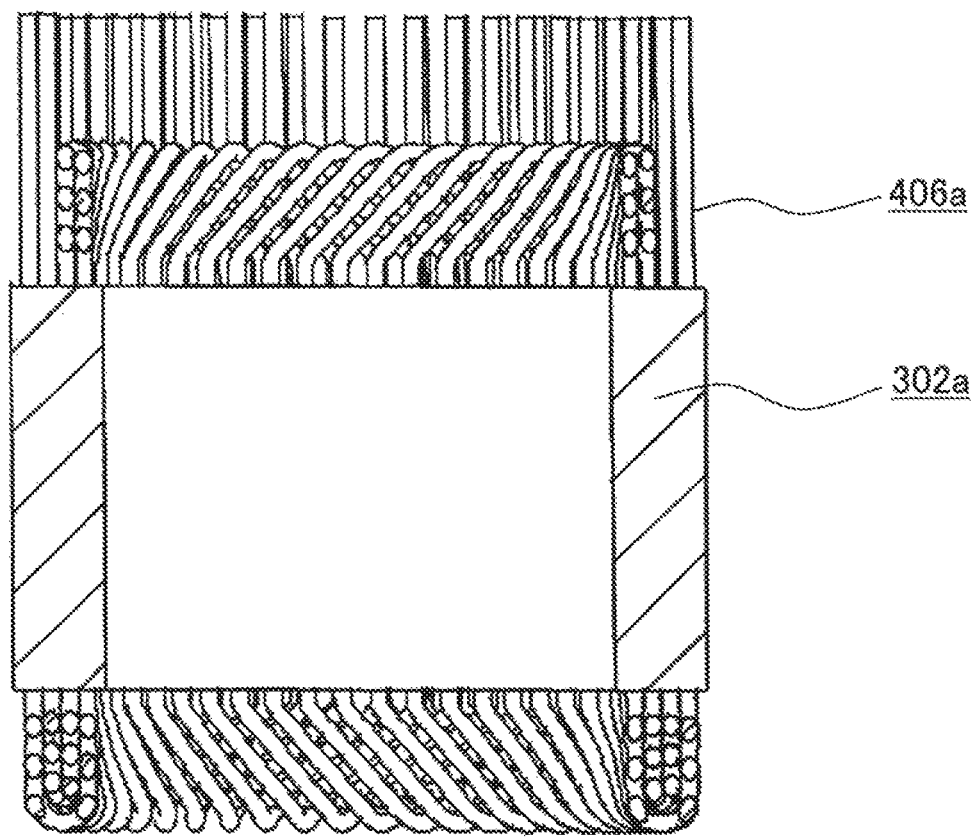
FIG. 39 is a schematic view showing a cross section along a direction perpendicular to the radial direction, of the inner core to which the contracted coil basket is mounted in FIG. 38.

FIG. 39 is a schematic view showing a cross section along a direction perpendicular to the radial direction, of the inner core to which the contracted coil basket is mounted in FIG. 38.

In mounting of the coil basket 406 to the inner core 302a, first, the inner core 302a is inserted from the terminal side of the coil basket 406. Then, as shown in FIG. 37, a force is applied to the coil basket 406 from the outer circumferential side as indicated by arrows Q.

At this time, the teeth 321 of the inner core 302a are inserted into the gaps between the slot-accommodated portions of the coil basket 406, and the coil basket 406 is contracted, whereby all the slot-accommodated portions are accommodated in the slots 305.

Then, as shown in FIG. 38 and FIG. 39, the state in which the contracted coil basket 406a is mounted to the inner core 302a, is obtained.

Figure 40:
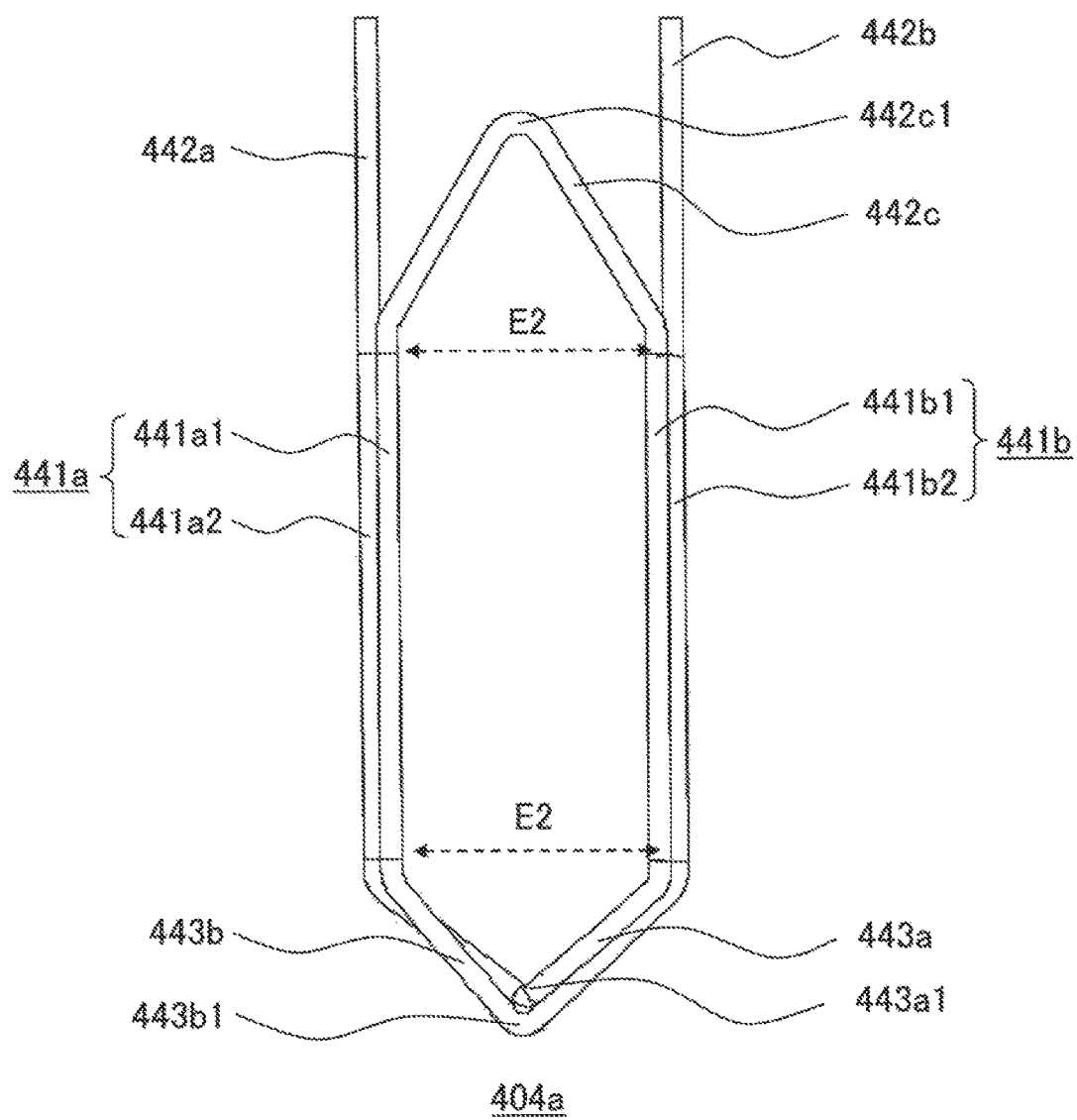
FIG. 40 is a schematic front view showing each contracted unit coil forming the contracted coil basket according to embodiment 4 of the present invention.

FIG. 40 is a schematic front view showing each contracted unit coil forming the contracted coil basket according to embodiment 4 of the present invention.

In the process in which the coil basket 406 is mounted to the inner core 302a, the width in the circumferential direction of the terminal-side coil end portion 442c of the unit coil 404 is reduced.

Then, as shown in FIG. 40, the unit coil 404 becomes the contracted unit coil 404a in which the width in the circumferential direction of the terminal-side coil end portion 442c is almost the same as the width E2 in the circumferential direction of the anti-terminal-side coil end portions.

Next, the inner core 302a to which the contracted coil basket 406a is mounted is pressed into the outer core 302b, and a stator intermediate 400a is produced.

Figure 41:
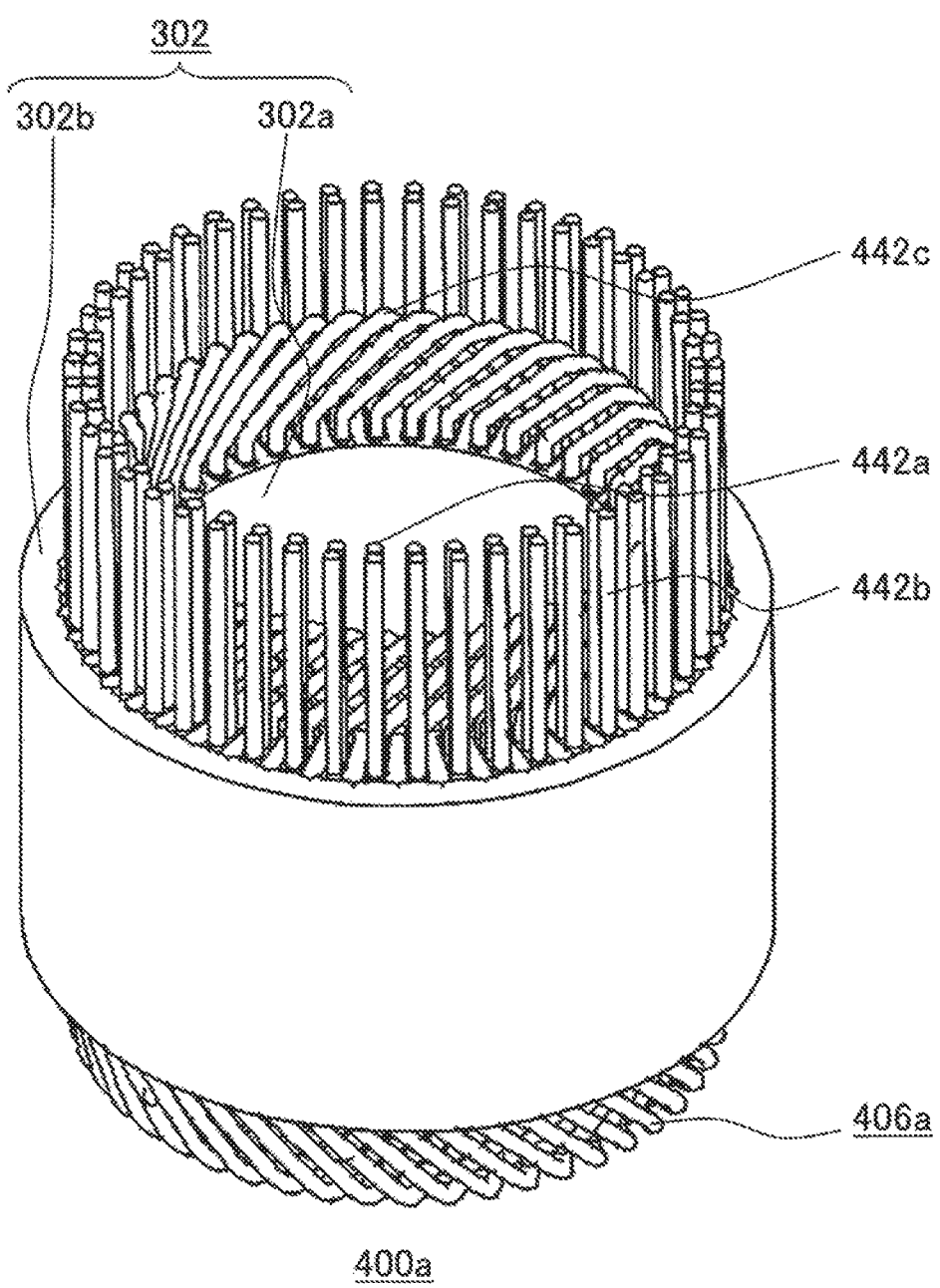
FIG. 41 is a schematic perspective view showing a stator intermediate according to embodiment 4 of the present invention.

FIG. 41 is a schematic perspective view showing the stator intermediate according to embodiment 4 of the present invention.

Next, as in embodiment 3, the first terminal wire 442a and the second terminal wire 442b of each contracted unit coil 404a are bent. Then, the first terminal wire 442a of each contracted unit coil 404a and the second terminal wire 442b of another contracted unit coil 404a to be joined with the first terminal wire 442a are opposing to each other in the radial direction and are in contact with each other.

Next, the first terminal wire 442a of each contracted unit coil 404a and the second terminal wire 442b of another contracted unit coil 404a which are opposed to each other and in contact with each other are joined by welding or the like, and the stator coil is completed, whereby the stator is manufactured.

Also in the stator of the present embodiment, since the first terminal wire 442a and the second terminal wire 442b of each arranged unit coil are arranged so as to be shifted from each other by one line of the conductive wire in the radial direction, it is possible to cause the first terminal wire 442a of each arranged unit coil and the second terminal wire 442b of another arranged unit coil to be opposing to each other in the radial direction and to be in contact with each other, without providing a crossing portion. Thus, the same effect as in the stator of embodiment 1 is provided.

In addition, since the stator core is the same as that in embodiment 3, the accuracy of the shape of the inner circumference of the stator core is enhanced, and thus, also in the rotary electric machine using the stator of the present embodiment, cogging torque and torque ripple are reduced.

In addition, when the stator of the present embodiment is manufactured, the terminal-side coil end portion of each unit coil 404 is deformed. But the anti-terminal-side coil end portion is not deformed. Therefore, a force applied to the unit coil is small, and the insulation reliability of the coil is enhanced.

Embodiment 5

A stator according to embodiment 5 of the present invention is the same as the stator of embodiment 4 except that the shape of each unit coil forming a coil basket is different.

Figure 42:
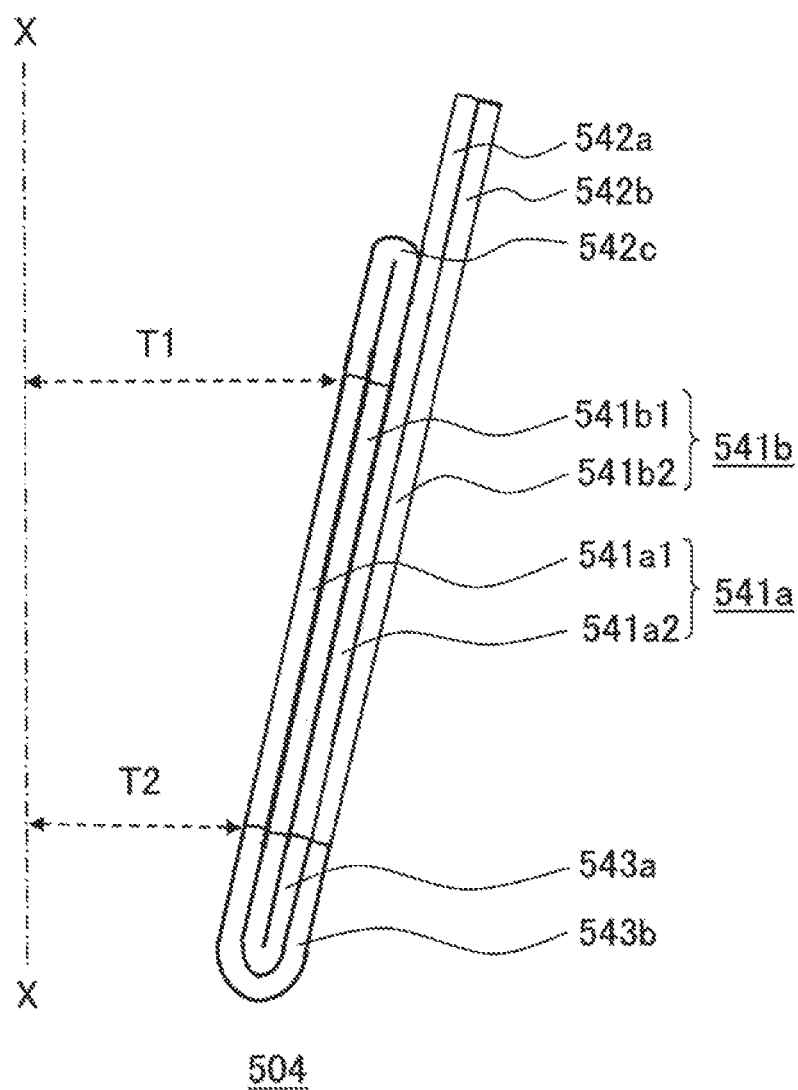
FIG. 42 is a schematic side view of one unit coil forming a coil basket according to embodiment 5 of the present invention.

FIG. 42 is a schematic side view of one unit coil forming the coil basket according to embodiment 5 of the present invention.

Figure 43:
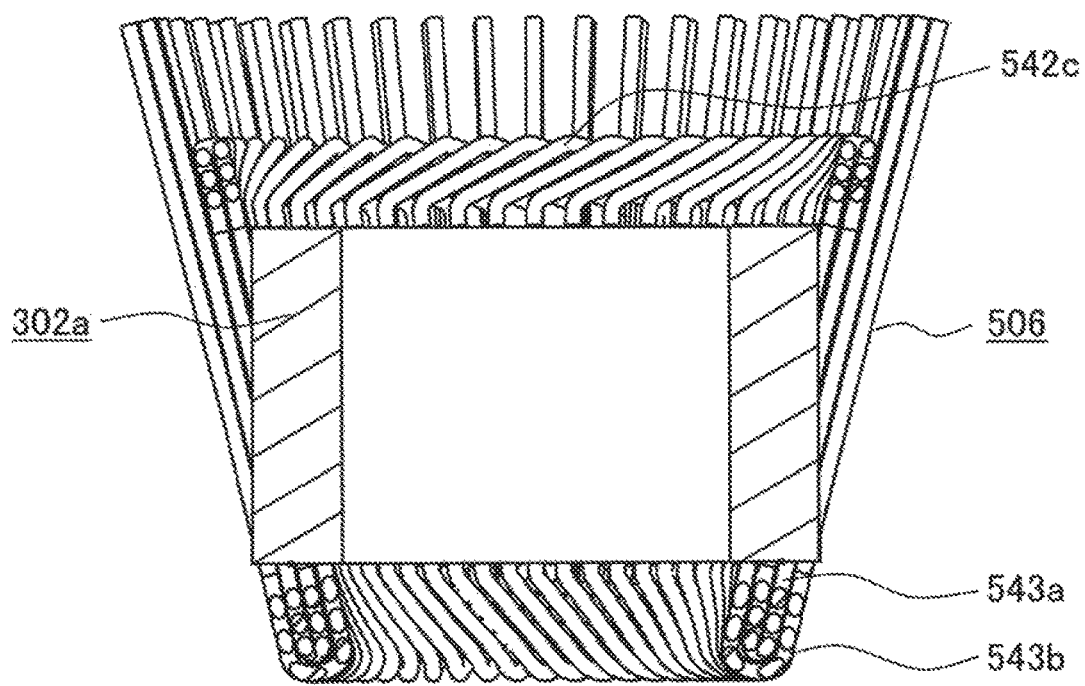
FIG. 43 is a schematic sectional view showing the state in which an inner core is arranged in the coil basket used for a stator according to embodiment 5 of the present invention.

FIG. 43 is a schematic sectional view showing the state in which an inner core is arranged in the coil basket used for the stator according to embodiment 5 of the present invention.

The inner core 302a in FIG. 43 is arranged by being inserted into the coil basket 506 from the terminal side.

The unit coil 504 shown in FIG. 42, which is used for the coil basket 506, is the same as the unit coil 404 except that first and second terminal wires 542a and 542b, a terminal-side coil end portion 542c, and first and second anti-terminal-side coil end portions 543a and 543b are not bent in the radial direction of the coil basket with respect to the extended line from first and second slot-accommodated portions 541a and 541b.

The first slot-accommodated portion 541a is composed of a first slot-accommodated portion inner-side conductive wire 541a1 and a first slot-accommodated portion outer-side conductive wire 541a2.

The second slot-accommodated portion 541b is composed of a second slot-accommodated portion inner-side conductive wire 541b1 and a second slot-accommodated portion outer-side conductive wire 541b2.

In manufacturing of the stator of the present embodiment, the process for forming a contracted coil basket and mounting the contracted coil basket to the inner core 302a, the process for pressing the inner core 302a to which the contracted coil basket is mounted, into the outer core 302b, to produce a stator intermediate, and the process for joining the first terminal wire 542a of each contracted unit coil and the second terminal wire 542b of another contracted unit coil to be joined with the first terminal wire 542a, are the same as processes in manufacturing of the stator of embodiment 4.

Therefore, the stator using the coil basket 506 of the present embodiment provides the same effect as in the stator using the coil basket 406.

In addition, since the first and second terminal wires 542a and 542b, the terminal-side coil end portion 542c, and the first and second anti-terminal-side coil end portions 543a and 543b are not bent in the radial direction of the coil basket, the number of parts of the unit coil that are bent is decreased. Thus, the number of processes for manufacturing the unit coil can be decreased, and the productivity is further improved. In addition, the frequency at which the insulation film of the conductive wire 3 is damaged can be reduced, whereby damage on the coil is reduced and the insulation reliability of the stator is further improved.

Embodiment 6

A stator according to embodiment 6 of the present invention also includes stator coils and a stator core to which the stator coils are mounted. The stator core used in the present embodiment is the same as the stator core 302 of embodiment 3.

However, the shape of a unit coil and the shape of a coil basket are different from those in embodiment 4. However, in the unit coil, the number of lines of the conductive wire in each slot-accommodated portion, the number of the coil end portions, and the width which a lane change portion crosses are the same as those in embodiment 4.

Each unit coil is formed by winding one conductive wire.

Figure 44:
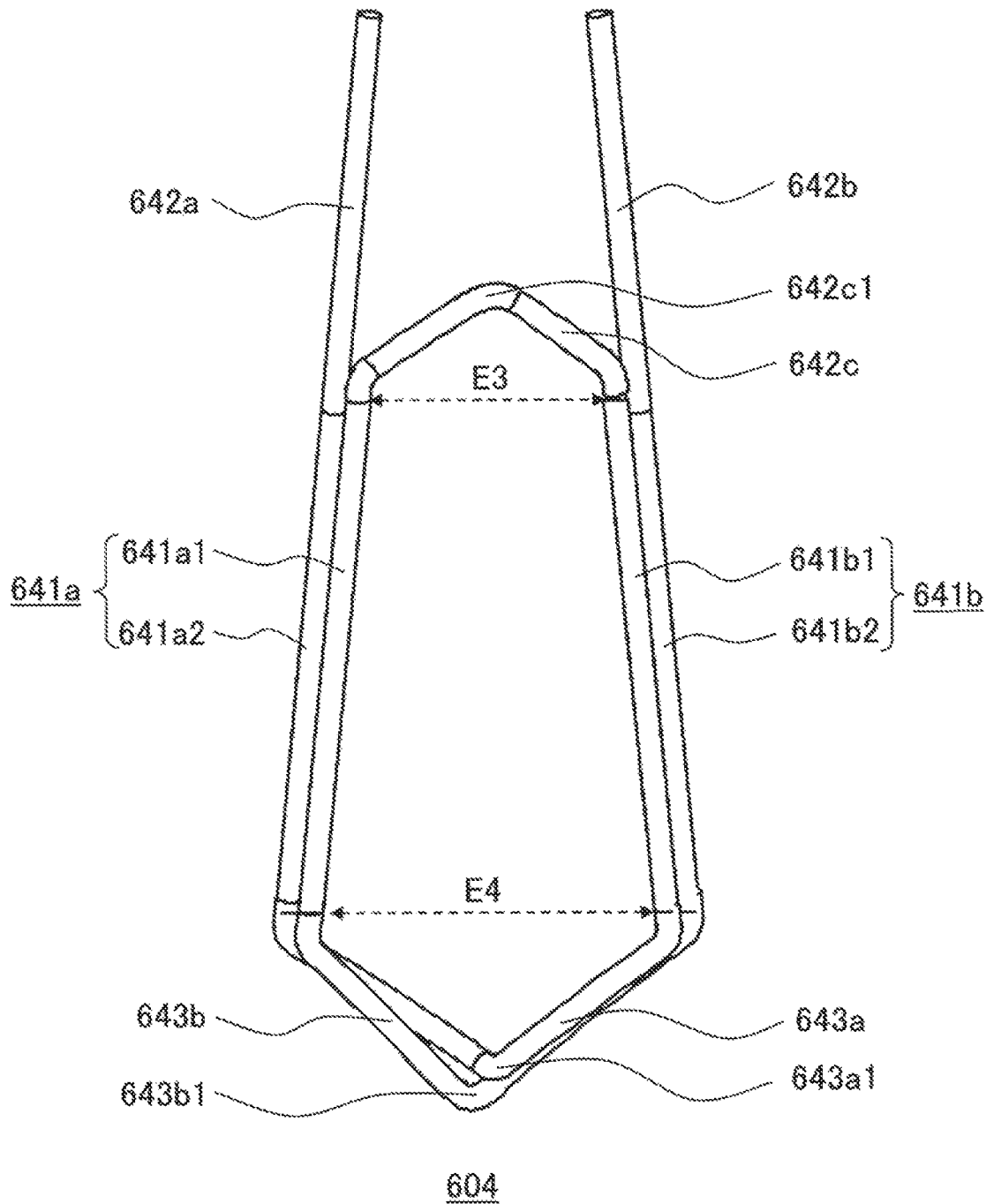
FIG. 44 is a schematic front view of a unit coil according to embodiment 6 of the present invention.

FIG. 44 is a schematic front view of the unit coil according to embodiment 6 of the present invention.

As shown in FIG. 44, in the unit coil 604 of the present embodiment, a width (referred to as the width of the anti-terminal-side coil end portion) E4 in the circumferential direction of a first anti-terminal-side coil end portion 643a and a second anti-terminal-side coil end portion 643b is greater than a width (referred to as the width of the terminal-side coil end portion) E3 in the circumferential direction of a terminal-side coil end portion 642c.

In the unit coil 604 of the present embodiment, the terminal-side coil end portion 642c has a lane change portion 642c1, the first anti-terminal-side coil end portion 643a has a lane change portion 643a1, and the second anti-terminal-side coil end portion 643b has a lane change portion 643b1.

A first slot-accommodated portion 641a is composed of a first slot-accommodated portion inner-side conductive wire 641a1 and a first slot-accommodated portion outer-side conductive wire 641a2.

A second slot-accommodated portion 641b is composed of a second slot-accommodated portion inner-side conductive wire 641b1 and a second slot-accommodated portion outer-side conductive wire 641b2.

Figure 45:
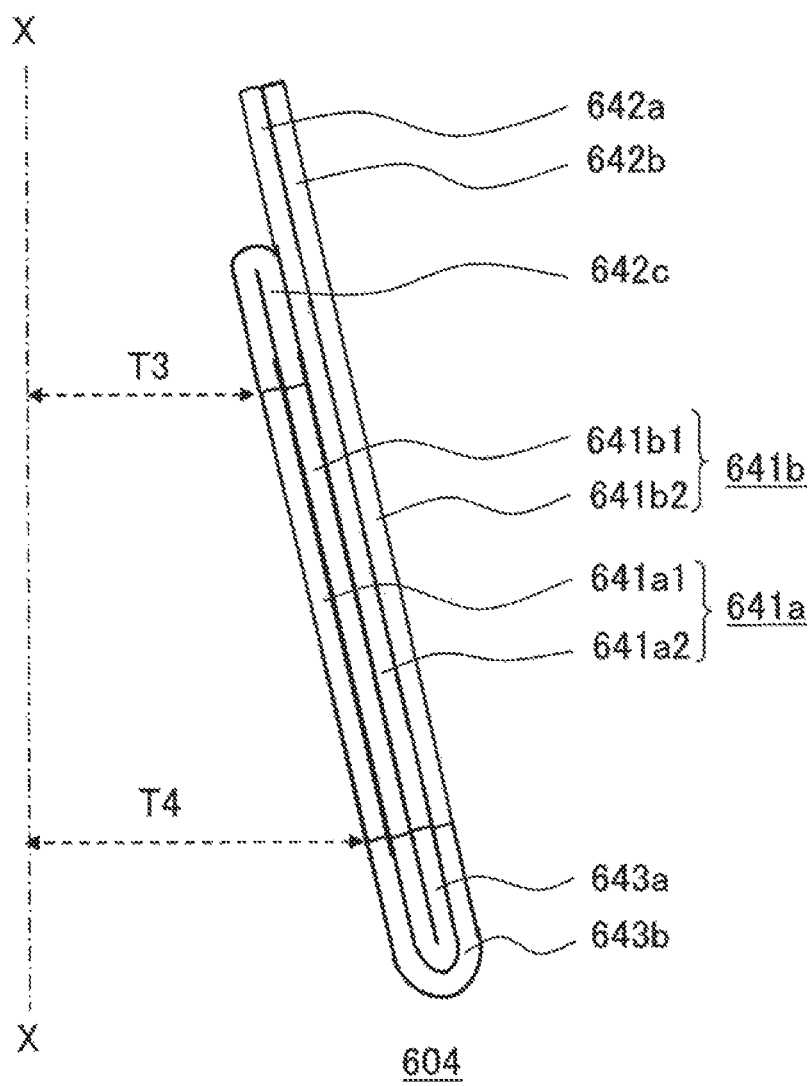
FIG. 45 is a schematic side view of one unit coil forming a coil basket according to embodiment 6 of the present invention.

FIG. 45 is a schematic side view of one unit coil forming the coil basket according to embodiment 6 of the present invention.

As shown in FIG. 45, in the unit coil 604 used for the coil basket 606 described later, first and second terminal wires 642a and 642b, a terminal-side coil end portion 642c, and first and second anti-terminal-side coil end portions 643a and 643b are not bent in the radial direction of the coil basket 606 with respect to the extended line from the first and second slot-accommodated portions 641a and 641b.

In each unit coil 604 forming the coil basket 606, a distance T4 between the central axis X of the coil basket 606 and the anti-terminal-side end of the slot-accommodated portion is greater than a distance T3 between the central axis X of the coil basket 606 and the terminal-side end of the slot-accommodated portion.

That is, the slot-accommodated portions 641a and 641b of each unit coil 604 forming the coil basket 606 are inclined.

A method for manufacturing the stator of the present embodiment will be described.

The coil basket 606 of the present embodiment is produced by the same method as in the coil basket 206 of embodiment 2.

That is, the conductive wire of the second slot-accommodated portion 641b of the inserting-side unit coil 604 passes between the conductive wires of the first slot-accommodated portion 641a of the receiving-side unit coil 604, thereby the unit coils 604 are overlapped each other so as to be shifted from each other in the circumferential direction. Then, all the unit coils 604 are overlapped each other so as to be shifted from each other in the circumferential direction and are arranged in an annular shape, whereby the coil basket 606 is produced.

Next, the coil basket 606 is mounted to the inner core 302a.

Figure 46:
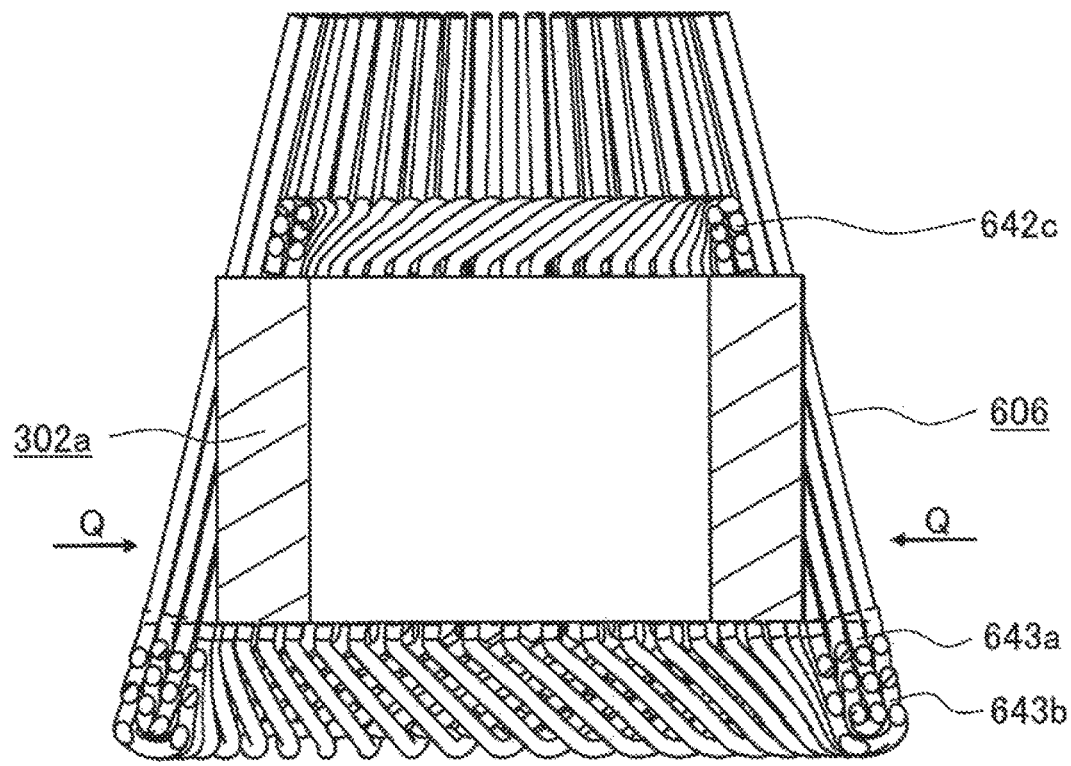
FIG. 46 is a schematic sectional view showing the state in which an inner core is inserted into the coil basket used for a stator according to embodiment 6 of the present invention.

FIG. 46 is a schematic sectional view showing the state in which the inner core is inserted into the coil basket used for the stator according to embodiment 6 of the present invention.

Figure 47:
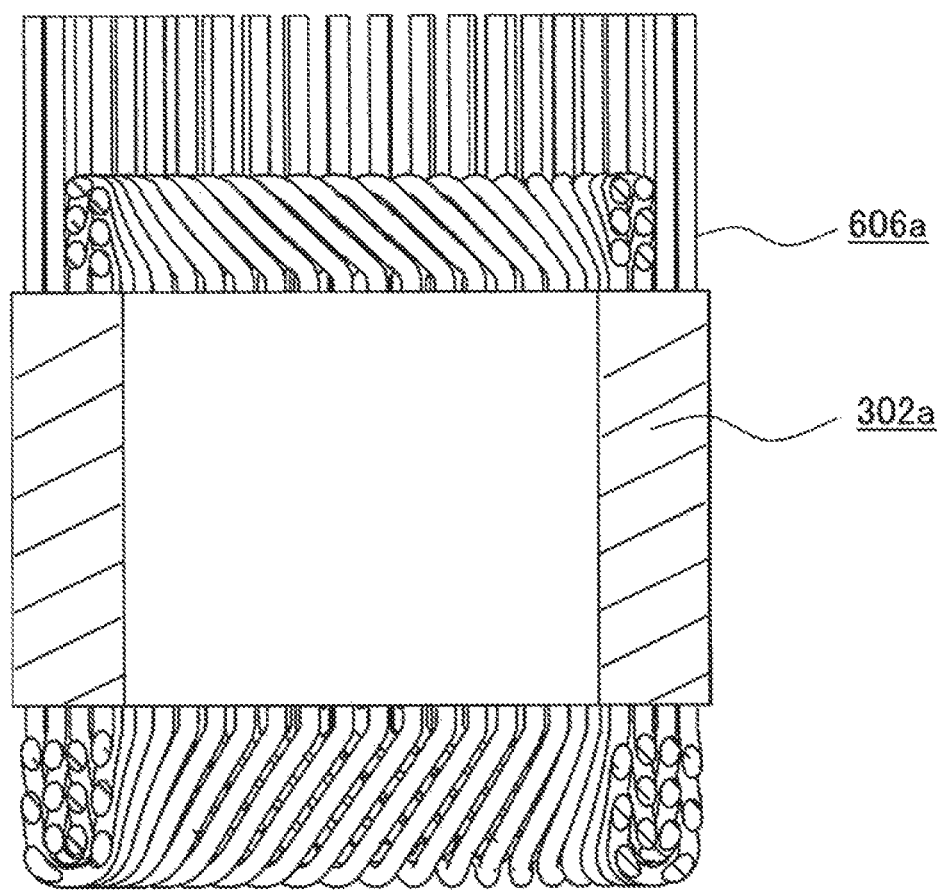
FIG. 47 is a schematic sectional view showing the inner core to which a contracted coil basket is mounted, according to embodiment 6 of the present invention.

FIG. 47 is a schematic sectional view showing the inner core to which a contracted coil basket is mounted, according to embodiment 6 of the present invention.

As shown in FIG. 46, the inner diameter of the anti-terminal side of the coil basket 606 of the present embodiment is greater than the inner diameter of the terminal side.

In addition, the inner diameter of the anti-terminal side of the coil basket 606 is greater than the outer diameter D of the inner core 302a shown in FIG. 32.

The inner diameter of the terminal side of the coil basket 606 is greater than the inter-slot diameter G of the inner core 302 shown in FIG. 31.

Preferably, the difference between the inner diameter of the anti-terminal side of the coil basket 606 and the outer diameter D of the inner core 302a, and the difference between the inner diameter of the terminal side of the coil basket 606 and the inter-slot diameter G, are small.

In mounting of the coil basket 606 to the inner core 302a, first, the inner core 302a is inserted from the anti-terminal side of the coil basket 606, whereby the state in which the inner core 302a is inserted into the coil basket 606 as shown in FIG. 46 is obtained.

Next, a force is applied to the coil basket 606 from the outer circumferential side as indicated by arrows Q. As a result, the teeth 321 of the inner core 302a are inserted into the gaps between the slot-accommodated portions of the coil basket 606, and the coil basket 606 is contracted, whereby all the slot-accommodated portions are accommodated in the slots 305.

Then, as shown in FIG. 47, the state in which the contracted coil basket 606a is mounted to the inner core 302a, is obtained.

Figure 48:
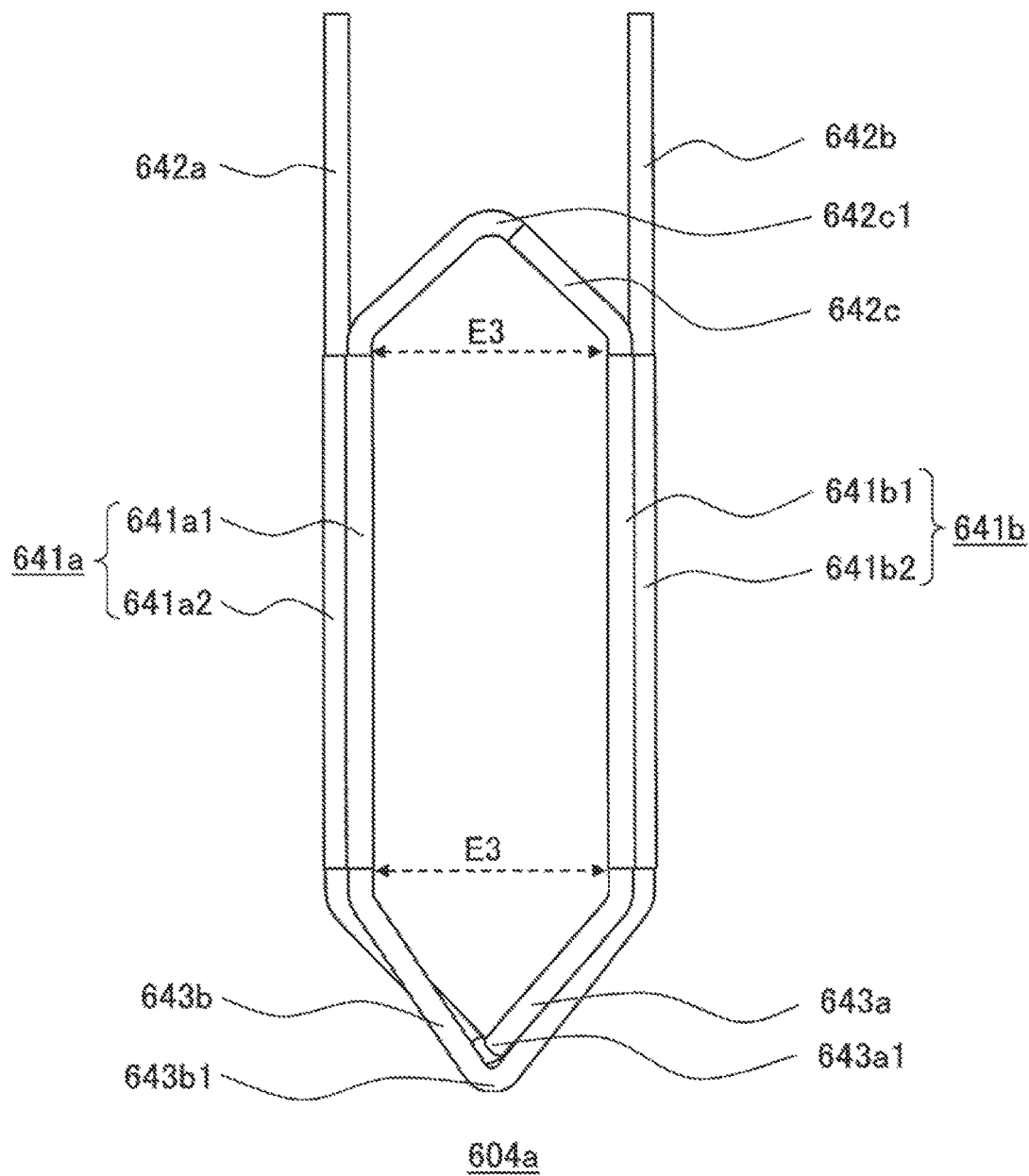
FIG. 48 is a schematic front view showing each contracted unit coil forming the contracted coil basket according to embodiment 6 of the present invention.

FIG. 48 is a schematic front view showing each contracted unit coil forming the contracted coil basket according to embodiment 6 of the present invention.

In the process in which the coil basket 606 is mounted to the inner core 302a, the width in the circumferential direction of the first and second anti-terminal-side coil end portions 643a and 643b of the unit coil 604 is reduced.

Then, as shown in FIG. 48, the contracted unit coil 604a is obtained in which the width in the circumferential direction of the anti-terminal-side coil end portions is the same as the width E3 in the circumferential direction of the terminal-side coil end portion.

Next, the inner core 302a to which the contracted coil basket 606a is mounted is pressed into the outer core 302b (not shown), and a stator intermediate (not shown) is produced.

Next, as in embodiment 4, the first terminal wire 642a and the second terminal wire 642b of each contracted unit coil 604a are bent. Then, the first terminal wire 642a of each contracted unit coil 604a and the second terminal wire 642b of another contracted unit coil 604a to be joined with the first terminal wire 642a are opposing to each other in the radial direction and are in contact with each other.

Next, the first terminal wire 642a of each contracted unit coil 604a and the second terminal wire 642b of another contracted unit coil 604a which are opposed to each other and in contact with each other are joined by welding or the like, and the stator coil is completed, whereby the stator is manufactured.

Also in the stator of the present embodiment, since the first terminal wire 642a and the second terminal wire 642b of each arranged unit coil are arranged so as to be shifted from each other by one line of the conductive wire in the radial direction, it is possible to cause the first terminal wire 642a of each arranged unit coil and the second terminal wire 642b of another arranged unit coil to be opposing to each other in the radial direction and to be in contact with each other, without providing a crossing portion. Thus, the same effect as in the stator of embodiment 4 is provided.

In addition, since the stator core is the same as that in embodiment 3, the accuracy of the shape of the inner circumference of the stator core is enhanced, and thus, also in the rotary electric machine using the stator of the present embodiment, cogging torque and torque ripple are reduced.

In addition, when the stator of the present embodiment is manufactured, the anti-terminal-side coil end portion of each unit coil 604 is deformed. But the terminal-side coil end portion is not deformed. Therefore, a force applied to the unit coil is small, and the insulation reliability of the coil is enhanced.

In the unit coil 604 of the present embodiment, the first and second terminal wires 642a and 642b and the terminal-side coil end portion 642c may be bent outward in the radial direction of the coil basket with respect to the extended line from the first and second slot-accommodated portions 641a and 641b, and the first and second anti-terminal-side coil end portions 643a and 643b may be bent inward in the radial direction of the coil basket with respect to the extended line from the first and second slot-accommodated portions 641a and 641b.

Embodiment 7

Figure 49:
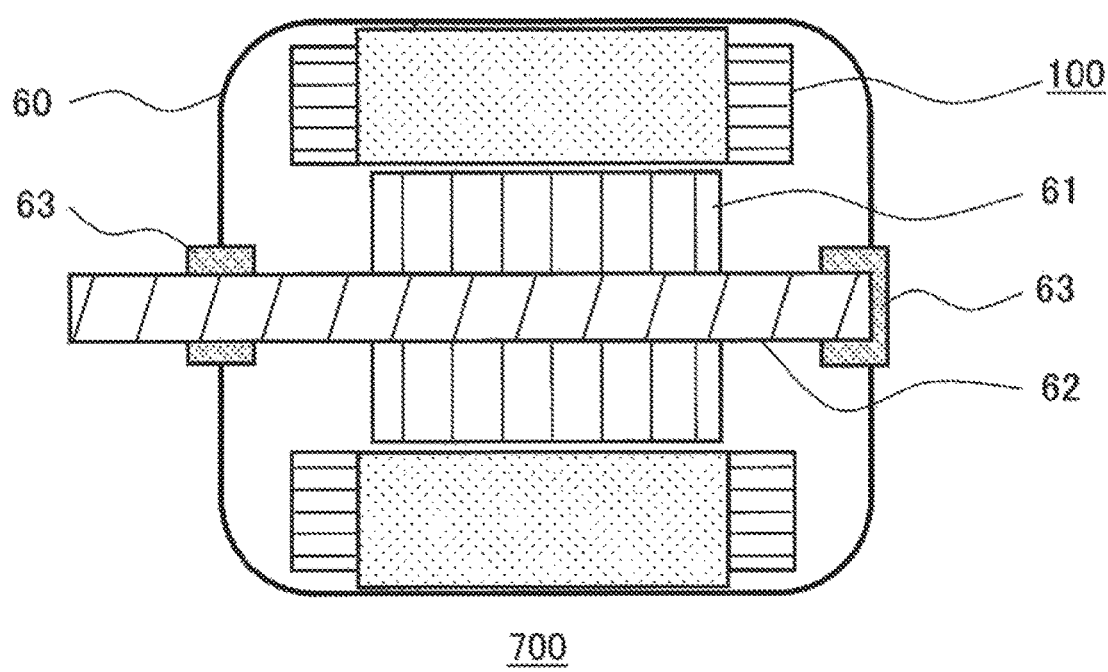
FIG. 49 is a schematic side sectional view of a rotary electric machine according to embodiment 7 of the present invention.

FIG. 49 is a schematic side sectional view of a rotary electric machine according to embodiment 7 of the present invention.

As shown in FIG. 49, the rotary electric machine 700 of the present embodiment includes the stator 100 of embodiment 1, a rotor 61 arranged on the inner circumferential side of the stator 100 with a predetermined gap therebetween, and a rotary shaft 62 inserted in the axial direction through the center of the rotor 61 and fixing the rotor 61.

The rotary shaft 62 is rotatably held by bearings 63 provided in the housing 60.

The stator used for the rotary electric machine 700 of the present embodiment may be the stator of any one of embodiments 2 to 6.

The rotary electric machine 700 of the present embodiment is excellent in insulation reliability and productivity because the stator thereof is the stator of any one of embodiments 1 to 6.

Next, the method for manufacturing the rotary electric machine 700 according to the present embodiment will be described.

The method for manufacturing the rotary electric machine according to the present embodiment includes: a process for manufacturing the stator 100 by the method described in embodiment 1; and a process for inserting the rotor 61 fixed to the rotary shaft 62 by, for example, shrink fit, into a space on the inner circumferential side of the manufactured stator 100, from the axial direction.

In the method for manufacturing the rotary electric machine 700 in the present embodiment, the stator is manufactured by the method described in embodiment 1. However, the stator may be manufactured by the method described in any one of embodiments 2 to 6.

In the method for manufacturing the rotary electric machine according to the present embodiment, since the stator is manufactured by the method described in any one of embodiments 1 to 6, the rotary electric machine that is excellent in insulation reliability and productivity can be obtained.

It is noted that, within the scope of the present invention, the above embodiments may be freely combined with each other, or each of the above embodiments may be modified or eliminated appropriately.

INDUSTRIAL APPLICABILITY

The stator of the present invention and the rotary electric machine using the stator are excellent in insulation reliability and productivity, and thus are applicable to industrial apparatuses which require cost reduction and high reliability.

The invention claimed is:

1. A stator comprising:
a stator core having a plurality of teeth and a plurality of slots, which are arranged in a circumferential direction; and
stator coils arranged in the stator core and wound by distributed-winding, wherein
the stator coil is formed by a plurality of unit coils arranged so as to be shifted from each other in the circumferential direction, the unit coils each being formed by winding one conductive wire,
the unit coils include a first slot-accommodated portion; a second slot-accommodated portion; a first terminal wire extending from the first slot-accommodated portion; a second terminal wire extending from the second slot-accommodated portion; a terminal-side coil end portion connecting the first slot-accommodated portion and the second slot-accommodated portion, on a terminal side in which the first terminal wire and the second terminal wire are present; and anti-terminal-side coil end portions connecting the first slot-accommodated portion and the second slot-accommodated portion, on an anti-terminal side opposite to the terminal side in an axial direction,
the first slot-accommodated portion is accommodated in the slot at one of positions separated from each other with a predetermined number of the teeth therebetween in the circumferential direction, and the second slot-accommodated portion is accommodated in the slot at the other of the positions separated from each other with the predetermined number of the teeth therebetween in the circumferential direction,
the first slot-accommodated portion and the second slot-accommodated portion are respectively formed by n lines wherein n is an integer not less than 2 of the conductive wire,
the terminal-side coil end portion is formed by (n−1) lines of the conductive wire,
the anti-terminal-side coil end portions are formed by a first anti-terminal-side coil end portion and a second anti-terminal-side coil end portion, the first anti-terminal-side coil end portion being formed by (n−1) lines of the conductive wire, the second anti-terminal-side coil end portion being formed by one line of the conductive wire,
gaps corresponding to one line of the conductive wire in a radial direction are provided between respective lines of the conductive wire of the first slot-accommodated portion and between the respective lines of the conductive wire of the second slot-accommodated portion,
the (n−1) lines of the conductive wire of the terminal-side coil end portion and the (n−1) lines of the conductive wire of the first anti-terminal-side coil end portion respectively connect the corresponding conductive wire of the first slot-accommodated portion and the corresponding conductive wire of the second slot-accommodated portion that are shifted from each other by one line of the conductive wire in the radial direction,
the one line of the conductive wire of the second anti-terminal-side coil end portion connects the corresponding conductive wire of the first slot-accommodated portion and the corresponding conductive wire of the second slot-accommodated portion that are shifted from each other by (2n−1) lines of the conductive wire in the radial direction,
the first terminal wire and the second terminal wire are shifted from each other by one line of the conductive wire in the radial direction, and
the first terminal wire and the second terminal wire of respective different ones of the unit coils are joined with each other.

2. The stator according to claim 1, wherein
the number n of lines of the conductive wire forming the first slot-accommodated portion and the second slot-accommodated portion is not less than 2 and not greater than the number of lines of the conductive wire that can be accommodated in the slots.

3. The stator according to claim 1, wherein
the stator core is formed by arranging, in an annular shape, the stator core components having a back yoke forming portion and a tooth protruding from an inner circumferential surface of the back yoke forming portion,
the stator coils are a coil basket formed by arranging a plurality of unit coils in the circumferential direction,
the coil basket is formed by causing the conductive wire of the second slot-accommodated portion of a second unit coil to pass between the corresponding lines of the conductive wire of the first slot-accommodated portion of a first unit coil so that the first unit coil and the second unit coil overlap each other so as to be shifted from each other in the circumferential direction, and
the teeth are inserted into the coil basket from the outer circumferential side and all the slot-accommodated portions are accommodated in the slots formed between the teeth.

4. The stator according to claim 1, wherein
the stator core is formed by an inner core located on a radially inner side, and an outer core separate from the inner core and located on a radially outer side,
the inner core is formed by a plurality of the teeth radially arranged at regular intervals along the circumferential direction, and connection portions connecting radially-inner-side ends of adjacent teeth;
the ends of the teeth and the connection portions forming an annular body, the slots being formed between the adjacent teeth;
the outer core has a cylindrical shape, and an inner circumferential surface of the outer core fixes radially-outer-side ends of the teeth of the inner core,
the stator coils are a contracted coil basket obtained by contracting, in the radial direction, a coil basket formed by arranging a plurality of unit coils in the circumferential direction,
the coil basket is formed by causing the conductive wire of the second slot-accommodated portion of a second unit coil to pass between the corresponding lines of the conductive wire of the first slot-accommodated portion of a first unit coil so that the first unit coil and the second unit coil overlap each other so as to be shifted from each other in the circumferential direction,
the contracted coil basket is mounted to the inner core and all the slot-accommodated portions are accommodated in the slots, and
the inner core to which the contracted coil basket is mounted is attached to the outer core.

5. The stator according to claim 1, wherein
the stator core is formed by an inner core located on a radially inner side, and an outer core separate from the inner core and located on a radially outer side,
the inner core is formed by a plurality of the teeth radially arranged at regular intervals along the circumferential direction, and connection portions connecting radially-inner-side ends of the adjacent teeth;
the ends of the teeth and the connection portions forming an annular body, the slots being formed between the adjacent teeth;
the outer core has a cylindrical shape, and an inner circumferential surface of the outer core fixes radially-outer-side ends of the teeth of the inner core,
the stator coils are a contracted coil basket obtained by contracting, in the radial direction, a coil basket formed by arranging a plurality of unit coils in the circumferential direction,
the coil basket is formed by causing the conductive wire of the second slot-accommodated portion of a second unit coil to pass between the corresponding lines of the conductive wire of the first slot-accommodated portion of a first unit coil so that the first unit coil and the second unit coil overlap each other so as to be shifted from each other in the circumferential direction, and a diameter of the coil basket on the terminal side is greater than a diameter of the coil basket on the anti-terminal side,
a width in the circumferential direction of the terminal-side coil end portion of each unit coil is greater than a width in the circumferential direction of the anti-terminal-side coil end portion,
the contracted coil basket is mounted to the inner core and all the slot-accommodated portions are accommodated in the slots, and
the inner core to which the contracted coil basket is mounted is attached to the outer core.

6. The stator according to claim 5, wherein
each unit coil is formed such that, with respect to an extended line from the first slot-accommodated portion and an extended line from the second slot-accommodated portion, the first terminal wire, the second terminal wire, and the terminal-side coil end portion are bent inward in the radial direction of the coil basket, and the first anti-terminal-side coil end portion and the second anti-terminal-side coil end portion are bent outward in the radial direction of the coil basket.

7. The stator according to claim 5, wherein
each unit coil is formed such that, with respect to an extended line from the first slot-accommodated portion and an extended line from the second slot-accommodated portion, the first terminal wire, the second terminal wire, the terminal-side coil end portion, the first anti-terminal-side coil end portion, and the second anti-terminal-side coil end portion are not bent in the radial direction of the coil basket.

8. The stator according to claim 1, wherein
the stator core is formed by an inner core located on a radially inner side, and an outer core separate from the inner core and located on a radially outer side,
the inner core is formed by a plurality of the teeth radially arranged at regular intervals along the circumferential direction, and connection portions connecting radially-inner-side ends of the adjacent teeth;
the ends of the teeth and the connection portions forming an annular body, the slots being formed between the adjacent teeth;
the outer core has a cylindrical shape, and an inner circumferential surface of the outer core fixes radially-outer-side ends of the teeth of the inner core,
the stator coils are a contracted coil basket obtained by contracting, in the radial direction, a coil basket formed by arranging a plurality of unit coils in the circumferential direction,
the coil basket is formed by causing the conductive wire of the second slot-accommodated portion of a second unit coil to pass between the corresponding lines of the conductive wire of the first slot-accommodated portion of a first unit coil so that the first unit coil and the second unit coil overlap each other so as to be shifted from each other in the circumferential direction, and a diameter of the coil basket on the anti-terminal side is greater than a diameter of the coil basket on the terminal side,
a width in the circumferential direction of the anti-terminal-side coil end portion of each unit coil is greater than a width in the circumferential direction of the terminal-side coil end portion,
the contracted coil basket is mounted to the inner core and all the slot-accommodated portions are accommodated in the slots, and
the inner core to which the contracted coil basket is mounted is attached to the outer core.

9. The stator according to claim 8, wherein
each unit coil is formed such that, with respect to an extended line from the first slot-accommodated portion and an extended line from the second slot-accommodated portion, the first terminal wire, the second terminal wire, and the terminal-side coil end portion are bent outward in the radial direction of the coil basket, and the first anti-terminal-side coil end portion and the second anti-terminal-side coil end portion are bent inward in the radial direction of the coil basket.

10. The stator according to claim 8, wherein
each unit coil is formed such that, with respect to an extended line from the first slot-accommodated portion and an extended line from the second slot-accommodated portion, the first terminal wire, the second terminal wire, the terminal-side coil end portion, the first anti-terminal-side coil end portion, and the second anti-terminal-side coil end portion are not bent in the radial direction of the coil basket.

11. A rotary electric machine comprising:
the stator according to claim 1;
a rotor arranged on an inner circumferential side of the stator with a predetermined gap therebetween; and
a rotary shaft inserted through a center of the rotor in an axial direction and fixing the rotor, the rotary shaft being rotatably held by bearings provided in a housing.

12. A method for manufacturing a stator, the method comprising:
a step of winding one conductive wire to produce unit coils having first slot-accommodated portions and second slot-accommodated portions which are respectively formed by n lines of the conductive wire;
a step of forming a coil basket by causing the conductive wire of the second slot-accommodated portion of a second unit coil to pass between the corresponding lines of the conductive wire of the first slot-accommodated portion of a first unit coil so that the first unit coil and the second unit coil overlap each other so as to be shifted from each other in a circumferential direction, and arranging a plurality of the unit coils in the circumferential direction;

a step of arranging, inside the coil basket, an inner core formed by a plurality of teeth radially arranged at regular intervals along the circumferential direction and connection portions connecting radially-inner-side ends of the adjacent teeth;

a coil basket contraction step of tightening the coil basket inside which the inner core is arranged, from an outer circumferential side, thereby reducing an inner diameter of the coil basket and accommodating all the slot-accommodated portions into the slots between the teeth; and a step of pressing, into an outer core, the inner core to which the contracted coil basket with the reduced inner diameter is mounted.

13. A method for manufacturing a rotary electric machine, the method comprising:

a step of manufacturing the stator by the method according to claim 12; and a step of inserting a rotor fixed to a rotary shaft, from an axial direction, into a space provided on an inner circumferential side of the stator manufactured in the step of manufacturing the stator.

14. A method for manufacturing a stator, the method comprising:

a step of winding one conductive wire to produce unit coils in which first slot-accommodated portions and second slot-accommodated portions are respectively formed by n lines of the conductive wire and a width in a circumferential direction of a terminal-side coil end portion is greater than a width in the circumferential direction of an anti-terminal-side coil end portion;

a step of forming a coil basket having an inner diameter of a terminal side greater than an inner diameter of an anti-terminal side by causing the conductive wire of the second slot-accommodated portion of a second unit coil to pass between the corresponding lines of the conductive wire of the first slot-accommodated portion of a first unit coil so that the first unit coil and the second unit coil overlap each other so as to be shifted from each other in the circumferential direction, and arranging a plurality of the unit coils in the circumferential direction;

a step of inserting, from the terminal side of the coil basket, an inner core formed by a plurality of teeth radially arranged at regular intervals along the circumferential direction and connection portions connecting radially-inner-side ends of the adjacent teeth;

a coil basket contraction step of applying a force from an outer circumferential side to the coil basket in which the inner core is inserted, thereby making the inner diameter of the terminal side and the inner diameter of the anti-terminal side of the coil basket equal to each other, and accommodating all the slot-accommodated portions into the slots between the teeth; and a step of pressing, into an outer core, the inner core to which the contracted coil basket having the reduced inner diameter of the terminal side of the coil basket is mounted.

15. A method for manufacturing a rotary electric machine, the method comprising:

a step of manufacturing the stator by the method according to claim 14; and a step of inserting a rotor fixed to a rotary shaft, from an axial direction, into a space provided on an inner circumferential side of the stator manufactured in the step of manufacturing the stator.

16. A method for manufacturing a stator, the method comprising:

a step of winding one conductive wire to produce unit coils in which first slot-accommodated portions and second slot-accommodated portions are respectively formed by n lines of the conductive wire and a width in a circumferential direction of an anti-terminal-side coil end portion is greater than a width in the circumferential direction of a terminal-side coil end portion;

a step of forming a coil basket having an inner diameter of an anti-terminal side greater than an inner diameter of a terminal side by causing the conductive wire of the second slot-accommodated portion of a second unit coil to pass between the corresponding lines of the conductive wire of the first slot-accommodated portion of a first unit coil so that the first unit coil and the second unit coil overlap each other so as to be shifted from each other in the circumferential direction, and arranging a plurality of the unit coils in the circumferential direction;

a step of inserting, from the anti-terminal side of the coil basket, an inner core formed by a plurality of teeth radially arranged at regular intervals along the circumferential direction and connection portions connecting radially-inner-side ends of the adjacent teeth;

a coil basket contraction step of applying a force from an outer circumferential side to the coil basket in which the inner core is inserted, thereby making the inner diameter of the anti-terminal side and the inner diameter of the terminal side of the coil basket equal to each other, and accommodating all the slot-accommodated portions into the slots between the teeth; and a step of pressing, into an outer core, the inner core to which the contracted coil basket having the reduced inner diameter of the anti-terminal side of the coil basket is mounted.

17. A method for manufacturing a rotary electric machine, the method comprising:

a step of manufacturing the stator by the method according to claims 16; and a step of inserting a rotor fixed to a rotary shaft, from an axial direction, into a space provided on an inner circumferential side of the stator manufactured in the step of manufacturing the stator.

\* \* \* \* \*